(12) United States Patent
Li et al.

(10) Patent No.: US 11,723,046 B2
(45) Date of Patent: Aug. 8, 2023

(54) METHOD AND APPARATUS OF DERIVING FEEDBACK RESOURCE FOR SIDELINK TRANSMISSION IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/579,067

(22) Filed: Sep. 23, 2019

(65) Prior Publication Data

US 2020/0100215 A1 Mar. 26, 2020

Related U.S. Application Data

(60) Provisional application No. 62/736,113, filed on Sep. 25, 2018.

(51) Int. Cl.
*H04W 72/00* (2009.01)
*H04W 72/30* (2023.01)
(Continued)

(52) U.S. Cl.
CPC .......... *H04W 72/30* (2023.01); *H04L 1/1819* (2013.01); *H04L 5/0082* (2013.01); *H04W 72/02* (2013.01); *H04W 72/535* (2023.01); *H04W 92/18* (2013.01)

(58) Field of Classification Search
CPC . H04W 84/047; H04W 72/005; H04W 72/02; H04W 72/1257; H04W 72/044;
(Continued)

(56) References Cited

U.S. PATENT DOCUMENTS

2018/0249307 A1 8/2018 Kim
2019/0044667 A1 2/2019 Guo
(Continued)

FOREIGN PATENT DOCUMENTS

KR 1020100070355 6/2010
WO 2016194279 12/2016
WO 2018062857 4/2018

OTHER PUBLICATIONS

Notice of Submission of Opinion from Korean Intellectual Property Office in corresponding KR Application No. 10-2019-0116758, dated Feb. 16, 2021.
(Continued)

*Primary Examiner* — Ricardo H Castaneyra
(74) *Attorney, Agent, or Firm* — Skaar Ulbrich Macari, P.A.

(57) ABSTRACT

A method and apparatus are disclosed from the perspective of a first device. In one embodiment, the method includes the first device performs sensing on a data resource pool, and the first device selects/derives at least a first data resource from the data resource pool based on the sensing result of the data resource pool. The method further includes the first device transmits a first control information on a first control resource, wherein the first control information allocates or indicates the first data resource. The method also includes the first device performs a first data transmission on the first data resource to at least one second device. Furthermore, the method includes the first device determines or derives a first set of feedback resource(s) based on the first control resource and/or the first data resource; and the first device receives a first set of feedback transmission(s) on the first set of feedback resource(s) from at least the one second device, wherein the first set of feedback transmissions are associated with the first data transmission.

22 Claims, 27 Drawing Sheets

(51) Int. Cl.
*H04L 1/1812* (2023.01)
*H04W 72/02* (2009.01)
*H04L 5/00* (2006.01)
*H04W 72/50* (2023.01)
*H04W 92/18* (2009.01)

(58) Field of Classification Search
CPC ......... H04W 72/1231; H04W 72/1278; H04W 92/18; H04W 74/0808; H04W 74/002; H04W 88/04; H04L 1/1819; H04L 1/1584; H04L 1/1887; H04L 1/1896; H04L 1/1812; H04L 5/0082; H04L 5/0007; H04L 5/0094; H04L 5/0055
See application file for complete search history.

(56) References Cited

U.S. PATENT DOCUMENTS

| | | | |
|---|---|---|---|
| 2020/0029318 A1* | 1/2020 | Guo | H04L 1/1819 |
| 2020/0305176 A1* | 9/2020 | Hu | H04B 7/0456 |
| 2021/0112505 A1* | 4/2021 | Li | H04W 4/40 |

OTHER PUBLICATIONS

Oppo, "Discussion of Sidelink Unicast, Groupcast and Broadcast for NR-V2X", 3GPP TSG RAN WG1 Meeting #94, Gothenburg, Sweden, Aug. 20-24, 2018, R1-1808875, Agenda Item, 7.2.4.1.1, Discussion and Decision.

Notice of Patent Rejection Decision from Korean Intellectual Property Office in corresponding KR Application No. 10-2019-0116758, dated Aug. 27, 2021.

Oppo, "Discussion ofsidelink unicast, groupcast and broadcast for NR-V2X", Agenda Item: 7.2.4.1.1, R1-1808875, Discussion and Decision, 3GPP TSG RAN WG1 Meeting #94, Gothenburg, Sweden, Aug. 20-24, 2018.

Proof of well-known technology: J. Schlienz and A. Roessler, "Device to Device Communication in LTE", Whitepaper, Rohde & Schwarz, Munich, Germany, (https://rohde-schwarz.com/kr/applications/device-to-device-communication-in-lte-white-paper_230854-142855.html) [Retrieved Aug. 26, 2021] (Released on Sep. 29, 2015).

Intel Corporation, "On combination of sensing and geo-based transmission techniques for sidelink V2V communication", Agenda Item: 7,3.2.2.1, R1-162933, Discussion and Decision, 3GPP TSG RAN WG1 Meeting #84bis, Busan, Korea Apr. 11-15, 2016.

CMCC, "Details of DCI in eNB scheduling mode", Agenda Item: 7.2.2.4.1, R1-167091, Discussion and Decision, 3GPP TSG RAN WG1 Meeting #86, Gothenburg, Sweden Aug. 22-26, 2016.

Office Action to the counterpart Korean Patent Application rendered by the Korean Intellectual Property Office (KIPO) dated Nov. 30, 2021, 19 pages (including English translation).

Oppo, R1-1808875, Discussion of sidelink unicast, groupcast and broadcast for NR-V2X, 3GPP TSG RAN WG1 #94 (Aug. 10, 2018 3GPP server release), 4 pages.

J. Schlienz and A. Roessler, Device to device communication in LTE: Whitepaper, Rohde & Schwarz, Munich, Germany, [online] (https://www.rohde-schwarz.com/kr/applications/device-to-device-communication-in-lte-white-paper_230854-142855.html) [Retrieved on Aug. 26, 2021] (released on Sep. 29, 2015), 37 pages.

* cited by examiner

| DCI format | Search Space |
|---|---|
| DCI format 5A | For PDCCH: Common and UE specific by C-RNTI |
| | For EPDCCH: UE specific by C-RNTI |

METHOD AND APPARATUS OF DERIVING FEEDBACK RESOURCE FOR SIDELINK TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/736,113 filed on Sep. 25, 2018, the entire disclosure of which is incorporated herein in their entirety by reference.

FIELD

This disclosure generally relates to wireless communication networks, and more particularly, to a method and apparatus of deriving feedback for sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device. In one embodiment, the method includes the first device performs sensing on a data resource pool, and the first device selects/derives at least a first data resource from the data resource pool based on the sensing result of the data resource pool. The method further includes the first device transmits a first control information on a first control resource, wherein the first control information allocates or indicates the first data resource. The method also includes the first device performs a first data transmission on the first data resource to at least one second device. Furthermore, the method includes the first device determines or derives a first set of feedback resource(s) based on the first control resource and/or the first data resource; and the first device receives a first set of feedback transmission(s) on the first set of feedback resource(s) from at least the one second device, wherein the first set of feedback transmissions are associated with the first data transmission.

BRIEF DESCRIPTION OF THE DRAWINGS

FIG. 13 is a reproduction of Table 14.2-2 of 3GPP TS 36.212 V15.2.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO; 3GPP RAN2 #94 meeting minute; TS 36.213 V15.2.0 (2018-06), "E-UTRA; Physical layer procedures (Release 15)"; TS 36.214 V15.2.0 (2018-03), "E-UTRA; Physical layer; Measurements (Release 15)"; TS 36.212 V15.2.1 (2018-07), "E-UTRA; Physical layer; Multiplexing and channel coding (Release 15)"; and Draft Report of 3GPP TSG RAN WG1 #94 v0.1.0 (Gothenburg, Sweden, 20-24 Aug. 2018). The standards and documents listed above are hereby expressly incorporated by reference in their entirety.

Figure 1:
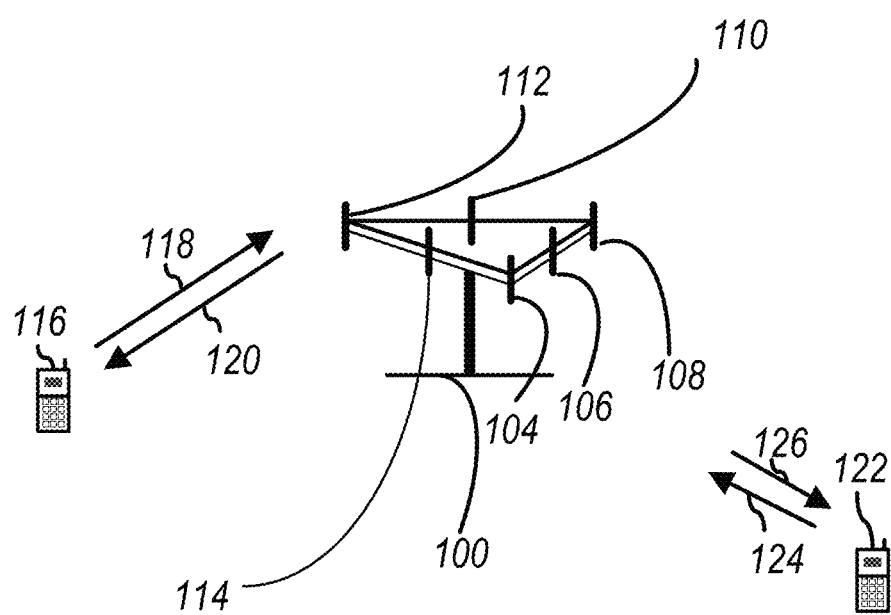
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
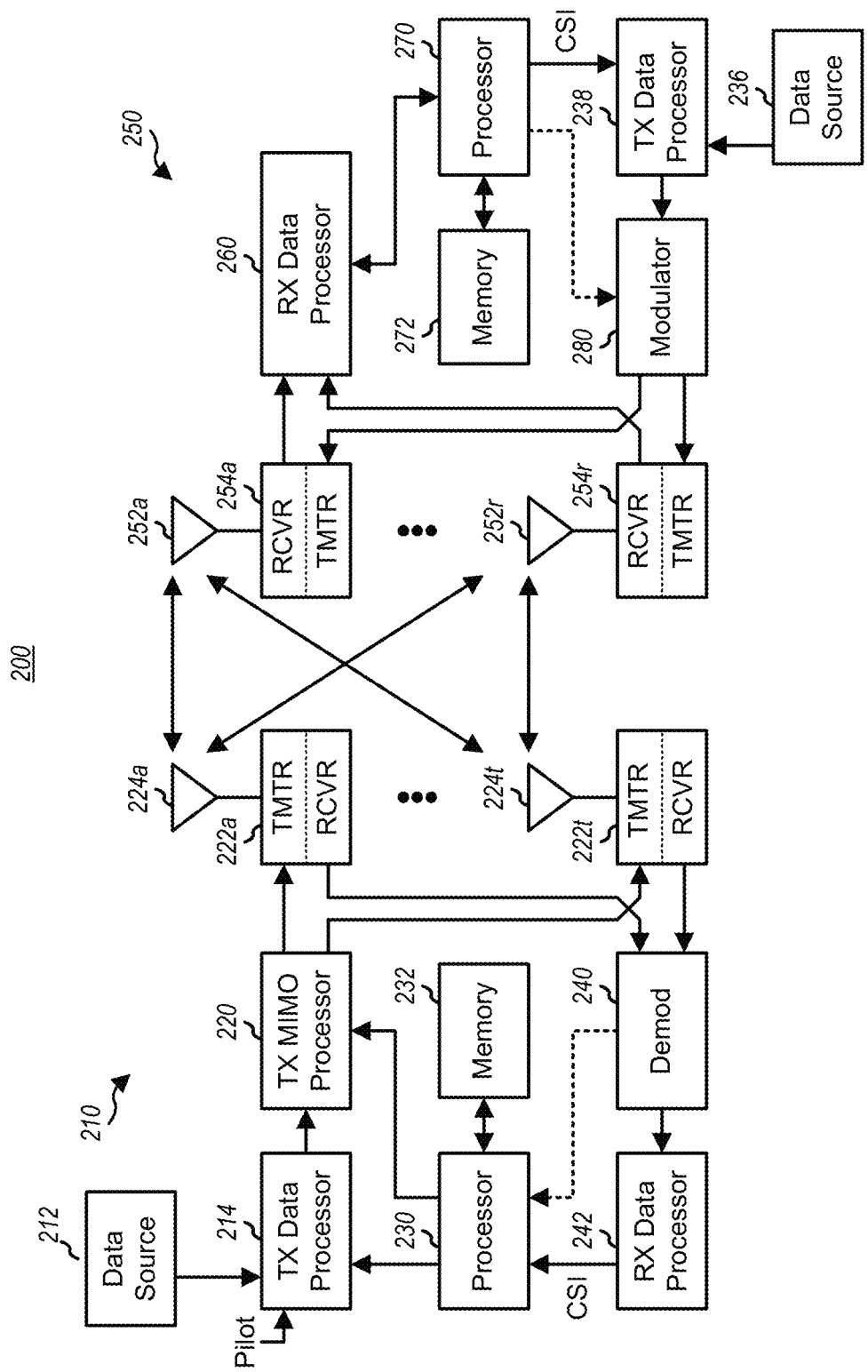
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
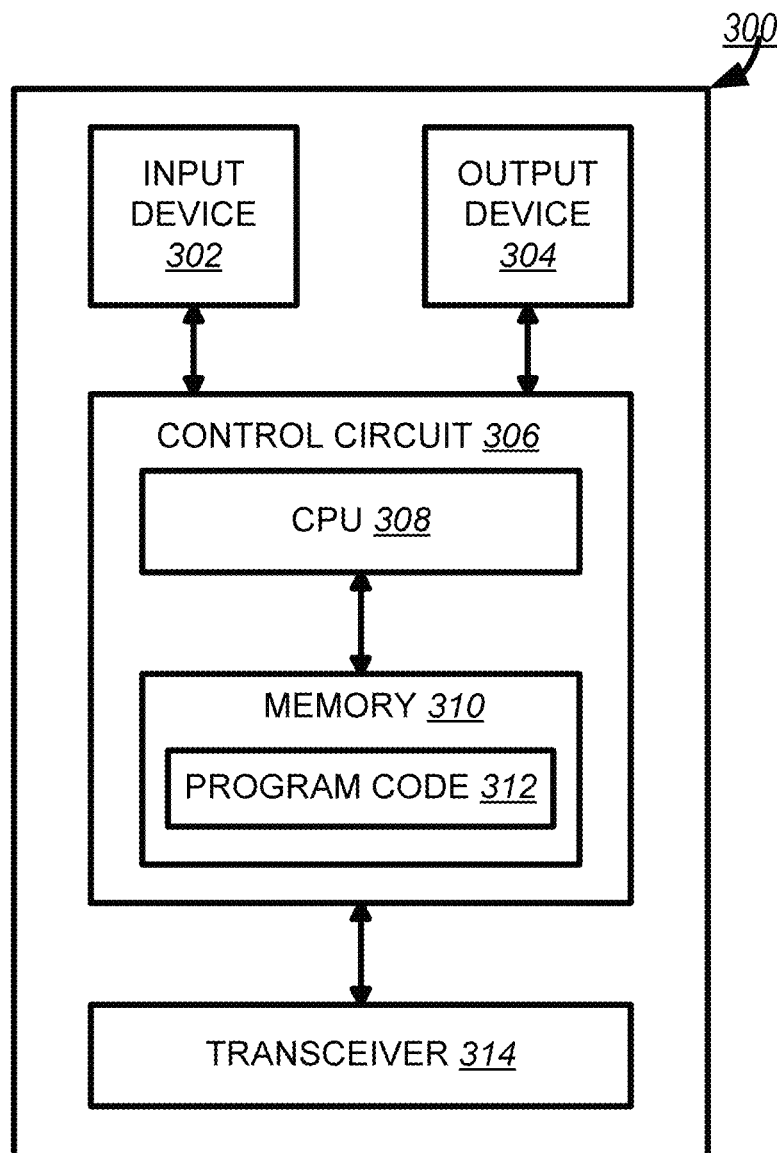
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
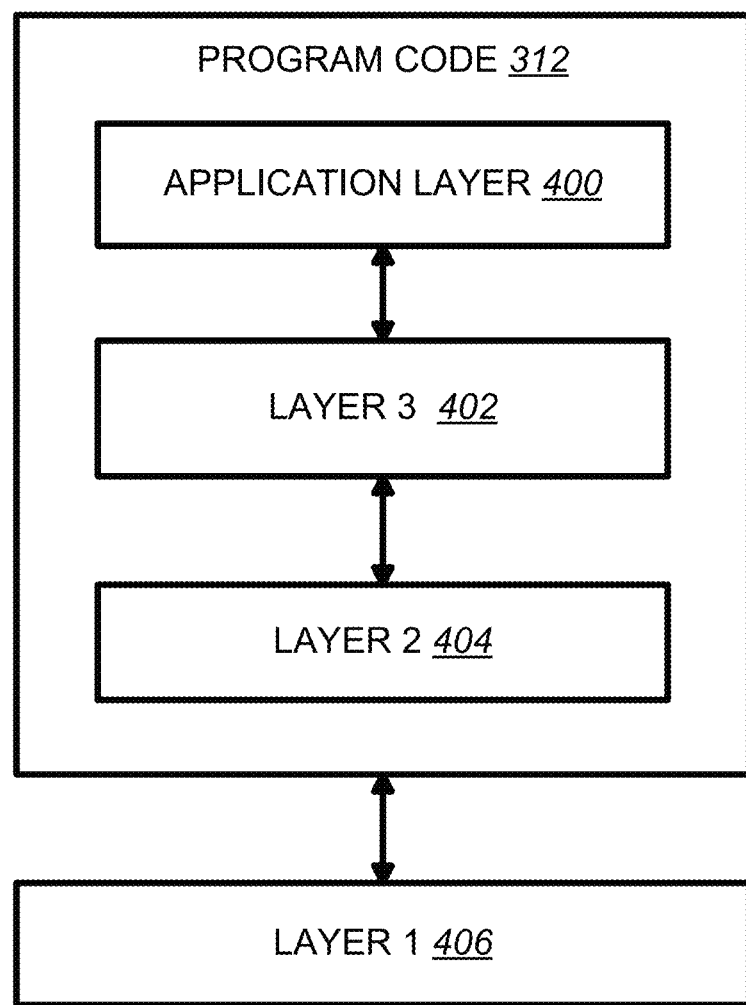
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Figure 5:
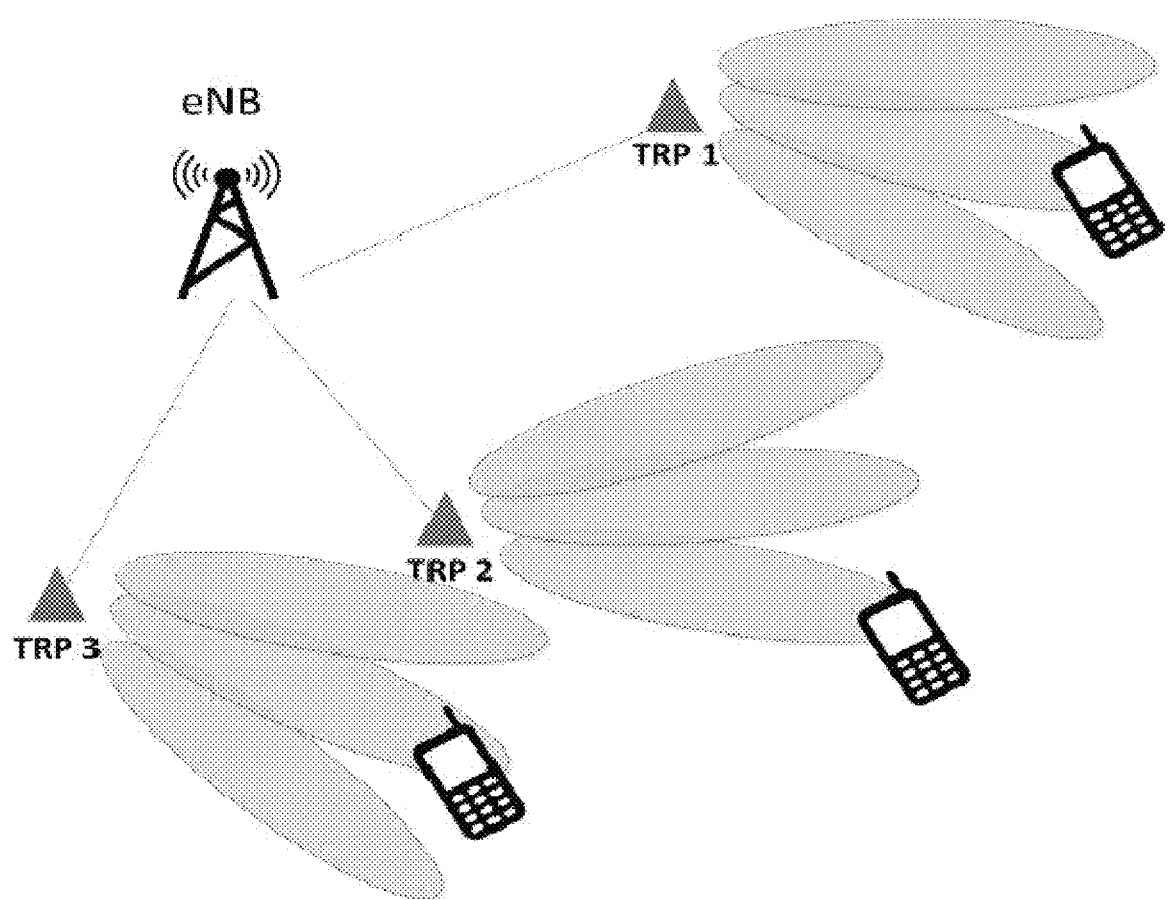
FIG. 5 is a reproduction of FIG. 1 of 3GPP R2-162709.

Based on 3GPP R2-162709 and as shown in FIG. 5, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Figure 6:
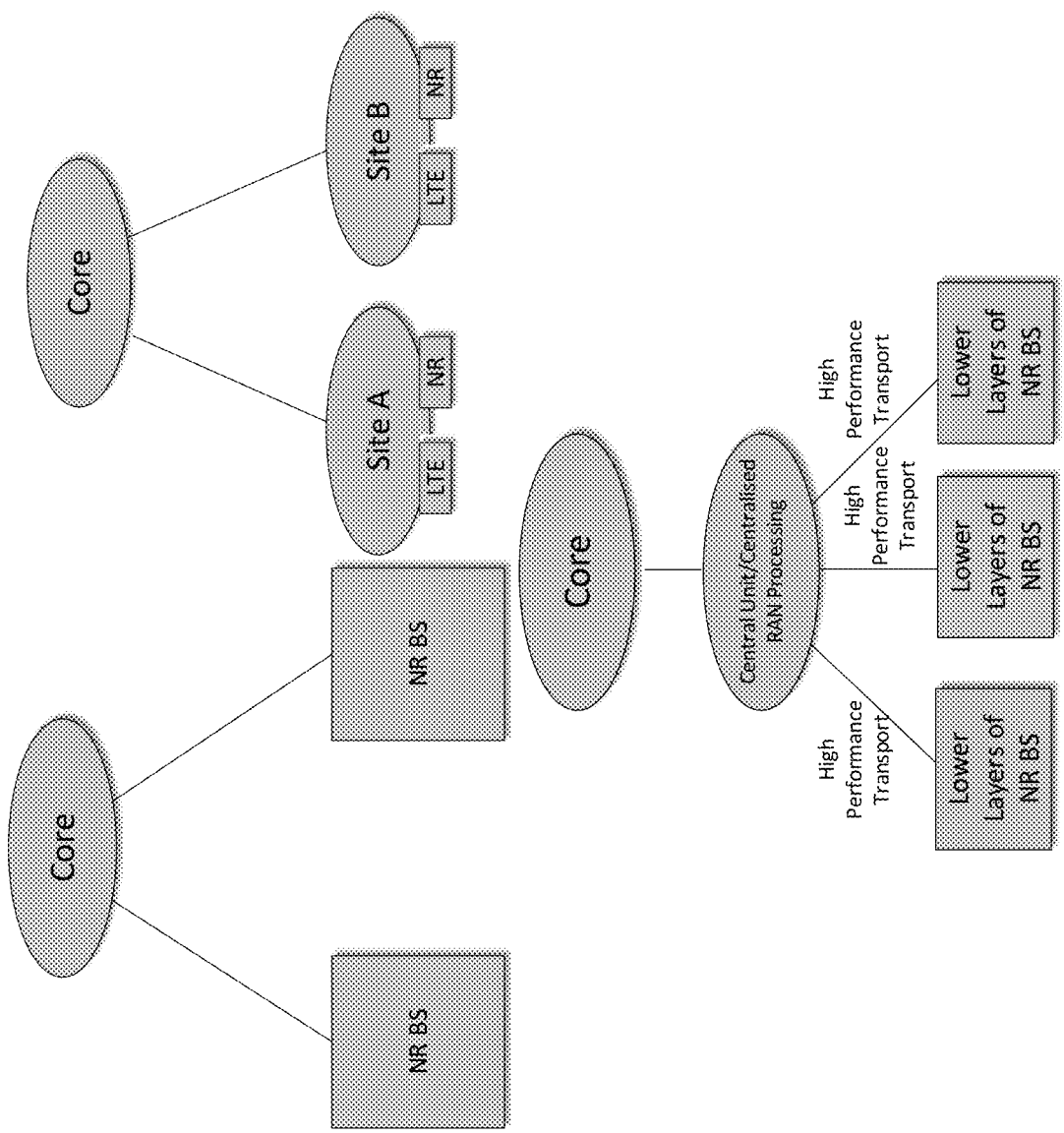
FIGS. 6 and 7 are reproduction of figures of 3GPP R3-160947.
Figure 7:
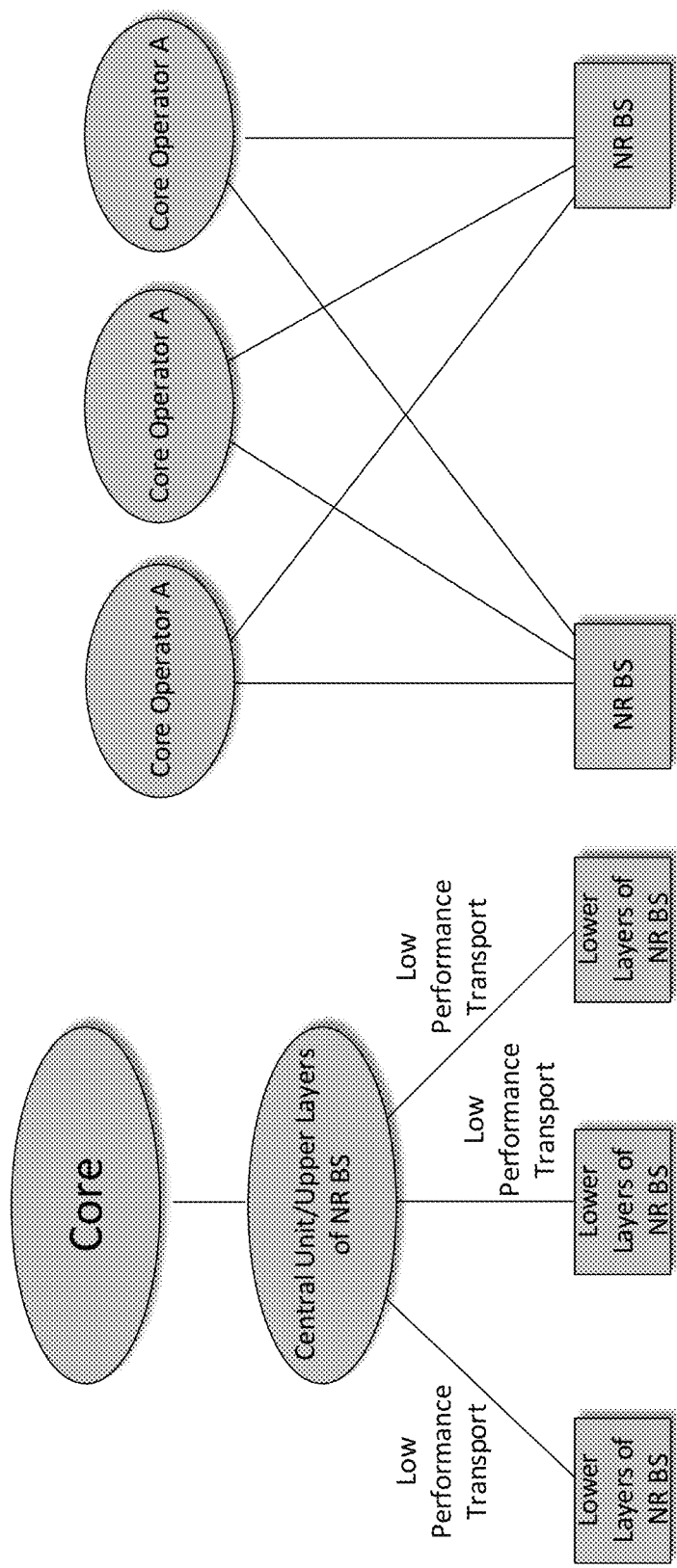

Potential mobility type for NR can be listed as follows:
Intra-TRP mobility
Inter-TRP mobility
Inter-NR eNB mobility Based on 3GPP R3-160947, the scenarios illustrated in FIGS. 6 and 7 should be considered for support by the NR radio network architecture.

Based on 3GPP R2-164306, the following scenarios in terms of cell layout for standalone NR are captured to be studied:
Macro cell only deployment
Heterogeneous deployment
Small cell only deployment Based on 3GPP RAN2 #94 meeting minutes, 1 NR eNB corresponds to 1 or many TRPs. Two levels of network controlled mobility:
RRC driven at "cell" level.
Zero/Minimum RRC involvement (e.g. at MAC/PHY)

Figure 8:
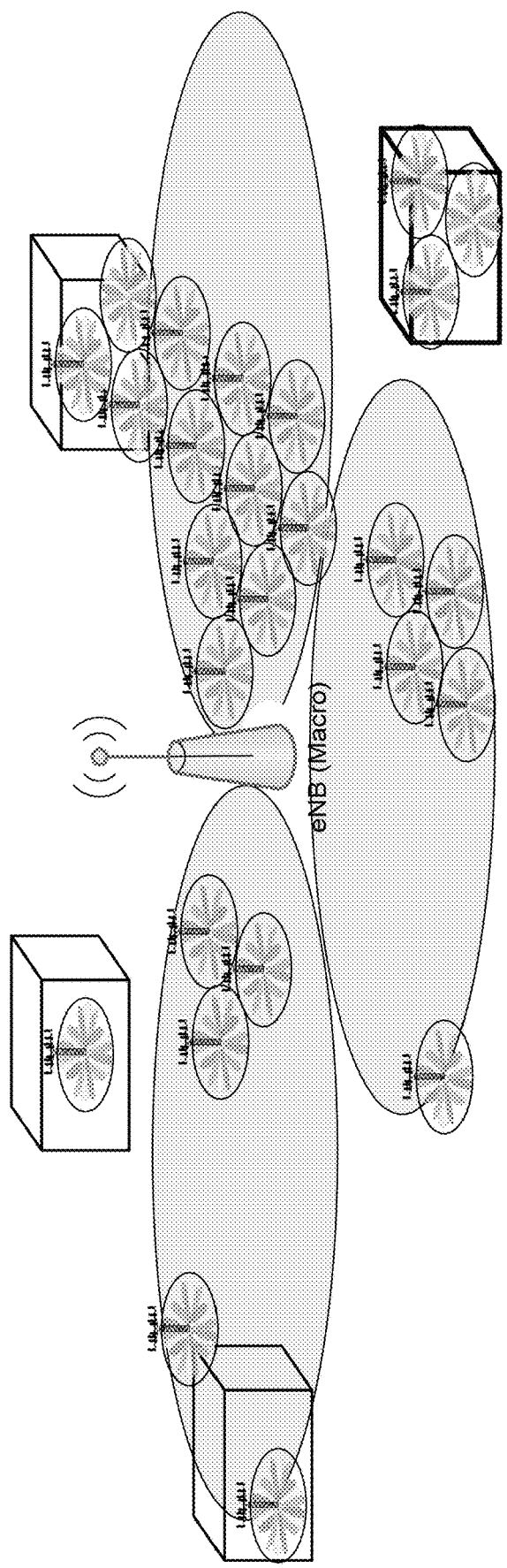
FIG. 8 shows an exemplary deployment with single TRP cell.
Figure 9:
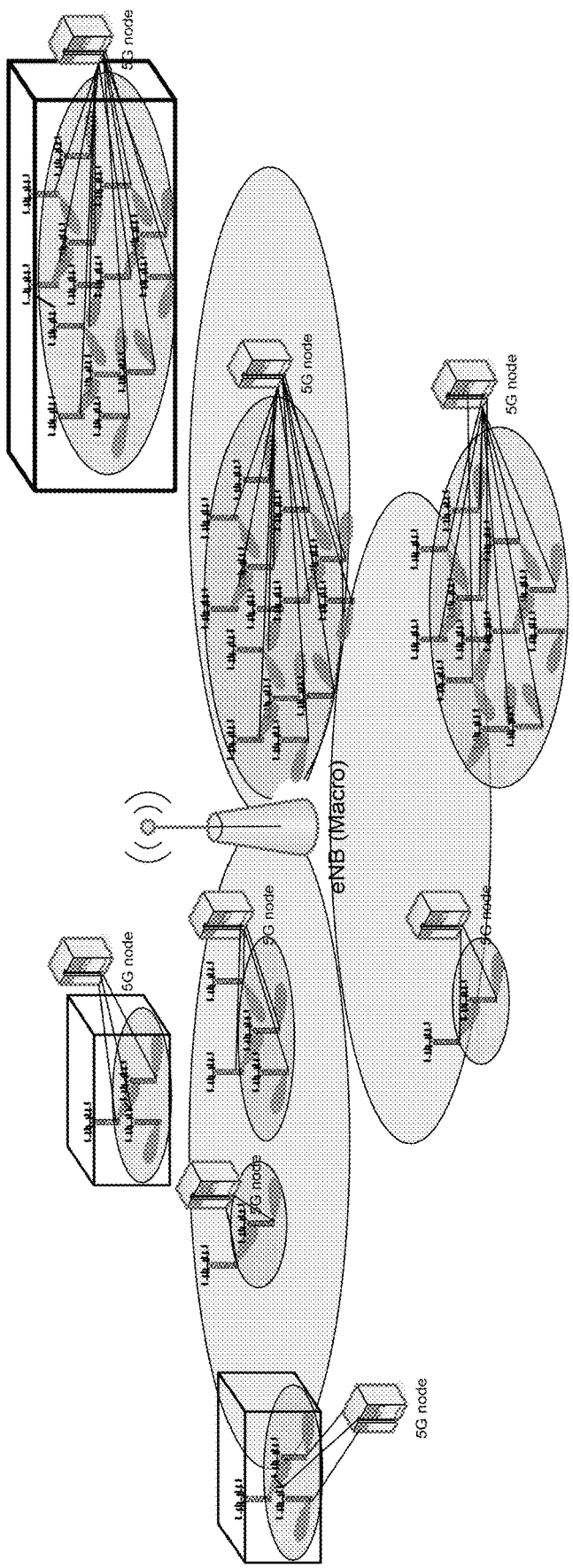
FIG. 9 shows an exemplary deployment with multiple TRP cells.
Figure 10:
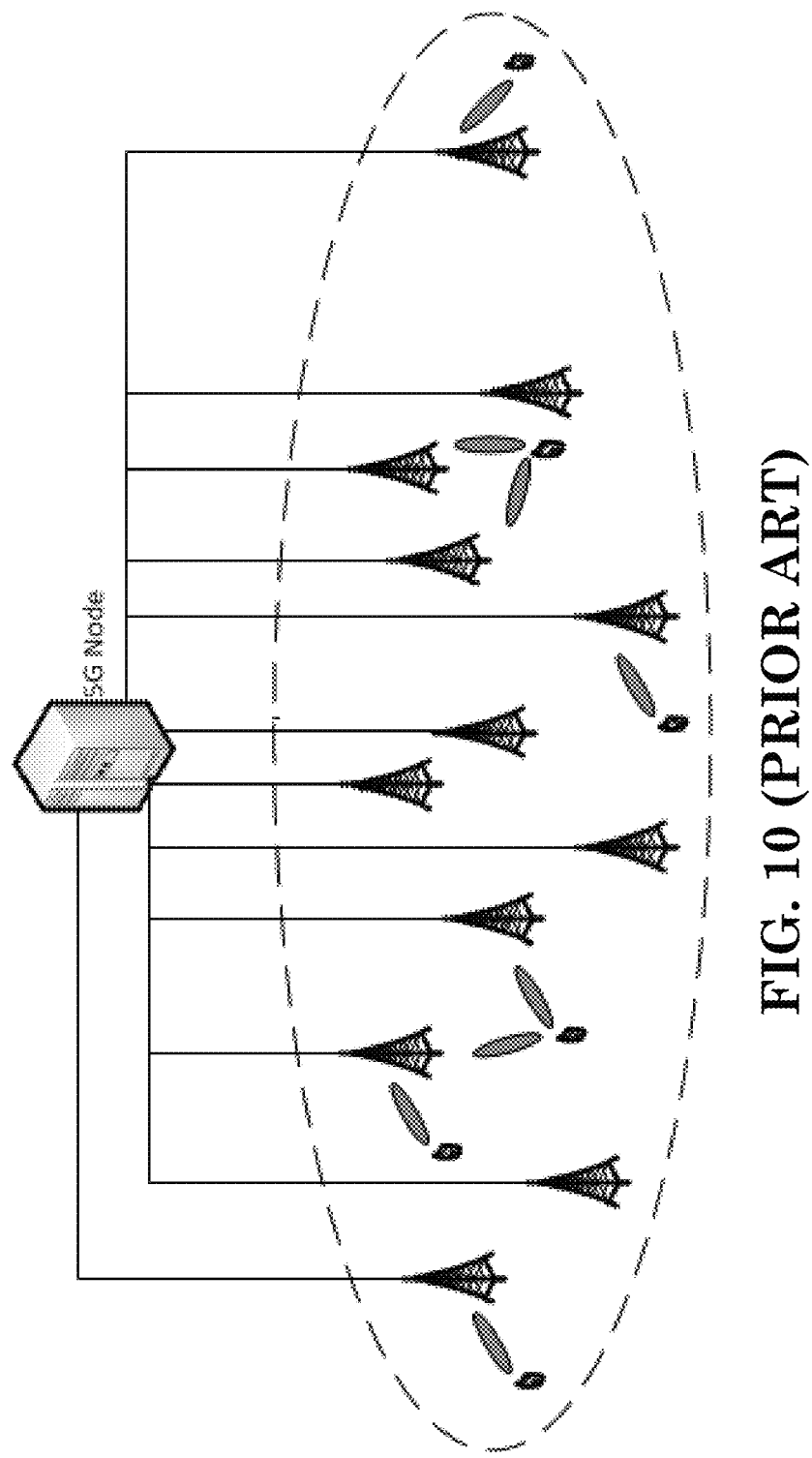
FIG. 10 shows an exemplary 5G cell comprising a 5G node with multiple TRPs.
Figure 11:
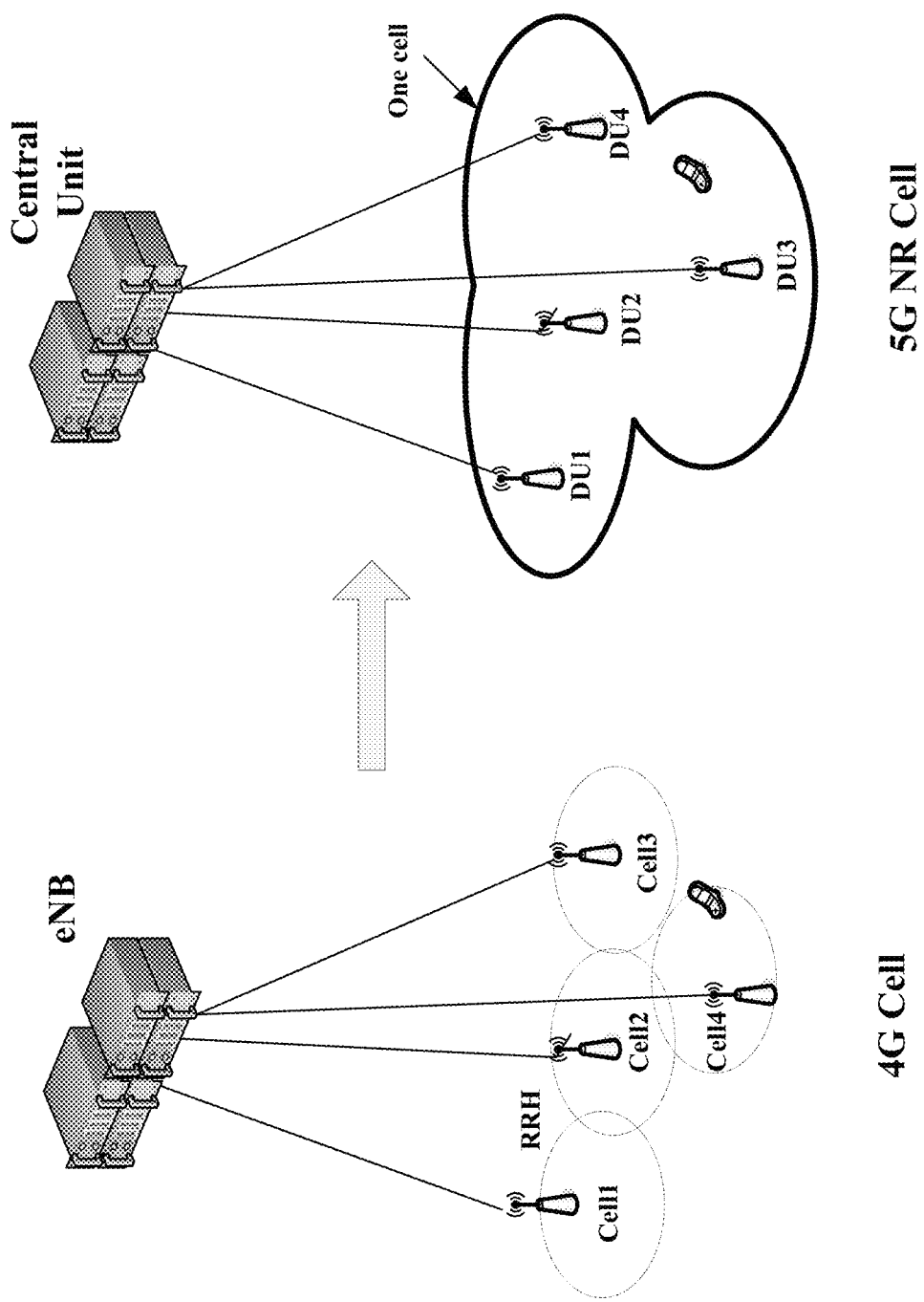
FIG. 11 an exemplary comparison between a LTE cell and a NR cell.

FIGS. 8 to 11 show some examples of the concept of a cell in 5G NR. FIG. 8 is a reproduction of a portion of FIG. 1 of 3GPP R2-163879, and shows exemplary different deployment scenarios with single TRP cell. FIG. 9 is a reproduction of a portion of FIG. 1 of 3GPP R2-163879, and shows exemplary different deployment scenarios with multiple TRP cells. FIG. 10 is a reproduction of FIG. 3 of 3GPP R2-162210, and shows an exemplary 5G cell comprising a 5G node with multiple TRPs. FIG. 11 is a reproduction of FIG. 1 of 3GPP R2-163471, and shows an exemplary comparison between a LTE cell and a NR cell.

3GPP TS 36.213 specifies the UE procedure for determining the subset of resources to be reported to higher layers in PSSCH (Physical Sidelink Shared Channel) resource selection in sidelink transmission mode 4 as follows:

14.1.1.6 UE procedure for determining the subset of resources to be reported to higher layers in PSSCH resource selection in sidelink transmission mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+T$_1$, n+T$_2$] corresponds to one candidate single-subframe resource, where selections of T$_1$ and T$_2$ are up to UE implementations under T$_1$≤4 and 20≤T$_2$≤100. UE selection of T$_2$ shall fulfil the latency requirement. The total number of the candidate single-subframe resources is denoted by $M_{total}$.

2) The UE shall monitor subframes $t_{n'-10\times P_{step}+1}^{SL}$, $t_{n'-10\times P_{step}+1}^{SL}$, $t_{n'-1}^{SL}$ except for those in which its transmissions occur, where $t_{n'}^{SL}$=n if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j \times P_{rsvp\_TX} = z + P_{step} \times k \times q$ where $j=0, 1, \ldots, C_{resel}-1$, $P'_{rsvp\_TX} = P_{step} \times P_{rsvp\_TX}/100$, k is any value allowed by the higher layer parameter restrictResourceReservationPeriod and $q=1, 2, \ldots, Q$. Here, $$Q = \frac{1}{k}$$

if $k<1$ and $n-z \leq P_{step} \times k$, where $t_n^{SL}=n$ if subframe n belongs to the set $t_0^{SL}, t_1^{SL}, \ldots, t_{T_{max}}^{SL}$, otherwise subframe $t_n^{SL}$ is the first subframe belonging to the set $t_0^{SL}, t_1^{SL}, \ldots, t_{T_{max}}^{SL}$ after subframe n; and $Q=1$ otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.
   PSSCH-RSRP measurement according to the received SCI format 1 is higher than $Th_{prio_{TX}, prio_{RX}}$.
   the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_TX}}$ for $q=1, 2, \ldots, Q$ and $j=0, 1, \ldots, C_{resel}-1$. Here, $$Q = \frac{1}{P_{rsvp\_RX}}$$

if $P_{rsvp\_RX}<1$ and $n'-m \leq P_{step} \times P_{rsvp\_RX}$, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise $Q=1$.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for $k=0, \ldots, L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

The UE shall report set $S_B$ to higher layers.

3GPP TS 36.214 specifies some measurements for sidelink transmission as follows:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC__IDLE intra-frequency,<br>RRC__IDLE inter-frequency,<br>RRC__CONNECTED intra-frequency,<br>RRC__CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC__IDLE intra-frequency,<br>RRC__IDLE inter-frequency,<br>RRC__CONNECTED intra-frequency,<br>RRC__CONNECTED inter-frequency |

NOTE:

The power per resource element is determined from the energy received during the useful part of the symbol, excluding the CP.

3GPP TS 36.212 specifies the UE procedure for sidelink transmission mode 3, which is V2X (Vehicle-to-Everything) transmission scheduled from network node, as follows:

14.1 Physical Sidelink Shared Channel related procedures 14.1.1 UE procedure for transmitting the PSSCH If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

14.1.1.4A UE procedure for determining subframes and resource blocks for transmitting PSSCH for sidelink transmission mode 3

If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C.

If the UE has a configured sidelink grant (described in [8]) for an SL SPS configuration activated by Subclause 14.2.1 and if a set of sub-channels in subframe $t_m^{SL}$ is determined as the time and frequency resource for PSSCH transmission corresponding to the configured sidelink grant (described in [8]) of the SL SPS configuration, the same set of sub-channels in subframes $t_{m+j\times P'_{SPS}}^{SL}$ are also determined for PSSCH transmissions corresponding to the same sidelink grant where j=1, 2, . . . , $P'_{SPS}=P_{step}\times P_{SPS}/100$, and $(t_0^{SL}, t_1^{SL}, t_2^{SL}, \ldots)$ is determined by Subclause 14.1.5. Here, $P_{SPS}$ is the sidelink SPS interval of the corresponding SL SPS configuration.

14.1.5 UE procedure for determining resource block pool and subframe pool for sidelink transmission mode 3 and 4

The set of subframes that may belong to a PSSCH resource pool for sidelink transmission mode 3 or 4 is denoted by $(t_0^{SL}, t_1^{SL}, \ldots, t_{T_{max}}^{SL})$ where . . .

The UE determines the set of subframes assigned to a PSSCH resource pool as follows:

A bitmap $(b_0, b_1, \ldots, b_{L_{bitmap}})$ associated with the resource pool is used where $L_{bitmap}$ the length of the bitmap is configured by higher layers.

A subframe $t_k^{SL}(0 \le k \le (10240-N_{slss}-N_{dssf}-N_{reserved}))$ belongs to the subframe pool if $b_{k'}=1$ where k'=k mod $L_{bitmap}$.

The UE determines the set of resource blocks assigned to a PSSCH resource pool as follows:

The resource block pool consists of $N_{subCH}$ sub-channels where $N_{subCH}$ is given by higher layer parameter numSubchannel.

The sub-channel m for m=0, 1, . . . , $N_{subCH}-1$ consists of a set of $n_{subCHsize}$ contiguous resource blocks with the physical resource block number $n_{PRB}=n_{subCHRBstart}+m*n_{subCHsize}+j$ for j=0, 1, . . . , $n_{subCHsize}-1$ where $n_{subCHRBstart}$ and $n_{subCHsize}$ are given by higher layer parameters startRBSubchannel and sizeSubchannel, respectively.

14.2 Physical Sidelink Control Channel related procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

[Table 14.2-2 of 3GPP TS 36.212 V15.2.1, entitled "PDCCH/EPDCCH configured by SL-V-RNTI or SL-SPS-V-RNTI", is reproduced as FIG. 13]

The carrier indicator field value in DCI format 5A corresponds to v2x-InterFreqInfo.

14.2.1 UE procedure for transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}\cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), ($t_0^{SL}$, $t_1^{SL}$, $t_2^{SL}$, . . . ) is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q|SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

3GPP TS 36.212 specifies DCI (Downlink Control Information) format 5A from network node for scheduling PSCCH (Physical Shared Control Channel) transmission on PC5 interface, and SCI (Sidelink Control Information) format 1 from UE for scheduling PSSCH transmission on PC5 interface as follows:

5.3.3.1.9A Format 5A

DCI format 5A is used for the scheduling of PSCCH, and also contains several SCI format 1 fields used for the scheduling of PSSCH.

The following information is transmitted by means of the DCI format 5A:
 Carrier indicator—3 bits. This field is present according to the definitions in [3].
 Lowest index of the subchannel allocation to the initial transmission-[$\log_2(N_{subchannel}^{SL})$] bits as defined in section 14.1.1.4C of [3].
 SCI format 1 fields according to 5.4.3.1.2:
  Frequency resource location of initial transmission and retransmission.
  Time gap between initial transmission and retransmission.
 SL index—2 bits as defined in section 14.2.1 of [3] (this field is present only for cases with TDD operation with uplink-downlink configuration 0-6).

When the format 5A CRC is scrambled with SL-SPS-V-RNTI, the following fields are present:
 SL SPS configuration index—3 bits as defined in section 14.2.1 of [3].
 Activation/release indication—1 bit as defined in section 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0.

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

5.4.3.1.2 SCI format 1

SCI format 1 is used for the scheduling of PSSCH.

The following information is transmitted by means of the SCI format 1:
 Priority—3 bits as defined in section 4.4.5.1 of [7].
 Resource reservation—4 bits as defined in section 14.2.1 of [3].
 Frequency resource location of initial transmission and retransmission—[$\log_2(N_{subchannel}^{SL}(N_{subchannel}^{SL}+1)2)$] bits as defined in section 14.1.1.4C of [3].
 Time gap between initial transmission and retransmission—4 bits as defined in section 14.1.1.4C of [3].
 Modulation and coding scheme—5 bits as defined in section 14.2.1 of [3].
 Retransmission index—1 bit as defined in section 14.2.1 of [3].
 Reserved information bits are added until the size of SCI format 1 is equal to 32 bits. The reserved bits are set to zero.

In RAN1 #94 meeting (as discussed in the Draft Report of 3GPP TSG RAN WG1 #94 v0.1.0 (Gothenburg, Sweden, 20-24 Aug. 2018), RAN1 has the following agreements about NR V2X.

Agreements:
 RAN1 to study the following topics for the SL enhancement for unicast and/or groupcast. Other topics are not precluded.
  HARQ feedback
  CSI acquisition
  Open loop and/or closed-loop power control
  Link adaptation
  Multi-antenna transmission scheme
Agreements:
 At least PSCCH and PSSCH are defined for NR V2X. PSCCH at least carries information necessary to decode PSSCH.
  Note: PSBCH will be discussed in the synchronization agenda.
 RAN1 continues study on the necessity of other channels.
 Further study on
  Whether/which sidelink feedback information is carried by PSCCH or by another channel/signal.
  Whether/which information to assist resource allocation and/or schedule UE's transmission resource(s) is carried by PSCCH or by another channel/signal.
  PSCCH format(s) and content(s) for unicast, groupcast, and broadcast
Agreements:
RAN1 to continue study on multiplexing physical channels considering at least the above aspects:
 Multiplexing of PSCCH and the associated PSSCH (here, the "associated" means that the PSCCH at least carries information necessary to decode the PSSCH).
  Study further the following options:
   Option 1: PSCCH and the associated PSSCH are transmitted using non-overlapping time resources.
    Option 1A: The frequency resources used by the two channels are the same.
    Option 1B: The frequency resources used by the two channels can be different.
   Option 2: PSCCH and the associated PSSCH are transmitted using non-overlapping frequency resources in the all the time resources used for transmission. The time resources used by the two channels are the same.
   Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:

At least two sidelink resource allocation modes are defined for NR-V2X sidelink communication
- Mode 1: Base station schedules sidelink resource(s) to be used by UE for sidelink transmission(s)
- Mode 2: UE determines (i.e. base station does not schedule) sidelink transmission resource(s) within sidelink resources configured by base station/network or pre-configured sidelink resources Notes:
- eNB control of NR sidelink and gNB control of LTE sidelink resources will be separately considered in corresponding agenda items.
- Mode-2 definition covers potential sidelink radio-layer functionality or resource allocation sub-modes (subject to further refinement including merging of some or all of them) where
  a) UE autonomously selects sidelink resource for transmission
  b) UE assists sidelink resource selection for other UE(s)
  c) UE is configured with NR configured grant (type-1 like) for sidelink transmission
  d) UE schedules sidelink transmissions of other UEs
- RAN1 to continue study details of resource allocation modes for NR-V2X sidelink communication One or multiple of following terminologies may be used hereafter:
- BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
- TRP: A transmission and reception point provides network coverage and directly communicates with UEs. TRP could also be referred to as distributed unit (DU) or network node.
- Cell: A cell is composed of one or multiple associated TRPs, i.e. coverage of the cell is composed of coverage of all associated TRP(s). One cell is controlled by one BS. Cell could also be referred to as TRP group (TRPG).
- NR-PDCCH: A channel carries downlink control signal which is used to control communication between a UE and a network side. A network transmits NR-PDCCH on configured control resource set (CORESET) to the UE.
- UL-control signal: An UL-control signal may be scheduling request(SR), channel state information(CSI), HARQ-ACK/NACK for downlink transmission
- Slot: a scheduling unit in NR. Slot duration is 14 OFDM symbols.
- Mini-slot: A scheduling unit with duration less than 14 OFDM symbols.
- Slot format information (SFI): Information of slot format of symbols in a slot. A symbol in a slot may belong to following type: downlink, uplink, unknown or other. The slot format of a slot could at least convey transmission direction of symbols in the slot.
- DL common signal: Data channel carrying common information that targets for multiple UEs in a cell or all UEs in a cell. Examples of DL common signal could be system information, paging, RAR.

One or multiple of following assumptions for network side may be used hereafter:
- Downlink timing of TRPs in the same cell are synchronized.
- RRC layer of network side is in BS.

One or multiple of following assumptions for UE side may be used hereafter:
- There are at least two UE (RRC) states: connected state (or called active state) and non-connected state (or called inactive state or idle state). Inactive state may be an additional state or belong to connected state or non-connected state.

For LTE V2X and/or P2X transmission, there are generally at least two transmission modes: one is scheduled via network, such as sidelink transmission mode 3 (as discussed in 3GPP TS 36.214); and another one is sensing-based transmission, such as sidelink transmission mode 4 (as discussed in 3GPP TS 36.214). Since the sensing-based transmission is not scheduled via network, the UE requires performing sensing before selecting a resource for transmission, in order to avoid resource collision and interference from or in other UEs.

Figure 12:
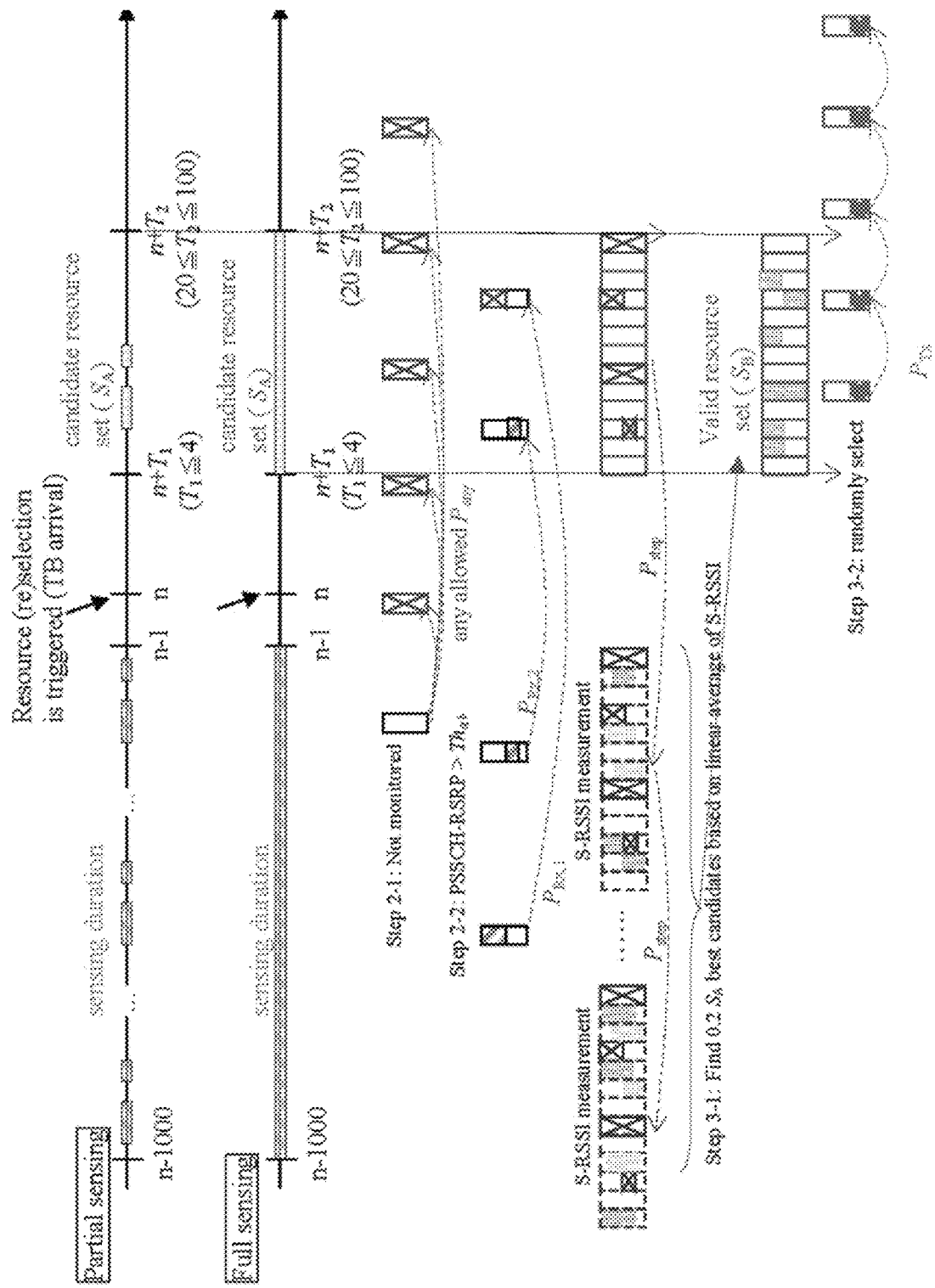
FIG. 12 is a diagram according to one exemplary embodiment.

For the sensing-based resource selection procedure, as shown in FIG. 12, the UE have a candidate resource set comprising multiple candidate resources. The available candidate resource set is restricted with time interval $[n+T_1, n+T_2]$. The restricted time interval may be different depending on whether partially sensing is configure or not. Full sensing may mean that partially sensing is not configured. In one embodiment, a candidate resource may mean one candidate single-subframe resource. One candidate resource may comprise one or multiple resource units. The resource unit may be a subchannel. In one embodiment, the resource unit may comprise multiple (physical) resource blocks in a TTI (Transmission Time Interval). The TTI may be a subframe in LTE.

Based on sensing within a sensing duration, the UE may generate a valid resource set, wherein the valid resource set is a subset of the candidate resource set. The generation of the valid resource set may be performed via excluding some candidate resources from the candidate resource set, as shown for instance in step 2-1 and step 2-2 of FIG. 12. The generation of the valid resource set may be performed via selecting some valid candidate resources, as shown for instance in step 3-1 of FIG. 12. And then, the UE may select one or some valid resources from the valid resource set to perform transmission from the UE. The valid resource selection for transmission may be randomly selected from the valid resource set, as shown for instance in step 3-2 of FIG. 12.

As discussed in 3GPP TS 36.214, the first excluding step is if the UE does not monitor/sense a TTI z, the UE cannot expect whether the candidate resources in TTI "$z+P_{any}$" are occupied or not, wherein $P_{any}$ means any possible periodicity for transmission. For instance, the first excluding step is shown as step 2-1 of FIG. 12. For the case of $P_{any} \geq 100$ ms, the UE excludes the candidate resources in TTI "$z+P_{any}$" and excludes the candidates resources for which the UE may have possible transmission occurred in TTI "$z+P_{any}$". For the case of $P_{any} < 100$ ms, the UE excludes the candidate resources in TTI "$z+q \cdot P_{any}$" and excludes the candidates resources for which the UE may have a possible transmission occurred in TTI "$z+q \cdot P_{any}$", wherein q is 1, 2, . . . , $100/P_{any}$. The parameter q means that the UE excludes multiple candidate resources with period $P_{any}$ within time interval $[z, z+100]$. The possible transmission may mean a transmission on a selected valid resource. The possible transmission may also mean a periodic transmission of a transmission on a selected valid resource. Moreover, $P_{any}$ means any possible periodicity configured by higher layer.

The second excluding step is if the UE receives/detects a control signaling in a TTI m, the UE may exclude the candidate resources according to the received control signaling. For instance, the second excluding step is shown as step 2-2 of FIG. 12. More specifically, if the UE receives or detects a control signaling scheduling a transmission in a TTI m and the measurement result of the scheduled transmission and/or the control signal is over a threshold, the UE may exclude the candidate resources according to the received control signaling. The measurement result may be RSRP. More specifically, the measurement result may be PSSCH-RSRP. The control signaling may indicate the resources of the scheduled transmission and/or periodicity of the scheduled transmission, $P_{RX}$. The excluded candidate resources according to the received control signaling are the resources of next one scheduled transmission based on the resources of the scheduled transmission and periodicity of the scheduled transmission, such as for the case of $P_{RX}>=100$ ms. Moreover, the excluded candidate resources according to the received control signaling are the resources of next multiple scheduled transmissions based on the resources of the scheduled transmission and periodicity of the scheduled transmission, such as for the case of $P_{RX}<100$ ms. The next multiple scheduled transmissions may be with period $P_{RX}$ within time interval [m, m+100]. If the control signaling indicates that there is no next scheduled transmission or the control signaling indicates that the resource of scheduled transmission is not kept in next time or the control signaling indicates that the scheduled transmission is the last transmission from the UE transmitting the control signaling or the control signaling indicates that the periodicity of the scheduled transmission is indicated as zero, the UE may not exclude candidate resources according to the received control signaling.

After the first excluding step and the second excluding step, the UE may select some valid candidate resources from the remaining candidate resources, such as step 3-1 shown in FIG. 12. The UE may measure resources in the sensing duration, wherein the measured resources are associated with the remaining candidate resources after step 2-1 and step 2-2 of FIG. 12. More specifically, for a remaining candidate resource, the associated measured resources in the sensing duration are in the occasions with multiple times of a time period from the remaining candidate resources. For instance, if the time period is 100 TTIs, the associated measured resources in the sensing duration are in the TTI "n-j·100", j is positive integer, for a remaining candidate resource in TTI n.

Moreover, the associated measured resources in the sensing duration are with the same frequency resources as the remaining candidate resource. More specifically, the measurement is S-RSSI measurement. Based on the measurement, the UE can derive metric for each remaining candidate resource. The metric for a remaining candidate resource may be linear average of S-RSSI measured from its associated measured resources in the sensing duration. And then, the UE may select valid candidate resources based on the metric of each remaining candidate resource.

In one embodiment, an action could be a remaining candidate resource with the smallest metric is selected as valid candidate resource and moved into a valid resource set. The action is repeated until the UE selects a number of remaining candidate resources as valid candidate resources and moves the number of remaining candidate resources into the valid resource set. For instance, the number is larger than or equal to 20% of total candidate resources. The number is larger than or equal to 20% of cardinality of the candidate resource set.

Based on the current (partially) sensing procedure, the UE can determine the valid resource set. The valid resource set may be reported to higher layers for transmission from the UE. The UE may select one or some valid resources from the valid resource set to perform transmission from the UE. The transmission from the UE may be PSSCH transmission. The transmission from the UE may be sidelink transmission. In one embodiment, the transmission from the UE may be device-to-device transmission.

In NR V2X, at least two sidelink resource allocation modes are defined for NR-V2X sidelink communication. Mode 1 is that base station can schedule sidelink resource(s) to be used by UE for sidelink transmission(s). Mode 2 is that UE determines (i.e. base station does not schedule) sidelink transmission resource(s) within sidelink resources configured by base station/network or pre-configured sidelink resources. Mode 3 in LTE V2X may be a start point or basis for study mode 1 in NR V2X. Mode 4 in LTE V2X may be a start point or basis for study mode 2 in NR V2X.

Moreover, NR V2X has requirement of high reliability and high throughput requirement. Thus, it is considered to support HARQ (Hybrid Automatic Repeat Request) feedback for unicast and/or groupcast. It means that a transmitting device transmits a sidelink data transmission to a receiving device, and then the receiving device may transmit HARQ feedback to the transmitting device. If the HARQ feedback is ACK, it may mean the receiving device receives and decodes the sidelink data transmission successfully.

When the transmitting device receives the HARQ feedback as ACK, the transmitting device may transmit another new sidelink data transmission to the receiving device. If the HARQ feedback is NACK, it may mean the receiving device does not receive and decode the sidelink data transmission successfully. When the transmitting device receives the HARQ feedback as NACK, the transmitting device may retransmit the sidelink data transmission to the receiving device. Since the sidelink data retransmission carries the same data packet as the sidelink data transmission, the receiving device may combine the sidelink data transmission and sidelink data retransmission and then perform decoding for the data packet. The combining can increase possibility of decoding successfully.

However, how to perform the HARQ feedback transmission is not clear. Also, the resource for HARQ feedback transmission needs some design, since both the transmitting device and the receiving device should have the same understanding about the resource for HARQ feedback transmission. The following methods are some methods to derive feedback resource for sidelink transmission or reception.

I. Method a

The general concept of Method a is that a sidelink feedback resource may be associated with a sidelink control resource and/or sidelink data resource. The association may be known by devices comprising a transmitting device and a receiving device. The association may be (pre)configured or specified. In one embodiment, the sidelink feedback resource may be derived based on the sidelink control resource and/or the sidelink data resource. There may be no explicit indication, in a sidelink control information, for the sidelink feedback resource. There may be no field in the sidelink control information for indicating the sidelink feedback resource.

More specifically, given the association, when the transmitting device transmits or delivers a sidelink control information in sidelink control transmission on the sidelink control resource and performs sidelink data transmission on the sidelink data resource, the transmitting device will monitor or receive the associated sidelink feedback resource for acquiring feedback information. Furthermore, given the association, when the receiving device receives the sidelink control information on the sidelink control resource and receives the sidelink data transmission on the sidelink data resource, the receiving device may deliver feedback information in feedback transmission on the associated sidelink feedback resource.

In one embodiment, the sidelink control information may allocate or indicate the sidelink data resource. The receiving device may deliver feedback information in the feedback transmission on the sidelink feedback resource based on whether data delivered in the sidelink data transmission is decoded successfully or not. The feedback information may be positive acknowledgment or ACK, which may mean successful reception or decoding of data transmission. The feedback information may also be non-positive acknowledgment or NACK, which may mean non-successful reception or decoding of data transmission.

In one embodiment, if the transmitting device performs N sidelink data transmissions, for delivering the same data, on N sidelink data resources respectively, there may be N associated sidelink feedback resources. N may be a integer larger than or equal to one. In one embodiment, the receiving device may deliver feedback information in feedback transmission(s) in the N associated sidelink feedback resources. The receiving device may deliver feedback information in feedback transmission(s) in part of the N associated sidelink feedback resources (even though the receiving device may receive the N sidelink data transmissions).

In one example, the transmitting device could perform 4 sidelink data transmissions for delivering the same data. If the receiving device decodes the data successfully via two of the 4 sidelink data transmissions (the receiving device does not decode the data successfully via one of the 4 sidelink data transmissions), the receiving device may deliver positive acknowledgement (e.g. ACK) in feedback transmissions in the first and second sidelink feedback resources of the 4 associated sidelink feedback resources. Alternatively, the receiving device may deliver non-positive acknowledgement (e.g. NACK) in feedback transmissions in the first sidelink feedback resource of the 4 associated sidelink feedback resources and deliver positive acknowledgement (e.g. ACK) in feedback transmissions in the second sidelink feedback resources of the 4 associated sidelink feedback resources.

In one embodiment, the receiving device may not perform feedback transmission in the third and fourth sidelink feedback resources of the 4 associated sidelink feedback resources. Alternatively, the receiving device may deliver positive acknowledgement (e.g. ACK) in feedback transmission in the third and fourth sidelink feedback resources of the 4 associated sidelink feedback resources. If the receiving device decodes the data successfully via one of the 4 sidelink data transmissions, the receiving device may deliver positive acknowledgement (e.g. ACK) in feedback transmissions in the first sidelink feedback resource of the 4 associated sidelink feedback resources. In one embodiment, the receiving device may not perform feedback transmission in the second, third and fourth sidelink feedback resources of the 4 associated sidelink feedback resources. Alternatively, the receiving device may deliver positive acknowledgement (e.g. ACK) in feedback transmission in the second, third and fourth sidelink feedback resources of the 4 associated sidelink feedback resources. If the receiving device does not decode the data successfully via the 4 sidelink data transmissions, the receiving device may deliver non-positive acknowledgement (e.g. NACK) in feedback transmissions in the 4 associated sidelink feedback resources.

If the sidelink data resource and/or the sidelink control resource are scheduled/allocated by base station, e.g. mode 1 in NR V2X and/or mode 3 in LTE V2X, the base station does not need to explicitly indicate the associated sidelink feedback resource. Since the transmitting device and the receiving device can derive the sidelink feedback resource based on the sidelink control resource and/or the sidelink data resource. In one embodiment, the base station may transmit a downlink control information to indicate the sidelink data resource and/or the sidelink control resource. The downlink control information may not indicate the sidelink feedback resource.

If the sidelink data resource and/or the sidelink control resource are determined by device (i.e. base station does not schedule), e.g. mode 2 in NR V2X and/or mode 4 in LTE V2X, the transmitting device may perform sensing procedure on a sidelink data resource pool for determining the sidelink data resource based on the sensing result of the sidelink data resource pool. In one embodiment, the transmitting device may perform sensing procedure on a sidelink control resource pool for determining the sidelink control resource based on the sensing result of the sidelink control resource pool. The transmitting device may not perform sensing procedure on a sidelink feedback resource pool for determining the sidelink feedback resource.

Alternatively, the transmitting device may perform sensing procedure on a sidelink feedback resource pool for determining the sidelink feedback resource or ensuring the associated feedback resource is available or clear. The receiving device may not perform sensing procedure on the sidelink feedback resource pool for determining the sidelink feedback resource. The transmitting device and the receiving device could derive the sidelink feedback resource based on the determined sidelink control resource and/or the determined sidelink data resource. The sidelink feedback transmission resource transmitted by the receiving device could be reserved or occupied by the transmitting device. The transmitting device could reserve or occupy the sidelink feedback transmission resource in response of determining or occupying the sidelink control resource and/or the sidelink data resource. In one embodiment, the sidelink data resource pool may be pre-configured, or may be configured by base station or network. Furthermore, the sidelink control resource pool may be pre-configured, or may be configured by base station/network. In addition, the sidelink feedback resource pool may be pre-configured, or may be configured by base station or network.

In one embodiment, the sidelink data transmission may be unicast transmission. The data delivered in the sidelink data transmission could be for a specific receiving device. The specific receiving device may deliver feedback information in the feedback transmission on the sidelink feedback resource based on whether data delivered in the sidelink data transmission is decoded successfully or not.

In one embodiment, the transmitting device may monitor or receive the sidelink feedback resources for determining one of at least three possible feedback information as follows:

1. First Feedback Information—The receiving device could receive and decode the data delivered in the sidelink data transmission successfully, e.g. ACK;
2. Second Feedback Information—the receiving device may not decode the data delivered in the sidelink data transmission successfully, e.g. NACK; and
3. Third Feedback Information—the receiving device does not receive the sidelink control information (successfully), e.g. DTX.

In one embodiment, the transmitting device may determine First Feedback Information (discussed above) in response to receiving positive acknowledgement from the feedback transmission on the sidelink feedback resource. Furthermore, the transmitting device may determine Second Feedback Information (discussed above) in response to receiving non-positive acknowledgement from the feedback transmission on the sidelink feedback resource. In addition, the transmitting device may determine Third Feedback Information (discussed above) in response to not receiving feedback transmission on the sidelink feedback resource.

In one embodiment, the transmitting device may perform sidelink new data transmission and/or sidelink data retransmission for the receiving device depending on the feedback information. Furthermore, the transmitting device may not perform sidelink data retransmission for the data delivered in the sidelink data transmission in response to First Feedback Information (discussed above). In addition, the transmitting device may perform sidelink new data transmission in response to First Feedback Information (discussed above). Also, the transmitting device may perform sidelink data retransmission for the data delivered in the sidelink data transmission in response to Second Feedback Information and/or Third Feedback Information.

In one embodiment, the transmitting device may adjust transmission parameters of sidelink data retransmission and/or sidelink new data transmission for the receiving device depending on the feedback information. In particular, transmission parameters may comprise modulation and coding scheme (MCS) and/or transmit power. The transmitting device may not set lower MCS in response to the First Feedback Information. Furthermore, the transmitting device may not increase transmit power in response to the First Feeback Information. The transmitting device may set lower MCS in response to the Second Feedback Information and/or the Third Feedback Information. The transmitting device may also increase transmit power in response to the Second Feedback Information and/or the Third Feedback Information.

In one embodiment, comparing to adjusted MCS in response to feedback information, it may be that adjusted MCS in response to First Feedback Information to adjusted MCS in response to Second Feedback Information adjusted MCS in response Third Feedback Information.

In one embodiment, comparing to adjusted transmit power in response to feedback information, it may be that adjusted transmit power in response to First Feedback Information≤adjusted transmit power in response to Second Feedback Information≤adjusted transmit power in response to Third Feedback Information.

In one embodiment, the sidelink data transmission may be groupcast and/or broadcast transmission. The data delivered in the sidelink data transmission may be received by more than one receiving devices. In particular, the data delivered in the sidelink data transmission may be for a set of receiving devices in a same group, and each receiving device of the set may transmit feedback transmission on the sidelink feedback resource, based on whether data delivered in the sidelink data transmission is decoded successfully or not. There are three possible feedback behaviors as follows:

Feedback Behavior 1—In one embodiment, each receiving device of the set may deliver positive acknowledgment in feedback transmission on the sidelink feedback resource in response of successful reception or decoding of data transmission. Furthermore, each receiving device of the set may deliver non-positive acknowledgment in feedback transmission on the sidelink feedback resource in response of non-successful reception or decoding of data transmission.

In one embodiment, the transmitting device may monitor/receive the associated sidelink feedback resource for determining one of at least three possible feedback conditions as follows:
1. First Feedback Condition—At least part of the set of receiving devices receives and decodes the data delivered in the sidelink data transmission successfully, e.g. ACK for at least part of the set of receiving devices.
2. Second Feedback Condition—At least part of the set of receiving devices does not decode the data delivered in the sidelink data transmission successfully, e.g. NACK for at least part of the set of receiving devices.
3. Third Feedback Condition—The set of receiving devices does not receive the sidelink control information (successfully), e.g. DTX for the set of receiving devices.

In one embodiment, the transmitting device may determine the First Feedback Condition in response to receiving positive acknowledgement from the feedback transmission on the sidelink feedback resource. Furthermore, the transmitting device may determine the Second Feedback Condition in response to receiving non-positive acknowledgement from the feedback transmission on the sidelink feedback resource. In addition, the transmitting device may determine the Third Feedback Condition in response to not receiving feedback transmission on the sidelink feedback resources.

In one embodiment, the transmitting device may perform sidelink new data transmission and/or sidelink data retransmission for the receiving device depending on the feedback conditions. The transmitting device may not perform sidelink data retransmission for the data delivered in the sidelink data transmission in response to the First Feedback Condition. However, the transmitting device may perform sidelink new data transmission in response to the First Feedback Condition. Furthermore, the transmitting device may perform sidelink data retransmission for the data delivered in the sidelink data transmission in response to the Second Feedback Condition and/or the Third Feedback Condition.

In one embodiment, the transmitting device may adjust transmission parameters of sidelink data retransmission and/or sidelink new data transmission for the receiving device depending on the feedback conditions. Transmission parameters may comprise any of modulation and coding scheme (MCS) and/or transmit power. In one embodiment, the transmitting device may not set lower MCS in response to the First Feedback Condition. The transmitting device may not increase transmit power in response to the First Feedback Condition. The transmitting device may set lower MCS in response to the Second Feedback Condition and/or the Third Feedback Condition. The transmitting device may also increase transmit power in response to the Second Feedback Condition and/or the Third Feedback Condition.

In one embodiment, comparing to adjusted MCS in response of feedback conditions, it may be that adjusted MCS in response to the First Feedback Condition adjusted MCS in response to the Second Feedback Condition adjusted MCS in response to the Third Feedback Condition.

In one embodiment, comparing to adjusted transmit power in response of feedback conditions, it may be that adjusted transmit power in response to the First Feedback Condition≤adjusted transmit power in response to the Second Feedback Condition≤adjusted transmit power in response to the Third Feedback Condition.

Feedback Behavior 2—In one embodiment, each receiving device of the set may perform feedback transmission (with positive acknowledgment) on the sidelink feedback resource in response of successful reception or decoding of data transmission, and does not perform feedback transmission on the sidelink feedback resource in response of non-successful reception or decoding of data transmission.

In one embodiment, the transmitting device may monitor or receive the associated sidelink feedback resource for determining one of at least two following possible feedback conditions:
1. First Feedback Condition—At least part of the set of receiving devices receives and decodes the data delivered in the sidelink data transmission successfully, e.g. ACK for at least part of the set of receiving devices.
2. Second Feedback Condition—The set of receiving devices does not decode the data delivered in the sidelink data transmission successfully or does not receive the sidelink control information (successfully), e.g. NACK or DTX for the set of receiving devices.

In one embodiment, the transmitting device may determine the First Feedback Condition in response to receiving the feedback transmission (with positive acknowledgement) on the sidelink feedback resource. Furthermore, the transmitting device may determine the Second Feedback Condition in response to not receiving feedback transmission on the sidelink feedback resources.

In one embodiment, the transmitting device may perform sidelink new data transmission and/or sidelink data retransmission for the receiving device depending on the feedback conditions. The transmitting device may not perform sidelink data retransmission for the data delivered in the sidelink data transmission in response to the First Feedback Condition and/or the receiving power of the feedback transmission is larger than or equal to a threshold. Alternatively, the transmitting device may perform sidelink new data transmission in response to the First Feedback Condition and/or the receiving power of the feedback transmission is larger than or equal to a threshold. In addition, the transmitting device may perform sidelink data retransmission for the data delivered in the sidelink data transmission in response to the First Feedback Condition and/or the receiving power of the feedback transmission is lower than or equal to a threshold. Furthermore, the transmitting device may perform sidelink data retransmission for the data delivered in the sidelink data transmission in response to the Second Feedback Condition.

In one embodiment, the transmitting device may adjust transmission parameters of sidelink data retransmission and/or sidelink new data transmission for the receiving device depending on the feedback conditions. Transmission parameters may comprise any of modulation and coding scheme (MCS), and transmit power. The transmitting device may not set lower MCS in response to the First Feedback Condition and/or the receiving power of the feedback transmission is larger than or equal to a threshold. Furthermore, the transmitting device may not increase transmit power in response to the First Feedback Condition and/or the receiving power of the feedback transmission is larger than or equal to a threshold.

In one embodiment, the transmitting device may set lower MCS in response to the First Feedback Condition and/or the receiving power of the feedback transmission is lower than or equal to a threshold. The transmitting device may also increase transmit power in response to the First Feedback Condition and/or the receiving power of the feedback transmission is lower than or equal to a threshold. Furthermore, the transmitting device may set lower MCS in response to the Second Feedback Condition. The transmitting device may also increase transmit power in response to the Second Feedback Condition.

In one embodiment, comparing to adjusted MCS in response of feedback conditions, it may be that adjusted MCS in response to the First Feedback Condition and/or the receiving power of the feedback transmission is larger than or equal to a threshold≥adjusted MCS in response to the First Feedback Condition and/or the receiving power of the feedback transmission is lower than or equal to a threshold≥adjusted MCS in response to the Second Feedback Condition.

In one embodiment, comparing to adjusted transmit power in response of feedback conditions, it may be that adjusted transmit power in response to the First Feedback Condition and/or the receiving power of the feedback transmission is larger than or equal to a threshold≤adjusted transmit power in response to the First Feedback Condition and/or the receiving power of the feedback transmission is lower than or equal to a threshold≤adjusted transmit power in response to the Second Feedback Condition.

Feedback Behavior 3—In one embodiment, each receiving device of the set may perform feedback transmission (with non-positive acknowledgment) on the sidelink feedback resource in response of non-successful reception or decoding of data transmission, and does not perform feedback transmission on the sidelink feedback resource in response of successful reception or decoding of data transmission.

In one embodiment, the transmitting device may monitor or receive the associated sidelink feedback resource for determining one of at least two following possible feedback conditions:
1. First Feedback Condition—At least part of the set of receiving devices does not receive and decode the data delivered in the sidelink data transmission successfully, e.g. NACK for at least part of the set of receiving devices.
2. Second Feedback Condition—The set of receiving devices may decode the data delivered in the sidelink data transmission successfully, e.g. ACK for the set of receiving devices.

In one embodiment, the transmitting device may determine the First Feedback Condition in response to receiving the feedback transmission (with non-positive acknowledgement) on the sidelink feedback resource. Furthermore, the transmitting device may determine the Second Feedback Condition in response to not receiving feedback transmission on the sidelink feedback resources.

In one embodiment, the transmitting device may perform sidelink new data transmission and/or sidelink data retransmission for the receiving device depending on the feedback conditions. The transmitting device may not perform sidelink data retransmission for the data delivered in the sidelink data transmission in response to the Second Feedback Condition. The transmitting device may also perform sidelink new data transmission for the data delivered in the sidelink data transmission in response to the Second Feedback Condition.

In one embodiment, the transmitting device may perform sidelink data retransmission for the data delivered in the sidelink data transmission in response to the First Feedback Condition and/or the receiving power of the feedback transmission is larger than or equal to a threshold. The transmitting device may also perform sidelink new data transmission in response to the First Feedback Condition and/or the receiving power of the feedback transmission is lower than or equal to a threshold. Alternatively, the transmitting device may not perform sidelink data retransmission for the data delivered in the sidelink data transmission in response the First Feedback Condition and/or the receiving power of the feedback transmission is lower than or equal to a threshold.

In one embodiment, the transmitting device may adjust transmission parameters of sidelink data retransmission and/or sidelink new data transmission for the receiving device depending on the feedback conditions. Transmission parameters may comprise any of modulation and coding scheme (MCS), and transmit power. The transmitting device may not set lower MCS in response the First Feedback Condition and/or the receiving power of the feedback transmission is lower than or equal to a threshold. Furthermore, the transmitting device may not increase transmit power in response the First Feedback Condition and/or the receiving power of the feedback transmission is lower than or equal to a threshold.

In one embodiment, the transmitting device may set lower MCS in response the First Feedback Condition and/or the receiving power of the feedback transmission is higher than or equal to a threshold. The transmitting device may also increase transmit power in response the First Feedback Condition and/or the receiving power of the feedback transmission is higher than or equal to a threshold. Furthermore, the transmitting device may not set lower MCS in response to the Second Feedback Condition. The transmitting device may not increase transmit power in response to the Second Feedback Condition.

In one embodiment, comparing to adjusted MCS in response of feedback conditions, it may be that adjusted MCS in response to the First Feedback Condition and/or the receiving power of the feedback transmission is larger than or equal to a threshold≤adjusted MCS in response to the First Feedback Condition and/or the receiving power of the feedback transmission is lower than or equal to a threshold≤adjusted MCS in response to the Second Feedback Condition.

In one embodiment, comparing to adjusted transmit power in response of feedback conditions, it may be that adjusted transmit power in response to the First Feedback Condition and/or the receiving power of the feedback transmission is larger than or equal to a threshold≥adjusted transmit power in response to the First Feedback Condition and/or the receiving power of the feedback transmission is lower than or equal to a threshold≥adjusted transmit power in response to the Second Feedback Condition.

II. Method b

The general concept of Method b is that a sidelink feedback resource may be associated with a sidelink control resource and/or sidelink data resource. The association may be indicated via a sidelink control information. In one embodiment, the sidelink feedback resource may be indicated via the sidelink control information. A field in the sidelink control information may indicate the sidelink feedback resource. Furthermore, the sidelink control information may be transmitted on a sidelink control resource. The sidelink control information may allocate or indicate a sidelink data resource for a sidelink data transmission.

In one embodiment, the association between the sidelink feedback resource and the sidelink control resource and/or the sidelink data resource may be indicated via the sidelink control information. More specifically, the sidelink feedback resource may not be derived based on the sidelink control resource and/or the sidelink data resource. The sidelink feedback resource may be derived based on indication of the sidelink control information. The sidelink feedback resource may also be derived based on indication of the sidelink control information, the sidelink control resource, and/or the sidelink data resource.

More specifically, when the transmitting device transmits or delivers the sidelink control information with sidelink feedback resource indication in sidelink transmission on the sidelink control resource and performs sidelink data transmission on the sidelink data resource, the transmitting device may monitor or receive the indicated sidelink feedback resource for acquiring feedback information. Furthermore, when the receiving device receives the sidelink control information on the sidelink control resource and receives sidelink data transmission on the sidelink data resource, the receiving device may deliver feedback information in feedback transmission on the sidelink feedback resource indicated by the sidelink control information.

In one embodiment, if the transmitting device performs N sidelink data transmissions, for delivering the same data, on N sidelink data resources respectively, the N sidelink control informations for scheduling the N sidelink data transmissions respectively may indicate the same one sidelink feedback resource. N may be a integer larger than or equal to one.

If the sidelink data resource and/or the sidelink control resource are scheduled or allocated by base station (e.g. mode 1 in NR V2X and/or mode 3 in LTE V2X), the base station may indicate the sidelink feedback resource. In one embodiment, the base station may transmit a downlink control information to indicate the sidelink data resource and/or the sidelink control resource. The downlink control information may indicate the sidelink feedback resource.

If the sidelink data resource and/or the sidelink control resource are determined by device (i.e. base station does not schedule), e.g. mode 2 in NR V2X and/or mode 4 in LTE V2X, the transmitting device may perform sensing procedure on a sidelink data resource pool for determining the sidelink data resource based on the sensing result of the sidelink data resource pool. In one embodiment, the transmitting device may perform sensing procedure on a sidelink control resource pool for determining the sidelink control resource based on the sensing result of the sidelink control resource pool. The transmitting device may also perform sensing procedure on a sidelink feedback resource pool for determining the sidelink feedback resource based on the sensing result of the sidelink feedback resource pool.

In one embodiment, the receiving device may not perform sensing procedure on the sidelink feedback resource pool for determining the sidelink feedback resource since the receiving device can derive the sidelink feedback resource based on the sidelink feedback resource indication in the sidelink control information. In other words, the sidelink feedback transmission resource transmitted by the receiving device may be reserved or occupied by the transmitting device. The transmitting device may reserve or occupies the sidelink feedback transmission resource in response of performing sensing on the sidelink control resource pool.

In one embodiment, the sidelink data resource pool may be pre-configured or may be configured by base station or network. The sidelink control resource pool may also be pre-configured or may be configured by base station or network. Furthermore, the sidelink feedback resource pool may be pre-configured or may be configured by base station or network.

III. Method c

The general concept of Method c is that at least two sidelink feedback resources may be associated with a sidelink control resource and/or sidelink data resource. In one embodiment, one sidelink feedback resource may be utilized for delivering positive acknowledgment or ACK, and the other sidelink feedback resource may be utilized for delivering non-positive acknowledgment or NACK. Furthermore, one sidelink feedback resource may be utilized to indicate successful reception or decoding of data transmission, and the other sidelink feedback resource may be utilized to indicate non-successful reception/decoding of data transmission.

In one example, the association may be known by devices comprising a transmitting device and a receiving device. The association may be (pre)configured or specified. The at least two sidelink feedback resources may be derived based on the sidelink control resource and/or the sidelink data resource. In one embodiment, there may be no explicit indication, in a sidelink control information, for the at least two sidelink feedback resources. Furthermore, there may be no field in the sidelink control information for indicating the at least two sidelink feedback resources.

In one example, the association may be indicated via a sidelink control information. In one embodiment, a field in the sidelink control information may indicate the at least two sidelink feedback resources. The sidelink control information may be transmitted on the sidelink control resource. Furthermore, the sidelink control information may allocate or indicate the sidelink data resource for a sidelink data transmission. The at least two sidelink feedback resources may be derived based on indication of the sidelink control information. In addition, the at least two sidelink feedback resource may be derived based on indication of the sidelink control information, the sidelink control resource, and/or the sidelink data resource.

More specifically, given the association, when the transmitting device transmits or delivers the sidelink control information in sidelink control transmission on the sidelink control resource and performs sidelink data transmission on the sidelink data resource, the transmitting device may monitor or receive the associated at least two sidelink feedback resources for acquiring feedback information. Furthermore, given the association, when the receiving device receives the sidelink control information on the sidelink control resource and receives the sidelink data transmission on the sidelink data resource, the receiving device may deliver feedback information in feedback transmission on one of the associated at least two sidelink feedback resources, based on whether the sidelink data transmission is decoded successfully or not. In one embodiment, the sidelink control information may allocate or indicate the sidelink data resource.

In one embodiment, if the transmitting device performs N sidelink data transmissions, for delivering the same data, on N sidelink data resources respectively, there may be N (set) of the associated at least two sidelink feedback resource. N may be an integer larger than or equal to one. In one embodiment, the receiving device may deliver feedback information in feedback transmission(s) in the N associated sidelink feedback resources. Furthermore, the receiving device may deliver feedback information in feedback transmission(s) in part of the N (set) of associated at least two sidelink feedback resources (even though the receiving device may receive the N sidelink data transmissions).

In one embodiment, if the transmitting device performs N sidelink data transmissions, for delivering the same data, on N sidelink data resources respectively, there may be one (set) of the associated at least two sidelink feedback resource. N may be an integer larger than or equal to one.

In one example, the sidelink data resource and/or the sidelink control resource may be scheduled/allocated by base station, e.g. mode 1 in NR V2X and/or mode 3 in LTE V2X. The base station may not explicitly indicate the associated at least two sidelink feedback resources. The transmitting device and the receiving device may derive the at least two sidelink feedback resources based on the sidelink control resource and/or the sidelink data resource. Furthermore, the base station may transmit a downlink control information to indicate the sidelink data resource and/or the sidelink control resource. The downlink control information may not indicate the sidelink feedback resource.

In one example, the sidelink data resource and/or the sidelink control resource may be scheduled or allocated by base station, e.g. mode 1 in NR V2X and/or mode 3 in LTE V2X. The base station may indicate the associated at least two sidelink feedback resources. Furthermore, the base station may transmit a downlink control information to indicate the sidelink data resource and/or the sidelink control resource. The downlink control information may indicate the at least two sidelink feedback resources.

In one example, the sidelink data resource and/or the sidelink control resource are determined by device (i.e. base station does not schedule), e.g. mode 2 in NR V2X and/or mode 4 in LTE V2X. The transmitting device may perform sensing procedure on a sidelink data resource pool for determining the sidelink data resource based on the sensing result of the sidelink data resource pool. The transmitting device may also perform sensing procedure on a sidelink control resource pool for determining the sidelink control resource based on the sensing result of the sidelink control resource pool.

In one embodiment, the transmitting device does not perform sensing procedure on a sidelink feedback resource pool for determining the associated at least two sidelink feedback resources. However, the transmitting device may perform sensing procedure on a sidelink feedback resource pool for ensuring the associated at least two feedback resources are available or clear. Alternatively, the transmitting device may perform sensing procedure on a sidelink feedback resource pool for determining the at least two sidelink control resources based on the sensing result of the sidelink feedback resource pool. Furthermore, the receiving device may not perform sensing procedure on the sidelink feedback resource pool for determining the at least two sidelink feedback resources since the receiving device can derive the at least two sidelink feedback resources based on the sidelink feedback resource indication in the sidelink control information, and/or the determined sidelink control resource and/or the determined sidelink data resource.

In other words, the at least two sidelink feedback transmission resources transmitted by the receiving device may be reserved or occupied by the transmitting device. The transmitting device may reserve or occupy the sidelink feedback transmission resource in response to determining or occupying the sidelink control resource and/or the sidelink data resource. Alternatively, the transmitting device may reserve or occupy the sidelink feedback transmission resource in response to performing sensing on the sidelink control resource pool.

In one embodiment, the sidelink data resource pool may be pre-configured or may be configured by base station or network. Furthermore, the sidelink control resource pool may be pre-configured or may be configured by base station or network. In addition, the sidelink feedback resource pool may be pre-configured or may be configured by base station or network.

In one embodiment, the sidelink data transmission may be unicast transmission. The data delivered in the sidelink data transmission may be for a specific receiving device. The specific receiving device may transmit feedback transmission on one of the associated at least two sidelink feedback resources, based on whether data delivered in the sidelink data transmission is decoded successfully or not.

In one embodiment, the transmitting device may monitor or receive the associated at least two sidelink feedback resources for determining one of at least three following possible feedback information:
1. First Feedback Information—The receiving device receives and decodes the data delivered in the sidelink data transmission successfully, e.g. ACK.
2. Second Feedback Information—The receiving device does not decode the data delivered in the sidelink data transmission successfully, e.g. NACK.
3. Third Feedback Information—The receiving device does not receive the sidelink control information (successfully), e.g. DTX.

In one embodiment, the transmitting device may determine the First Feedback Information in response to receiving feedback transmission on the first associated sidelink feedback resource (and not receiving feedback transmission on the second associated sidelink feedback resource). Furthermore, the transmitting device may determine the Second Feedback Information in response to receiving feedback transmission on the second associated sidelink feedback resource (and not receiving feedback transmission on the first associated sidelink feedback resource). In addition, the transmitting device may determine the Third Feedback Information in response to not receiving feedback transmission on both of the associated sidelink feedback resources.

In one embodiment, the transmitting device may perform sidelink new data transmission and/or sidelink data retransmission for the receiving device depending on the feedback information. The transmitting device may not perform sidelink data retransmission for the data delivered in the sidelink data transmission in response to the First Feedback Information. The transmitting device may perform sidelink new data transmission in response to the First Feedback Information. Furthermore, the transmitting device may perform sidelink data retransmission for the data delivered in the sidelink data transmission in response to the Second Feedback Information and/or the Third Feedback Information.

In one embodiment, the transmitting device may adjust transmission parameters of sidelink data retransmission and/or sidelink new data transmission for the receiving device depending on the feedback information. Transmission parameters may comprise any of modulation and coding scheme (MCS), and transmit power. The transmitting device may not set lower MCS in response to the First Feedback Information. The transmitting device may not increase transmit power in response to the First Feedback Information. Furthermore, the transmitting device may set lower MCS in response to the Second Feedback Information and/or the Third Feedback Information. The transmitting device may increase transmit power in response to the Second Feedback Information and/or the Third Feedback Information.

In one embodiment, comparing to adjusted MCS in response to feedback information, it may be that adjusted MCS in response to the First Feedback Information≥adjusted MCS in response to the Second Feedback Information≥adjusted MCS in response to the Third Feedback Information.

In one embodiment, comparing to adjusted transmit power in response to feedback information, it may be that adjusted transmit power in response of to the First Feedback Information≤adjusted transmit power in response to the Second Feedback Information≤adjusted transmit power in response to the Third Feedback Information.

In one embodiment, the sidelink data transmission may be groupcast and/or broadcast transmission. The data delivered in the sidelink data transmission may be received by more than one receiving devices. Furthermore, the data delivered in the sidelink data transmission may be for a set of receiving devices in a same group. Each receiving device of the set may transmit feedback transmission on one of the associated feedback resources, based on whether data delivered in the sidelink data transmission is decoded successfully or not.

In one embodiment, the transmitting device may monitor or receive the associated at least two sidelink feedback resources for determining one of at least four following possible feedback conditions:
1. First Feedback Condition—The set of receiving devices receives and decodes the data delivered in the sidelink data transmission successfully, e.g. ACK for (all) the set of receiving devices.
2. Second Feedback Condition—The set of receiving devices does not decode the data delivered in the sidelink data transmission successfully, e.g. NACK for (all) the set of receiving devices.
3. Third Feedback Condition—Part of the set of receiving devices receives and decodes the data delivered in the sidelink data transmission successfully and part of the set of receiving devices does not decode the data delivered in the sidelink data transmission successfully, e.g. ACK for part the set of receiving devices and NACK for part of the set of receiving devices.
4. Fourth Feedback Condition—The set of receiving devices does not receive the sidelink control information (successfully), e.g. DTX for (all) the set of receiving devices.

In one embodiment, the transmitting device may determine the First Feedback Condition in response to receiving feedback transmission on the first associated sidelink feedback resource and not receiving feedback transmission on the second sidelink feedback resource. Furthermore, the transmitting device may determine the Second Feedback Condition in response of receiving feedback transmission on the second associated sidelink feedback resource and not receiving feedback transmission on the first associated sidelink feedback resource. In addition, the transmitting device may determine the Third Feedback Condition in response to receiving feedback transmission on both associated sidelink feedback resources. Also, the transmitting device may determine the Fourth Feedback Condition in response to not receiving feedback transmission on both associated two sidelink feedback resources.

In one embodiment, the transmitting device may perform sidelink new data transmission and/or sidelink data retransmission for the set of the receiving devices depending on the feedback condition. The transmitting device may not perform sidelink data retransmission for the data delivered in the sidelink data transmission in response to the First Feedback Condition. The transmitting device may perform sidelink new data transmission in response to the First Feedback Condition. Furthermore, the transmitting device may perform sidelink data retransmission for the data delivered in the sidelink data transmission in response to the First Feedback Condition, the Second Feedback Condition, the Third Feedback Condition, and/or the to the Fourth Feedback Condition. In addition, the transmitting device may perform sidelink data retransmission for the data delivered in the sidelink data transmission in response to the Second Feedback Condition and/or the Fourth Feedback Condition. Also, the transmitting device may perform sidelink data retransmission for the data delivered in the sidelink data transmission in response to the Third Feedback Condition if the transmitting device detects that the receiving power on the first associated sidelink feedback resource is smaller than or equal to the receiving power on the second associated sidelink feedback resource. Additionally, the transmitting device may not perform sidelink data retransmission for the data delivered in the sidelink data transmission in response to the Third Feedback Condition if the transmitting device detects that the receiving power on the first associated sidelink feedback resource is larger than or equal to the receiving power on the second associated sidelink feedback resource.

In one embodiment, the transmitting device may adjust transmission parameters of sidelink data retransmission and/or sidelink new data transmission for the set of the receiving devices depending on the feedback condition. Transmission parameters may comprise any of modulation and coding scheme (MCS), and transmit power. In one embodiment, the transmitting device may not set lower MCS in response to the First Feedback Condition. The transmitting device may not increase transmit power in response to the First Feedback Condition. Furthermore, the transmitting device may set lower MCS in response to the Second Feedback Condition and/or the Fourth Feedback Condition. The transmitting device may also increase transmit power in response to the Second Feedback Condition and/or the Fourth Feedback Condition. Furthermore, the transmitting device may lower the MCS in response to the Third Feedback Condition. The degree or level of lowered MCS may be depending on the receiving power difference between the feedback transmissions on the first and second associated sidelink feedback resources. In addition, the transmitting device may increase transmit power in response to the Third Feedback Condition. The degree/level of increased transmit power may depend on the receiving power differences between the feedback transmissions on the first and second associated sidelink feedback resources.

In one embodiment, comparing to adjusted MCS in response of feedback conditions, it may be that adjusted MCS in response to the First Feedback Condition adjusted MCS in response to the Third Feedback Condition with higher receiving power on the first associated sidelink feedback resource≥adjusted MCS in response to the Third Feedback Condition with higher receiving power on the second associated sidelink feedback resource≥adjusted MCS in response to the Second Feedback Condition adjusted MCS in response to the Fourth Feedback Condition.

In one embodiment, comparing to adjusted transmit power in response of feedback conditions, it may be that adjusted transmit power in response the First Feedback Condition≤adjusted transmit power in response to the Third Feedback Condition with higher receiving power on the first associated sidelink feedback resource≤adjusted transmit power in response to the Third Feedback Condition with higher receiving power on the second associated sidelink feedback resource≤adjusted transmit power in response to the Second Feedback Condition≤adjusted transmit power in response to the Fourth Feedback Condition.

IV. Method d

The general concept of Method d is that multiple sidelink feedback resources may be associated with a sidelink control resource and/or sidelink data resource. Each sidelink feedback resource may be utilized by a receiving device for delivering feedback information. In one embodiment, different receiving devices may utilize different sidelink feedback resources for delivering feedback information. A receiving device may deliver positive acknowledgment or ACK to indicate successful reception or decoding of the sidelink data transmission. Furthermore, the receiving device may deliver non-positive acknowledgment or NACK to indicate non-successful reception or decoding of the sidelink data transmission.

In one example, the association may be known by devices comprising a transmitting device and multiple receiving devices. The association may be (pre)configured or specified. In one embodiment, the multiple sidelink feedback resources may be derived based on the sidelink control resource and/or the sidelink data resource. Furthermore, the multiple sidelink feedback resources may be derived based on the sidelink control resource, the sidelink data resource, and/or an identity of the receiving device. There may be no explicit indication, in a sidelink control information, for indicating sidelink feedback resource. Also, there may be no field in the sidelink control information for indicating sidelink feedback resource.

In one example, the association may be indicated via a sidelink control information. A field in the sidelink control information may indicate the sidelink feedback resource. The sidelink control information may be transmitted on the sidelink control resource. Furthermore, the sidelink control information may allocate or indicate the sidelink data resource for a sidelink data transmission. In addition, the sidelink feedback resource may be derived based on indication of the sidelink control information. Also, the sidelink feedback resource may be derived based on indication of the sidelink control information and/or an identity of the receiving device.

In one embodiment, the resource may be derived based on indication of the sidelink control information, the sidelink control resource, and/or the sidelink data resource. The resource may also be derived based on indication of the sidelink control information, the sidelink control resource, the sidelink data resource, and/or an identity of the receiving device.

More specifically, given the association, when the transmitting device transmits or delivers the sidelink control information in sidelink control transmission on the sidelink control resource and performs sidelink data transmission on the sidelink data resource, the transmitting device could monitor or receive the associated multiple sidelink feedback resources for acquiring feedback information from multiple receiving devices. In one embodiment, the feedback information delivered in feedback transmission in an associated sidelink feedback resource may reflect whether the sidelink data transmission is decoded successfully or not by a receiving device. The feedback information delivered in feedback transmission in two distinct sidelink feedback resources may reflect whether the sidelink data transmission is decoded successfully or not by two distinct receiving devices. More specifically, given the association, when the receiving device receives the sidelink control information on the sidelink control resource and receives the sidelink data transmission on the sidelink data resource, the receiving device may deliver feedback information in feedback transmission on an associated sidelink feedback resource, based on whether the sidelink data transmission is decoded successfully or not by the receiving device. In one embodiment, the sidelink control information may allocate or indicate the sidelink data resource.

In one embodiment, if the transmitting device performs N sidelink data transmissions, for delivering the same data, on N sidelink data resources respectively, there may be N (set) of sidelink feedback resources. N may be a integer larger than or equal to one. In one embodiment, the receiving device may deliver feedback information in feedback transmission(s) in N sidelink feedback resources, wherein each one of the N sidelink feedback resources is within one of the N (set) of th associated sidelink feedback resources. The receiving device may deliver feedback information in feedback transmission(s) in part of the N sidelink feedback resources (even though the receiving device may receive the N sidelink data transmissions).

In one embodiment, if the transmitting device performs N sidelink data transmissions, for delivering the same data, on N sidelink data resources respectively, there may be one (set) of associated sidelink feedback resources. N may be a integer larger than or equal to one.

In one example, the sidelink data resource and/or the sidelink control resource may be scheduled or allocated by base station, e.g. mode 1 in NR V2X and/or mode 3 in LTE V2X. In one embodiment, the base station may not explicitly indicate the associated multiple sidelink feedback resources. The transmitting device and the receiving device may derive the multiple sidelink feedback resources based on the sidelink control resource and/or the sidelink data resource. The base station may transmit a downlink control information to indicate the sidelink data resource and/or the sidelink control resource. The downlink control information may not indicate the sidelink feedback resource.

In one example, the sidelink data resource and/or the sidelink control resource may be scheduled or allocated by base station, e.g. mode 1 in NR V2X and/or mode 3 in LTE V2X. In one embodiment, the base station may indicate the associated multiple sidelink feedback resources. The base station may also transmit a downlink control information to indicate the sidelink data resource and/or the sidelink control resource. The downlink control information may indicate the multiple sidelink feedback resources.

In one example, the sidelink data resource and/or the sidelink control resource may be determined by device (i.e. base station does not schedule), e.g. mode 2 in NR V2X and/or mode 4 in LTE V2X. The transmitting device may perform sensing procedure on a sidelink data resource pool for determining the sidelink data resource based on the sensing result of the sidelink data resource pool. The transmitting device may perform sensing procedure on a sidelink control resource pool for determining the sidelink control resource based on the sensing result of the sidelink control resource pool. The transmitting device may not perform sensing procedure on a sidelink feedback resource pool for determining the sidelink feedback resources. Furthermore, the transmitting device may perform sensing procedure on a sidelink feedback resource pool for ensuring the multiple feedback resources are available or clear. Alternatively, the transmitting device may perform sensing procedure on a sidelink feedback resource pool for determining the sidelink control resources based on the sensing result of the sidelink feedback resource pool. The receiving device may not perform sensing procedure on the sidelink feedback resource pool for determining the associated sidelink feedback resource since the receiving device can derive the sidelink feedback resource based on the sidelink feedback resource indication in the sidelink control information, the determined sidelink control resource, the determined sidelink data resource, and/or the identity of the receiving device. In other words, the sidelink feedback transmission resources transmitted by the multiple receiving devices could be reserved or occupied by the transmitting device. The transmitting device may reserve or occupy the sidelink feedback transmission resources in response of determining or occupying the sidelink control resource and/or the sidelink data resource.

Alternatively, the transmitting device may reserve or occupy the sidelink feedback transmission resources in response of performing sensing on the sidelink control resource pool. The sidelink data resource pool may be pre-configured or may be configured by base station or network. Furthermore, the sidelink control resource pool may be pre-configured and may be configured by base station or network. In addition, the sidelink feedback resource pool may be pre-configured or may be configured by base station or network.

In one embodiment, the sidelink data transmission may be groupcast and/or broadcast transmission. The data delivered in the sidelink data transmission may be received by more than one receiving devices. Furthermore, the data delivered in the sidelink data transmission may be for a set of receiving devices in a same group. Each receiving device of the set may transmit feedback transmission on one of the multiple sidelink feedback resources, based on whether data delivered in the sidelink data transmission is decoded successfully or not by the receiving device. The transmitting device may monitor or receive the multiple sidelink feedback resources for acquire the feedback information of the receiving devices. Furthermore, the transmitting device may monitor or receive one of the multiple sidelink feedback resources for acquire the feedback information of one of the receiving devices.

In one embodiment, the transmitting device may monitor or receive the sidelink feedback resources for determining one of at least three following possible feedback information for each sidelink feedback resource:
1. First Feedback Information—The receiving device receives and decodes the data delivered in the sidelink data transmission successfully, e.g. ACK.
2. Second Feedback Information—The receiving device does not decode the data delivered in the sidelink data transmission successfully, e.g. NACK.
3. Third Feedback Information—The receiving device does not receive the sidelink control information (successfully), e.g. DTX.

In one embodiment, the transmitting device may determine the First Feedback Information in response to receiving feedback transmission on one of the sidelink feedback resources. Furthermore, the transmitting device may determine the Second Feedback Information in response to receiving feedback transmission on one of the sidelink feedback resources. In addition, the transmitting device may determine the Third Feedback Information in response to not receiving feedback transmission on one of the sidelink feedback resources.

In one embodiment, the transmitting device may perform sidelink new data transmission and/or sidelink data retransmission for the receiving devices depending on the feedback information. The transmitting device may not perform sidelink data retransmission for the data delivered in the sidelink data transmission in response to the First Feedback Information. The transmitting device may perform sidelink new data transmission in response to the First Feedback Information. Furthermore, the transmitting device may perform sidelink data retransmission for the data delivered in the sidelink data transmission to a receiving device in response to the First Feedback Information of the receiving device. In one embodiment, the sidelink data retransmission may be groupcast and/or broadcast transmission.

In one embodiment, the transmitting device may perform sidelink data retransmission for the data delivered in the sidelink data transmission in response to the Second Feedback Information and/or the Third Feedback Information. In addition, the transmitting device may perform sidelink data retransmission for the data delivered in the sidelink data transmission to a receiving device in response to the Second Feedback Information and/or the Third Feedback Information of the receiving device. In one embodiment, the sidelink data retransmission may be unicast transmission to the receiving device. Furthermore, the sidelink data retransmission may be groupcast and/or broadcast transmission. In one embodiment, the transmitting device may perform sidelink new data transmission and/or sidelink data retransmission for the receiving devices if feedback transmission on at least a ratio or a number of feedback resources delivers the Second Feedback Information and/or the Third Feedback Information.

For instance, there are 11 devices in a same group. When a transmitting device transmits or delivers a sidelink control information in sidelink control transmission on a sidelink control resource and performs a sidelink data transmission on the sidelink data resource, the transmitting device could monitor or receive the associated 10 sidelink feedback resources for acquiring feedback information from the 10 receiving devices. The transmission device and the 10 receiving devices could be in the same group.

If the transmitting device monitors or receives the 10 sidelink feedback resources and acquires 6 NACK and/or DTX, the transmitting device may perform sidelink data retransmission. Furthermore, if the transmitting device monitors or receives the 10 sidelink feedback resources and acquires 2 NACK and/or DTX, the transmitting device may not perform sidelink data retransmission and may perform sidelink new data transmission. If the transmitting device monitors or receives the 10 sidelink feedback resources and acquires 4 ACKs, the transmitting device may perform sidelink data retransmission. Furthermore, if the transmitting device monitors/receives the 10 sidelink feedback resources and acquires 8 ACKs, the transmitting device may not perform sidelink data retransmission and may perform sidelink new data transmission.

In one embodiment, the transmitting device may adjust transmission parameters of sidelink data retransmission and/or sidelink new data transmission for the receiving device depending on the feedback information. Transmission parameters may comprise any of modulation and coding scheme (MCS), and transmit power. The transmitting device may not set lower MCS in response to the First Feedback Information. The transmitting device may not increase transmit power in response to the First Feedback Information. Furthermore, the transmitting device may set lower MCS in response to the Second Feedback Information and/or the Third Feedback Information. The transmitting device may increase transmit power in response to the Second Feedback Information and/or the Third Feedback Information.

In one embodiment, the transmitting device may adjust transmission parameters of sidelink data retransmission and/or sidelink new data transmission for the multiple receiving devices if feedback transmission on at least a ratio or a number of feedback resources delivers the Second Feedback Information and/or the Third Feedback Information. If there are more Second Feedback Information and/or Third Feedback Information, a lower MCS and/or a higher transmit power may be set. If there are less First Feedback Information, a lower MCS and/or a higher transmit power may be set.

For instance, there are 11 devices in a same group. When a transmitting device transmits or delivers a sidelink control information in sidelink control transmission on a sidelink control resource and performs a sidelink data transmission on the sidelink data resource, the transmitting device could monitor or receive the associated 10 sidelink feedback resources for acquiring feedback information from the 10 receiving devices. The transmission device and the 10 receiving devices could be in the same group.

If the transmitting device monitors or receives the 10 sidelink feedback resources and acquires 6 NACK and/or DTX, the transmitting device may lower the MCS by 2 levels or increase the transmit power by 5 dB. If the transmitting device monitors or receives the 10 sidelink feedback resources and acquires 2 NACK and/or DTX, the transmitting device may lower the MCS by 1 level or increase the transmit power by 3 dB. If the transmitting device monitors or receives the 10 sidelink feedback resources and acquires 0 NACK and/or DTX, the transmitting device may not adjust MCS or may not increase transmit power. If the transmitting device monitors/receives the 10 sidelink feedback resources and acquires 4 ACKs, the transmitting device may lower the MCS by 2 levels or increase the transmit power by 5 dB. If the transmitting device monitors or receives the 10 sidelink feedback resources and acquires 8 ACKs, the transmitting device may lower the MCS by 1 level or increase the transmit power by 3 dB. If the transmitting device monitors or receives the 10 sidelink feedback resources and acquires 10 ACKs, the transmitting device may not adjust MCS or may not increase transmit power.

V. Applicable to all Methods and Embodiments Discussed Above

The association between a sidelink feedback resource and a sidelink control resource may mean a fixed or configured or specified time difference (in TTI units) between the sidelink feedback resource and the sidelink control resource. Furthermore, the association between a sidelink feedback resource and a sidelink data resource may mean a fixed or configured or specified time difference (in TTI units) between the sidelink feedback resource and the sidelink data resource. In addition, the association between a sidelink feedback resource and an indication of a sidelink control information may mean the time difference (in TTI units) between the sidelink feedback resource and the sidelink control resource is indicated by the indication of the sidelink control information. Also, the sidelink feedback resource derived based on indication of the sidelink control information may mean that the time difference (in TTI units) between the sidelink feedback resource and the sidelink control resource is indicated by the indication of the sidelink control information.

In one embodiment, the association between a sidelink feedback resource and an indication of a sidelink control information may mean the time difference, (in TTI units) between the sidelink feedback resource and the sidelink data resource could be indicated by the sidelink control information. The sidelink feedback resource derived based on indication of the sidelink control information may mean that the time difference (in TTI units) between the sidelink feedback resource and the sidelink data resource could be indicated by the sidelink control information. The sidelink feedback resource derived based on an identity of the receiving device may mean that the time difference (in TTI units) between the sidelink feedback resource and the sidelink control resource could be indicated or derived by the identity of the receiving device. In one embodiment, the TTI may mean slot, minislot, subframe, symbol, a set of symbols, or mini-seconds.

In one embodiment, the association between a sidelink feedback resource and a sidelink control resource may mean a fixed or configured or specified frequency resource (index) difference (in frequency resource units) between the sidelink feedback resource and the sidelink control resource. Furthermore, the association between a sidelink feedback resource and a sidelink data resource may mean a fixed or configured or specified frequency resource (index) difference (in frequency resource units) between the sidelink feedback resource and the sidelink data resource. In addition, the association between a sidelink feedback resource and an indication of a sidelink control information may mean the frequency resource (index) difference (in frequency resource units) between the sidelink feedback resource and the sidelink control resource is indicated by the sidelink control information. In one embodiment, the sidelink feedback resource derived based on indication of the sidelink control information may mean that the frequency resource (index) difference (in frequency resource units) between the sidelink feedback resource and the sidelink control resource is indicated by the sidelink control information.

In one embodiment, the association between a sidelink feedback resource and an indication of a sidelink control information may mean the frequency resource (index) difference (in frequency resource units) between the sidelink feedback resource and the sidelink data resource is indicated by the sidelink control information. Furthermore, the sidelink feedback resource derived based on indication of the sidelink control information may mean that the frequency resource (index) difference (in frequency resource units) between the sidelink feedback resource and the sidelink data resource is indicated by the sidelink control information.

In one embodiment, the sidelink feedback resource derived based on an identity of the receiving device may mean that the frequency resource (index) difference (in frequency resource units) between the sidelink feedback resource and the sidelink control resource is indicated or derived by the identity of the receiving device. Furthermore, the sidelink feedback resource derived based on an identity of the receiving device may mean that the frequency resource (index) difference (in frequency resource units) between the sidelink feedback resource and the sidelink data resource is indicated or derived by the identity of the receiving device. In one embodiment, the frequency resource unit may be a subchannel, a (physical) resource element, a (physical) resource block, or a set of (physical) resource blocks.

In one embodiment, the association between a sidelink feedback resource and a sidelink control resource may mean a fixed or configured or specified resource (index) difference between a sidelink feedback resource index and the sidelink control resource index. Furthermore, the association between a sidelink feedback resource and a sidelink data resource may mean a fixed or configured or specified resource (index) difference between the sidelink feedback resource index and the sidelink data resource index. In addition, the association between a sidelink feedback resource and an indication of a sidelink control information may mean the resource (index) difference between the sidelink feedback resource index and the sidelink control resource index is indicated by the sidelink control information. In one embodiment, the sidelink feedback resource derived based on indication of the sidelink control information may mean that the resource (index) difference between the sidelink feedback resource index and the sidelink control resource index is indicated by the sidelink control information.

In one embodiment, the association between a sidelink feedback resource and an indication of a sidelink control information may mean the resource (index) difference between the sidelink feedback resource index and the sidelink data resource index is indicated by the sidelink control information. Furthermore, the sidelink feedback resource derived based on indication of the sidelink control information may mean that the resource (index) difference between the sidelink feedback resource index and the sidelink data resource index is indicated by the sidelink control information.

In one embodiment, the association between a sidelink feedback resource and an indication of a sidelink control information may mean the sidelink control information indicates the resource (index) of the sidelink feedback resource. The sidelink feedback resource derived based on indication of the sidelink control information may mean the sidelink control information indicates the resource (index) of the sidelink feedback resource.

In one embodiment, the sidelink feedback resource derived based on an identity of the receiving device may mean that the resource (index) difference between the sidelink feedback resource index and the sidelink control resource index is indicated or derived by the identity of the receiving device. Furthermore, the sidelink feedback resource derived based on an identity of the receiving device may mean that the resource (index) difference between the sidelink feedback resource index and the sidelink data resource index is indicated or derived by the identity of the receiving device.

In one embodiment, the sidelink data resource index may mean subchannel index. The subchannel index could be the index of the lowest subchannel comprised in the sidelink data resource. Furthermore, the sidelink data resource index may mean resource block index. The resource block index could be the index of the lowest resource block comprised in the sidelink data resource.

In one embodiment, the sidelink control resource index may mean subchannel index. The subchannel index could be the index of the lowest subchannel comprised in the sidelink control resource. The subchannel index could also be the index of the subchannel comprising the sidelink control resource.

In one embodiment, the sidelink control resource index may mean resource block index. The resource block index could be the index of the lowest resource block comprised in the sidelink control resource. The resource block index could also be the index of the resource block comprising the sidelink control resource. Alternatively, the sidelink control resource index may mean CCE index. The resource block index could be the index of the lowest CCE comprised in the sidelink control resource.

In one embodiment, the sidelink feedback resource index may mean subchannel index. The subchannel index could be the index of the lowest subchannel comprised in the sidelink feedback resource. The block index could the index of the subchannel comprising the sidelink feedback resource. Alternatively, the sidelink feedback resource index may mean resource block index. The resource block index could be the index of the lowest resource block comprised in the sidelink feedback resource. The resource block index could also be the index of the resource block comprising the sidelink feedback resource.

In one embodiment, the identity of the receiving device may mean destination identity. The identity of the receiving device may be utilized to indicate which receiving device receives the sidelink control or data information. Furthermore, the identity of the receiving device may be an offset or a value configured for the receiving device. In addition, the identity of the receiving device may be utilized for deriving sidelink feedback resource.

In one embodiment, the transmitting device may perform sensing procedure on a sidelink feedback resource pool for determining the sidelink feedback resource may mean that the transmitting device may perform sensing procedure on a candidate set of sidelink feedback resources in the sidelink feedback resource pool for determining the sidelink feedback resource. The candidate set of sidelink feedback resources may be determined or derived based on the associated sidelink control resource and/or sidelink data resource. Furthermore, the candidate set of sidelink feedback resources may comprise a fixed or configure or specified number of sidelink feedback resources. More specifically, the candidate set of sidelink feedback resources may comprise 4 or 6 or 8 sidelink feedback resources.

In one embodiment, successful reception or decoding of the sidelink data transmission may mean that the CRC check of the sidelink data transmission is passed. Non-successful reception or decoding of the sidelink data transmission may mean that the CRC check of the sidelink data transmission is not passed.

In one embodiment, the data may mean a MAC PDU or a data packet. Furthermore, the data may be delivered on SL-SCH. However, the data may not be delivered on DL-SCH or UL-SCH. In addition, the data may be transmitted on PSSCH. However, the data may not be transmitted on PDSCH or PUSCH.

In one embodiment, the sidelink feedback transmission may mean PSCCH. Furthermore, the sidelink data transmission may mean PSSCH. In addition, the sidelink control information may mean neither downlink control information nor uplink control information. The sidelink control information may be transmitted or delivered on PSCCH. However, the sidelink control information may not be transmitted or delivered on PDCCH or PUCCH. In one embodiment, the sidelink control transmission may mean PSCCH. The sidelink control transmission may not be transmitted on PDCCH or PUCCH.

In one embodiment, the sensing procedure may comprise the device receiving a transmission, and the device excluding the (time and frequency) candidate resources associated with the received transmission. The excluded candidate resources associated with the received transmission may mean that the candidate resources are expected to be utilized by a device which transmits the received transmission.

In one embodiment, the sensing procedure may comprise the device performing energy sensing to derive metric for candidate resources. The device may exclude the candidate resources with larger metric. The device may select the candidate resources with smaller metric as valid candidate resources. The candidate resources with larger metric may mean the metric of the candidate resources is larger than metric of a percentage of total candidate resources. The candidate resources with smaller metric may mean the metric of the candidate resources is smaller than metric of a percentage of total candidate resources.

In one embodiment, the energy sensing may mean that the device performs RSSI measurement. The metric may mean a RSSI or a linear average of measured RSSI. The metric for a candidate resource may mean a linear average of RSSI measured from associated resources of the candidate resource.

In one embodiment, the sidelink control, data, or feedback transmission or reception may be device-to-device transmission or reception, V2X transmission or reception, or P2X transmission or reception. Furthermore, the sidelink control, data, or feedback transmission or reception may be on PC5 interface.

In one embodiment, the PC5 interface may be wireless interface for communication between device and device, wireless interface for communication between devices, wireless interface for communication between UEs, or wireless interface for V2X or P2X communication. The Uu interface may be wireless interface for communication between network node and device, or wireless interface for communication between network node and UE.

In one embodiment, the device may be a UE. The device may also be a vehicle UE or a V2X UE. The base station may be a network node, a network node type RSU, or a gNB. The MCS may reflect coding rate. A lower MCS may mean lower coding rate.

Figure 14:
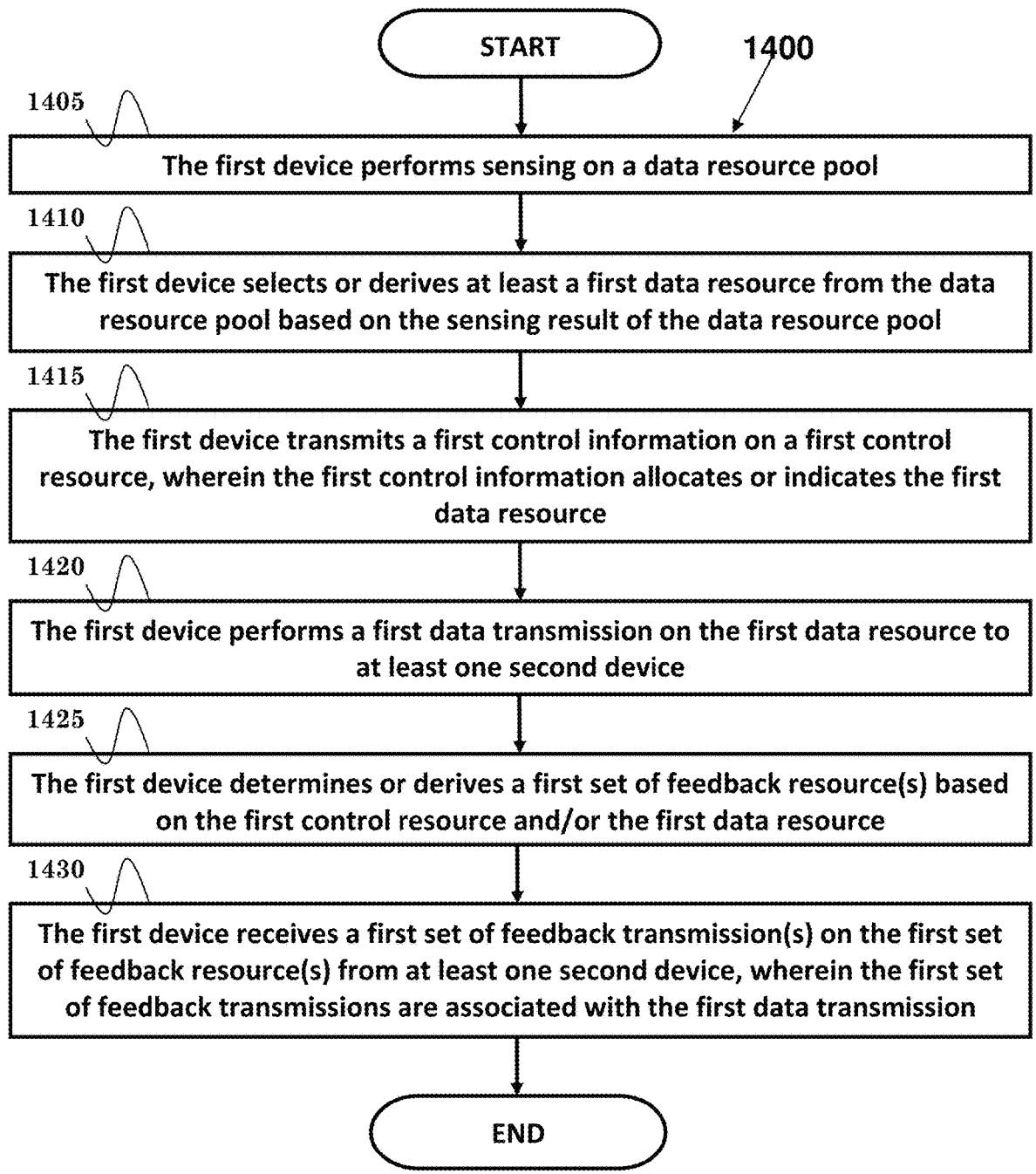
FIG. 14 is a flow chart according to one exemplary embodiment.

FIG. 14 is a flow chart 1400 according to one exemplary embodiment from the perspective of a first device. In step 1405, the first device performs sensing on a data resource pool. In step 1410, the first device selects or derives at least a first data resource from the data resource pool based on the sensing result of the data resource pool. In step 1415, the first device transmits a first control information on a first control resource, wherein the first control information allocates or indicates the first data resource. In step 1420, the first device performs a first data transmission on the first data resource to at least one second device. In step 1425, the first device determines or derives a first set of feedback resource(s) based on the first control resource and/or the first data resource. In step 1430, the first device receives a first set of feedback transmission(s) on the first set of feedback resource(s) from at least the one second device, wherein the first set of feedback transmissions are associated with the first data transmission.

In one embodiment, for determining or deriving the first set of feedback resource(s), the first device may not perform sensing on a candidate set of feedback resources, wherein the candidate set of feedback resources comprises the first set of feedback resource(s). The first device could determine or derive the first set of feedback resource(s) from the candidate set of feedback resources without basing on sensing result of the candidate set of feedback resources.

In one embodiment, when the first data transmission is unicast transmission (to a second device), the first set of feedback resource(s) may mean a first feedback resource, and the first set of feedback transmission(s) may mean a first feedback transmission. The first device could determine or derive the first feedback resource based on the first control resource, the first data resource, and/or an identity of the second device.

In one embodiment, when the first data transmission is groupcast transmission (to a sidelink group comprising at least the second device), (each) one of the first set of feedback transmissions, on (each) one of the first set of feedback resources, delivers feedback information from one device (within the sidelink group). The first device could determine or derive (each) one of the first set of feedback resources, based on the first control resource, the first data resource, and/or an identity of (each) one device (within the sidelink group).

In one embodiment, the resource association, in time domain and/or frequency domain, between the first set of feedback resource(s) and the first control resource, and/or the first data resource could be (pre)configured or specified. The first control information may include no field for indicating the first set of feedback resource(s).

In one embodiment, the first device could receive a second control information on a second control resource, wherein the second control information allocates or indicates a second data resource. The first device could also receive a second data transmission on the second data resource. Furthermore, the first device could determine or derive a second feedback resource based on the second control resource and/or the second data resource. In addition, the first device could transmit a second feedback transmission associated to the second data transmission on the second feedback resource.

In one embodiment, for determining or deriving the second feedback resource, the first device may not perform sensing on a candidate set of feedback resources, wherein the candidate set of feedback resources comprises the second feedback resource. However, the first device may determine or derive the second feedback resource from the candidate set of feedback resources without basing on sensing result of the candidate set of feedback resources.

In one embodiment, the resource association, in time domain and/or frequency domain, between the second feedback resource and the second control resource, and/or the second data resource may be (pre)configured or specified. The second control information may include no field for indicating the second feedback resource.

In one embodiment, the first device could determine or derive the second feedback resource based on the second control resource, the second data resource, and/or an identity of the first device. The candidate set of feedback resources may comprise the first set of feedback resource(s) and the second feedback resource; and the data resource pool may comprise the first data resource and the second data resource.

Referring back to FIGS. 3 and 4, in one exemplary embodiment of a first device, the device 300 includes a program code 312 stored in the memory 310. The CPU 308 could execute program code 312 to enable the first device (i) to perform sensing on a data resource pool, (ii) to select or derive at least a first data resource from the data resource pool based on the sensing result of the data resource pool, (iii) to transmit a first control information on a first control resource, wherein the first control information allocates or indicates the first data resource, (iv) to perform a first data transmission on the first data resource to at least one second device, (v) to determine or derive a first set of feedback resource(s) based on the first control resource and/or the first data resource, and (vi) to receive a first set of feedback transmission(s) on the first set of feedback resource(s) from at least the one second device, wherein the first set of feedback transmissions are associated with the first data transmission. Furthermore, the CPU 308 can execute the program code 312 to perform all of the above-described actions and steps or others described herein.

Figure 15:
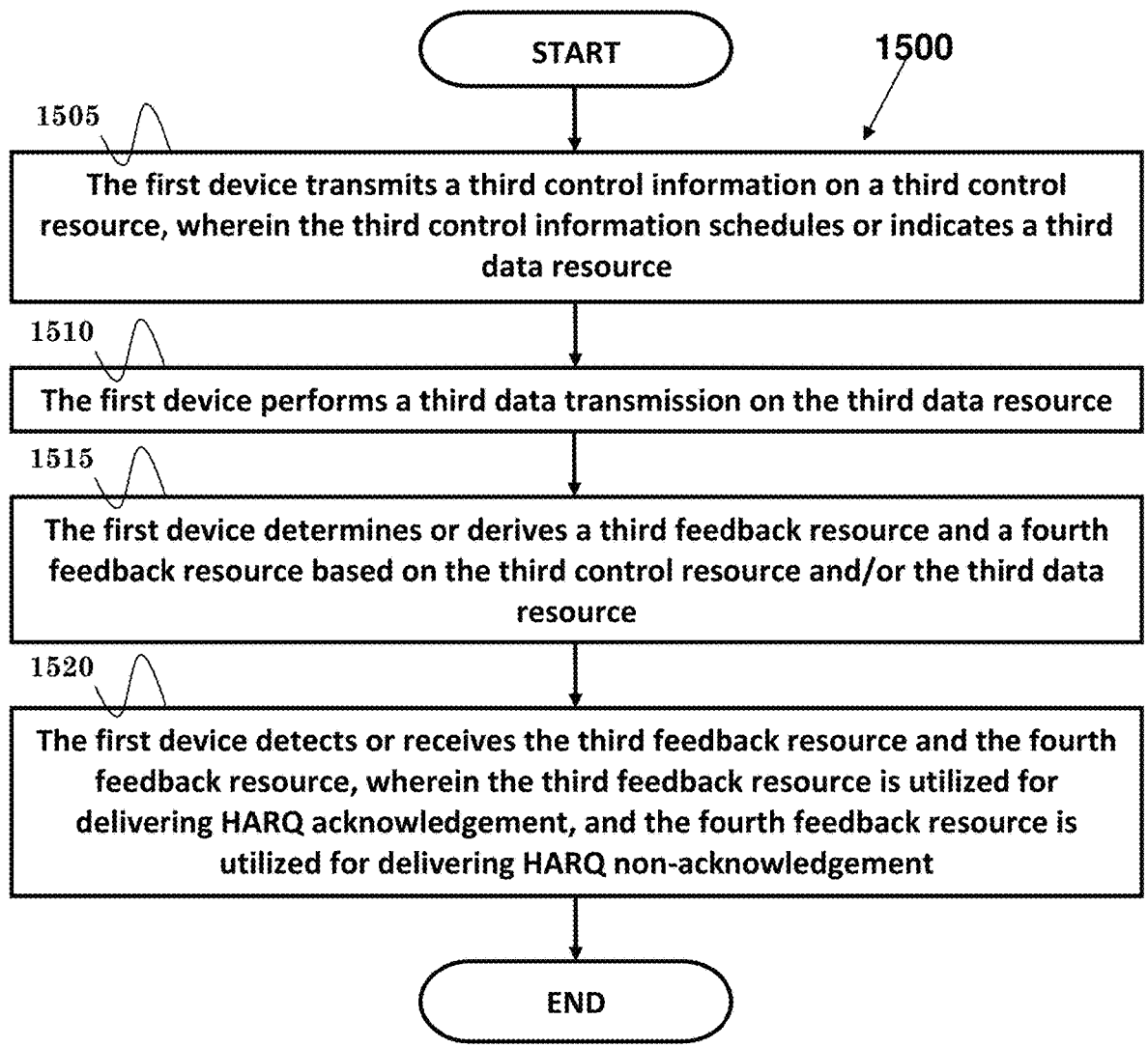
FIG. 15 is a flow chart according to one exemplary embodiment.

FIG. 15 is a flow chart 1500 according to one exemplary embodiment from the perspective of a first device. In step 1505, the first device transmits a third control information on a third control resource, wherein the third control information schedules or indicates a third data resource. In step 1510, the first device performs a third data transmission on the third data resource. In step 1515, the first device determines or derives a third feedback resource and a fourth feedback resource based on the third control resource and/or the third data resource. In step 1520, the first device detects or receives the third feedback resource and the fourth feedback resource, wherein the third feedback resource is utilized for delivering HARQ acknowledgement, and the fourth feedback resource is utilized for delivering HARQ non-acknowledgement.

In one embodiment, the third feedback resource and the fourth feedback resource may be different in frequency domain, and/or the third feedback resource and the fourth feedback resource may be in the same TTI or symbol. Furthermore, for determining or deriving the third feedback resource and the fourth feedback resource, the first device may not perform sensing on a candidate set of feedback resources, wherein the candidate set of feedback resources comprises the third feedback resource and the fourth feedback resource. In addition, the first device could determine or derive the third feedback resource and the fourth feedback resource from the candidate set of feedback resources without basing on sensing result of the candidate set of feedback resources.

In one embodiment, the resource association, in time domain and/or frequency domain, between the third feedback resource and the third control resource, and/or the third data resource may be (pre)configured or specified. Furthermore, the resource association, in time domain and/or frequency domain, between the fourth feedback resource and the third control resource, and/or the third data resource may be (pre)configured or specified.

Referring back to FIGS. 3 and 4, in one exemplary embodiment of a first device, the device 300 includes a program code 312 stored in the memory 310. The CPU 308 could execute program code 312 to enable the first device (i) to transmit a third control information on a third control resource, wherein the third control information schedules or indicates a third data resource, (ii) to perform a third data transmission on the third data resource, (iii) to determine or derive a third feedback resource and a fourth feedback resource based on the third control resource and/or the third data resource, and (iv) to detect or receive the third feedback resource and the fourth feedback resource, wherein the third feedback resource is utilized for delivering HARQ acknowledgement, and the fourth feedback resource is utilized for delivering HARQ non-acknowledgement. Furthermore, the CPU 308 can execute the program code 312 to perform all of the above-described actions and steps or others described herein.

Figure 16:
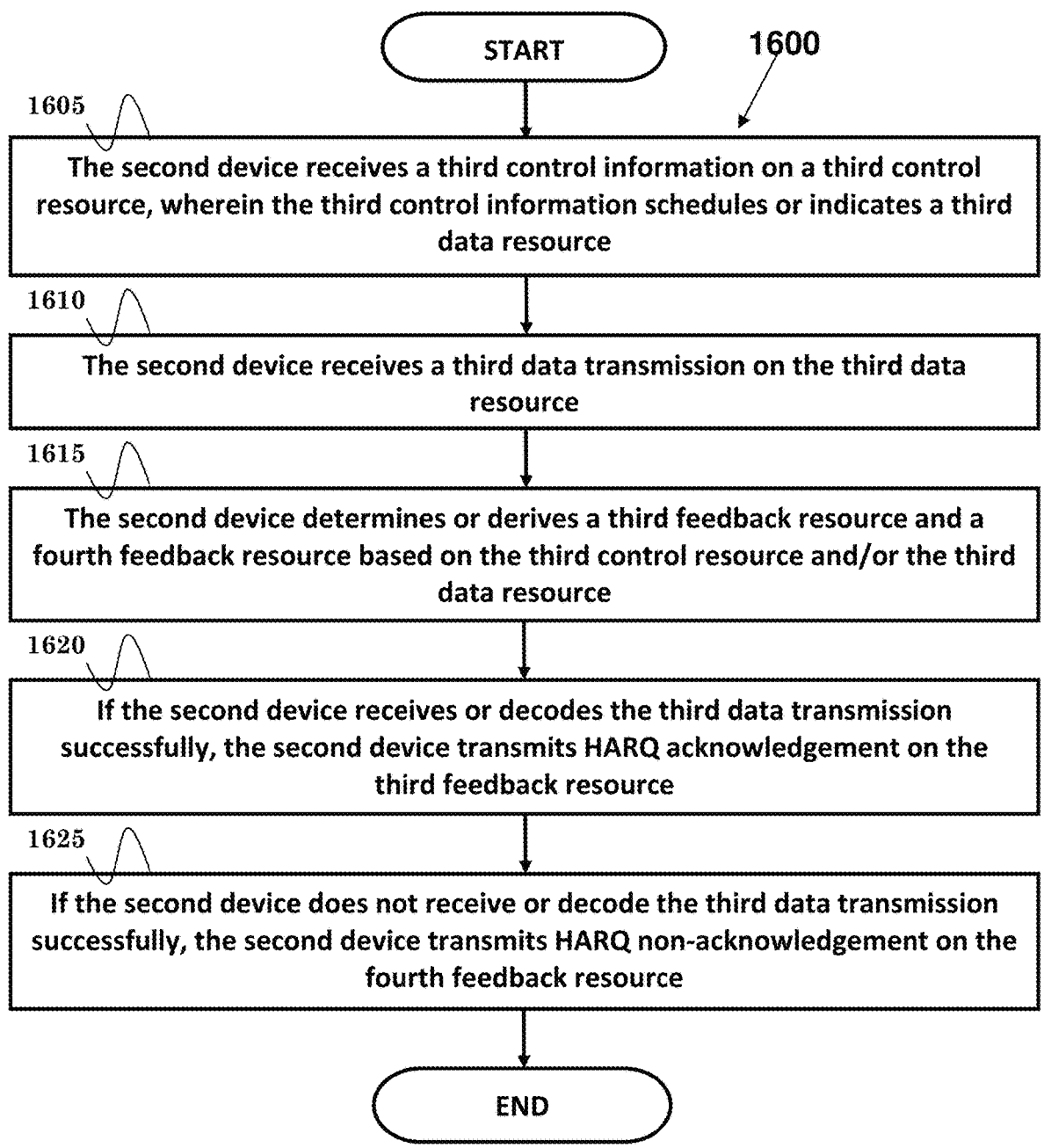
FIG. 16 is a flow chart according to one exemplary embodiment.

FIG. 16 is a flow chart 1600 according to one exemplary embodiment from the perspective of a second device. In step 1605, the second device receives a third control information on a third control resource, wherein the third control information schedules or indicates a third data resource. In step 1610, the second device receives a third data transmission on the third data resource. In step 1615, the second device determines or derives a third feedback resource and a fourth feedback resource based on the third control resource and/or the third data resource. In step 1620, if the second device receives or decodes the third data transmission successfully, the second device transmits HARQ acknowledgement on the third feedback resource. In step 1625, if the second device does not receive or decode the third data transmission successfully, the second device transmits HARQ non-acknowledgement on the fourth feedback resource.

In one embodiment, the resource association, in time domain and/or frequency domain, between the third feedback resource, the third control resource, and/or the third data resource may be (pre)configured or specified. Furthermore, the resource association, in time domain and/or frequency domain, between the fourth feedback resource, the third control resource, and/or the third data resource may be (pre)configured or specified. In addition, the third feedback resource, and the fourth feedback resource may be different in frequency domain. Also, the third feedback resource and the fourth feedback resource may be in the same TTI or symbol.

Referring back to FIGS. 3 and 4, in one exemplary embodiment of a second device, the device 300 includes a program code 312 stored in the memory 310. The CPU 308 could execute program code 312 to enable the second device (i) to receive a third control information on a third control resource, wherein the third control information schedules or indicates a third data resource, (ii) to receive a third data transmission on the third data resource, (iii) to determine or derive a third feedback resource and a fourth feedback resource based on the third control resource and/or the third data resource, (iv) to receive or decode the third data transmission successfully, the second device transmits HARQ acknowledgement on the third feedback resource, and (v) to not receive or decode the third data transmission successfully, the second device transmits HARQ non-acknowledgement on the fourth feedback resource. Furthermore, the CPU 308 can execute the program code 312 to perform all of the above-described actions and steps or others described herein.

Figure 17:
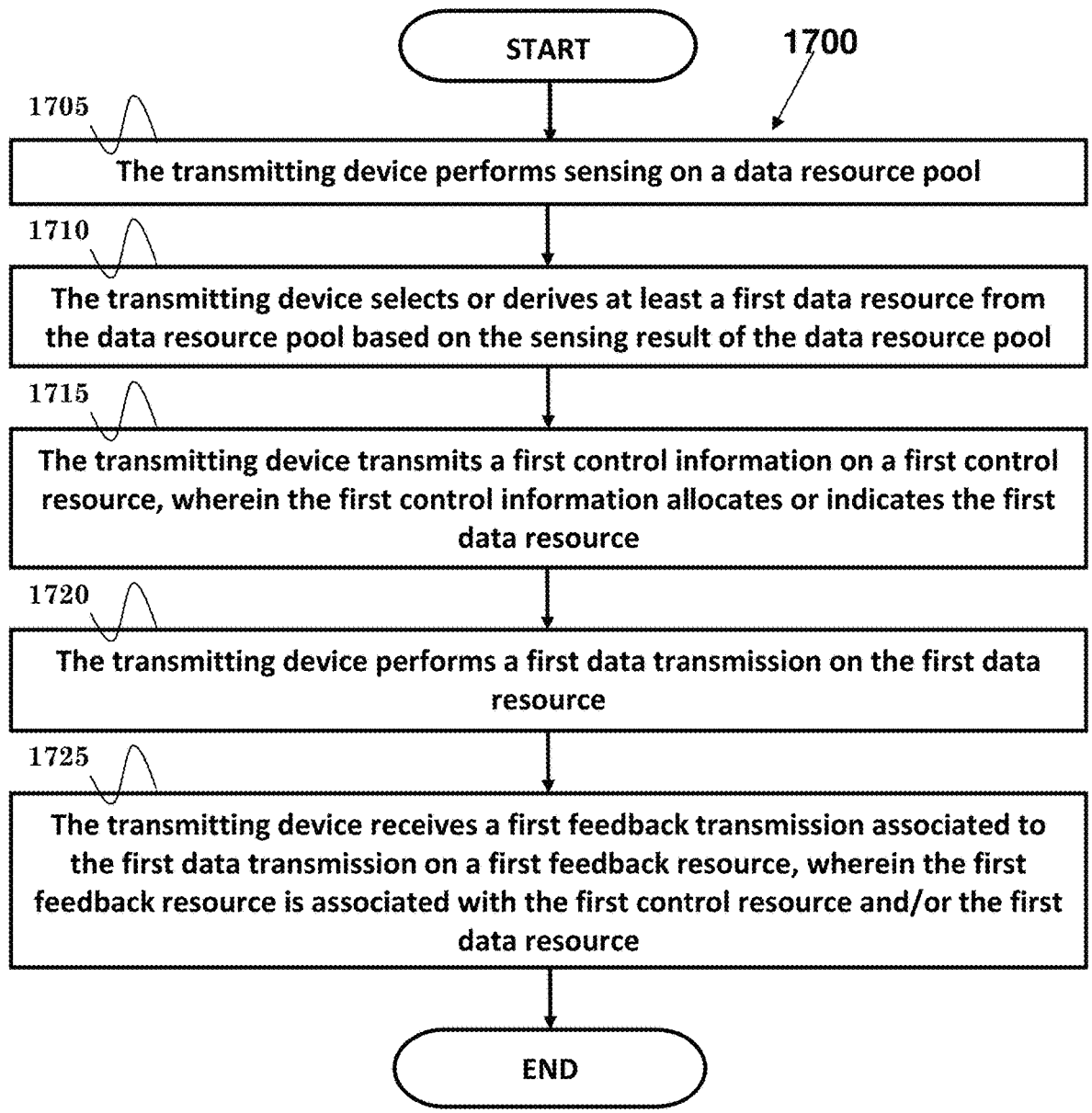
FIG. 17 is a flow chart according to one exemplary embodiment.

FIG. 17 is a flow chart 1700 according to one exemplary embodiment from the perspective of a transmitting device. In step 1705, the transmitting device performs sensing on a data resource pool. In step 1710, the transmitting device selects or derives at least a first data resource from the data resource pool based on the sensing result of the data resource pool. In step 1715, the transmitting device transmits a first control information on a first control resource, wherein the first control information allocates or indicates the first data resource. In step 1720, the transmitting device performs a first data transmission on the first data resource. In step 1725, the transmitting device receives a first feedback transmission associated to the first data transmission on a first feedback resource, wherein the first feedback resource is associated with the first control resource and/or the first data resource.

In one embodiment, the transmitting device may not perform sensing on a feedback resource pool, wherein the feedback resource pool comprises the first feedback resource. Alternatively, the transmitting device may perform sensing on a feedback resource pool, wherein the feedback resource pool comprises the first feedback resource.

Referring back to FIGS. 3 and 4, in one exemplary embodiment of a transmitting device, the device 300 includes a program code 312 stored in the memory 310. The CPU 308 could execute program code 312 to enable the transmitting device (i) to perform sensing on a data resource pool, (ii) to select or derive at least a first data resource from the data resource pool based on the sensing result of the data resource pool, (iii) to transmit a first control information on a first control resource, wherein the first control information allocates or indicates the first data resource, (iv) to perform a first data transmission on the first data resource, and (v) to receive a first feedback transmission associated to the first data transmission on a first feedback resource, wherein the first feedback resource is associated with the first control resource and/or the first data resource. Furthermore, the CPU 308 can execute the program code 312 to perform all of the above-described actions and steps or others described herein.

Figure 18:
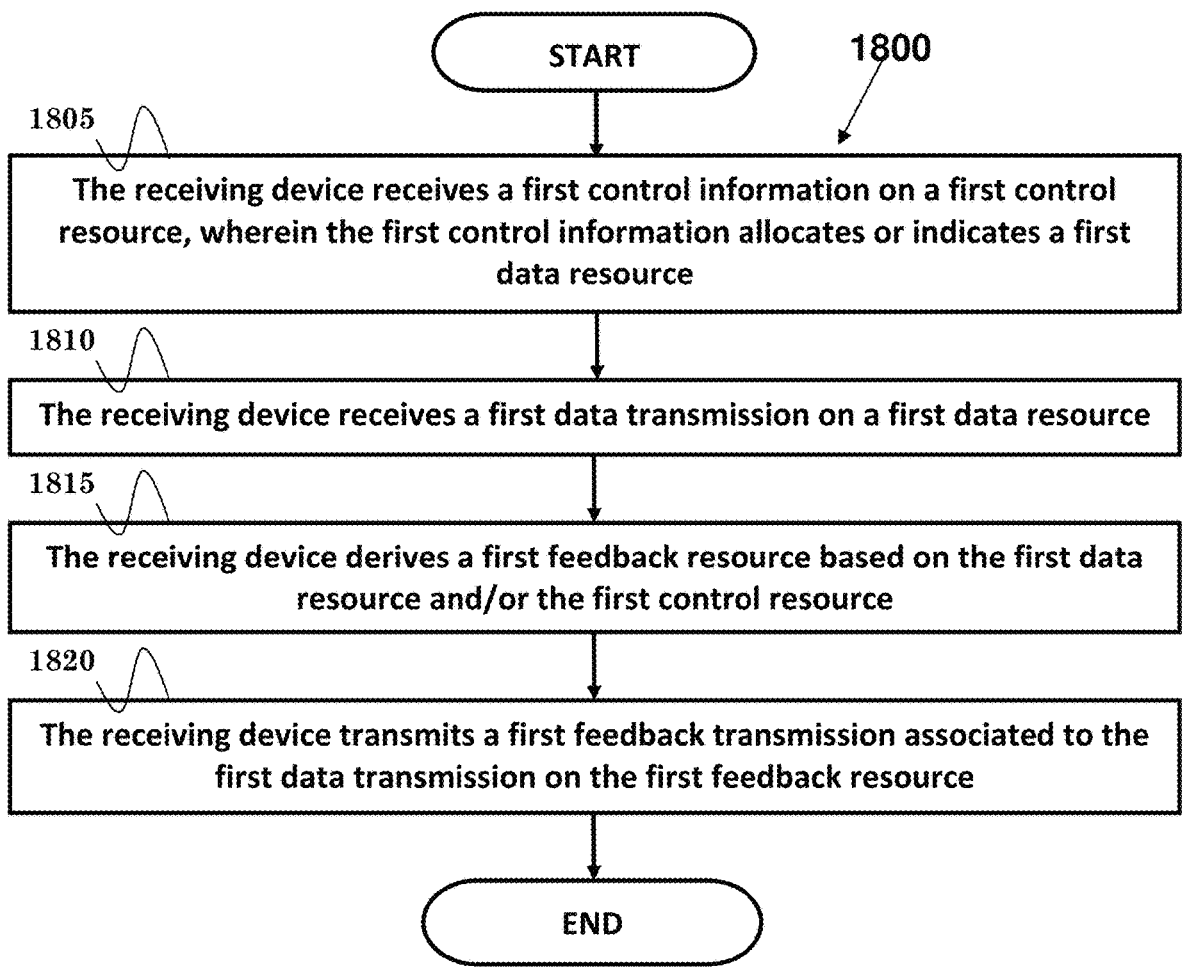
FIG. 18 is a flow chart according to one exemplary embodiment.

FIG. 18 is a flow chart 1800 according to one exemplary embodiment from the perspective of a receiving device. In step 1805, the receiving device receives a first control information on a first control resource, wherein the first control information allocates or indicates a first data resource. In step 1810, the receiving device receives a first data transmission on a first data resource. In step 1815, the receiving device derives a first feedback resource based on the first data resource and/or the first control resource. In step 1820, the receiving device transmits a first feedback transmission associated to the first data transmission on the first feedback resource.

In one embodiment, the receiving device may not perform sensing on a feedback resource pool, wherein the feedback resource pool comprises the first feedback resource. The first feedback transmission may be set based on whether the first data transmission is decoded successfully or not.

In one embodiment, if the receiving device decodes the first data transmission successfully, the first feedback transmission could deliver positive acknowledgment. Furthermore, if the receiving device does not decode the first data transmission successfully, the first feedback transmission could deliver non-positive acknowledgment.

In one embodiment, if the receiving device decodes the first data transmission successfully, the first feedback transmission could deliver an ACK. Furthermore, if the receiving device does not decode the first data transmission successfully, the first feedback transmission could deliver a NACK.

Referring back to FIGS. 3 and 4, in one exemplary embodiment of a receiving device, the device 300 includes a program code 312 stored in the memory 310. The CPU 308 could execute program code 312 to enable the receiving device (i) to receive a first control information on a first control resource, wherein the first control information allocates or indicates a first data resource, (ii) to receive a first data transmission on a first data resource, (iii) to derive a first feedback resource based on the first data resource and/or the first control resource, and (iv) to transmit a first feedback transmission associated to the first data transmission on the first feedback resource. Furthermore, the CPU 308 can execute the program code 312 to perform all of the above-described actions and steps or others described herein.

Figure 19:
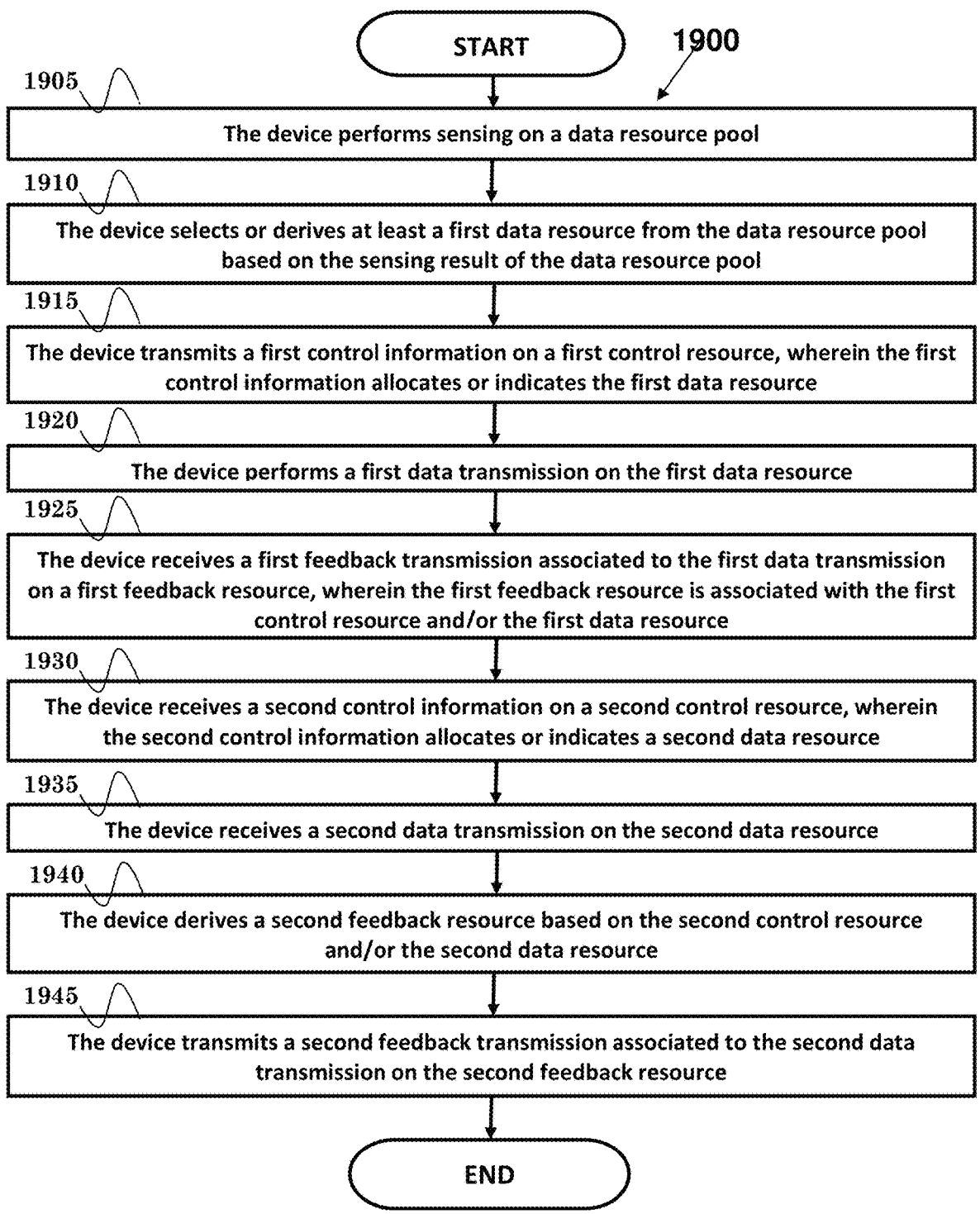
FIG. 19 is a flow chart according to one exemplary embodiment.

FIG. 19 is a flow chart 1900 according to one exemplary embodiment from the perspective of a communication device. In step 1905, the device performs sensing on a data resource pool. In step 1910, the device selects or derives at least a first data resource from the data resource pool based on the sensing result of the data resource pool. In step 1915, the device transmits a first control information on a first control resource, wherein the first control information allocates or indicates the first data resource. In step 1920, the device performs a first data transmission on the first data resource. In step 1925, the device receives a first feedback transmission associated to the first data transmission on a first feedback resource, wherein the first feedback resource is associated with the first control resource and/or the first data resource. In step 1930, the device receives a second control information on a second control resource, wherein the second control information allocates or indicates a second data resource. In step 1935, the device receives a second data transmission on the second data resource. In step 1940, the device derives a second feedback resource based on the second control resource and/or the second data resource. In step 1945, the device transmits a second feedback transmission associated to the second data transmission on the second feedback resource.

In one embodiment, the device may not perform sensing on a feedback resource pool. Alternatively, the device may perform sensing on a feedback resource pool for the first feedback resource, and the device may not perform sensing on the feedback resource pool for the second feedback resource. The feedback resource pool may comprise the first feedback resource and the second feedback resource. The data resource pool may comprise the first data resource and the second data resource. The second feedback transmission may be set based on whether the second data transmission is decoded successfully or not.

In one embodiment, if the device decodes the second data transmission successfully, the second feedback transmission could deliver positive acknowledgment. Furthermore, if the device does not decode the second data transmission successfully, the second feedback transmission could deliver non-positive acknowledgment.

In one embodiment, if the device decodes the second data transmission successfully, the second feedback transmission could deliver an ACK. Furthermore, if the device does not decode the second data transmission successfully, the second feedback transmission could deliver a NACK.

Referring back to FIGS. 3 and 4, in one exemplary embodiment of a communication device, the device 300 includes a program code 312 stored in the memory 310. The CPU 308 could execute program code 312 to enable the communication device (i) to perform sensing on a data resource pool, (ii) to select or derive at least a first data resource from the data resource pool based on the sensing result of the data resource pool, (iii) to transmit a first control information on a first control resource, wherein the first control information allocates or indicates the first data resource, (iv) to perform a first data transmission on the first data resource, (v) to receive a first feedback transmission associated to the first data transmission on a first feedback resource, wherein the first feedback resource is associated with the first control resource and/or the first data resource, (vi) to receive a second control information on a second control resource, wherein the second control information allocates or indicates a second data resource, (vii) to receives a second data transmission on the second data resource, (viii) to derive a second feedback resource based on the second control resource and/or the second data resource, and (ix) to transmit a second feedback transmission associated to the second data transmission on the second feedback resource. Furthermore, the CPU 308 can execute the program code 312 to perform all of the above-described actions and steps or others described herein.

In the context of the embodiments illustrated in FIGS. 17-19 and described above, in one embodiment, the first feedback resource could have a fixed or configured or specified time difference, in TTI units, from the first control resource. Furthermore, the first feedback resource could have a fixed or configured or specified frequency resource (index) difference, in unit of frequency resource unit, from the first control resource. In addition, the first feedback resource could have a fixed or configured or specified frequency resource (index) difference, in unit of frequency resource unit, from the first data resource.

In one embodiment, the index of the first feedback resource could be a fixed or configured or specified resource (index) difference from an index of the first control resource. Furthermore, the index of the first feedback resource could be a fixed or configured or specified resource (index) difference from an index of the first data resource.

In one embodiment, the second feedback resource could be a fixed or configured or specified time difference, in TTI units, from the second control resource. Furthermore, the second feedback resource could be a fixed or configured or specified time difference, in TTI units, from the second data resource. In addition, the second feedback resource could be a fixed or configured or specified frequency resource (index) difference, in frequency resource units, from the second control resource. Also, the second feedback resource could be a fixed or configured or specified frequency resource (index) difference, in frequency resource units, from the second data resource.

In one embodiment, an index of the second feedback resource could be a fixed or configured or specified resource (index) difference from an index of the second control resource. Furthermore, an index of the second feedback resource could be a fixed or configured or specified resource (index) difference from an index of the second data resource.

In one embodiment, the first data transmission could be a unicast transmission, a multi-cast transmission, a groupcast transmission, or a broadcast transmission. Furthermore, the second data transmission could be a unicast transmission, a multi-cast transmission, a groupcast transmission, or a broadcast transmission.

Figure 20:
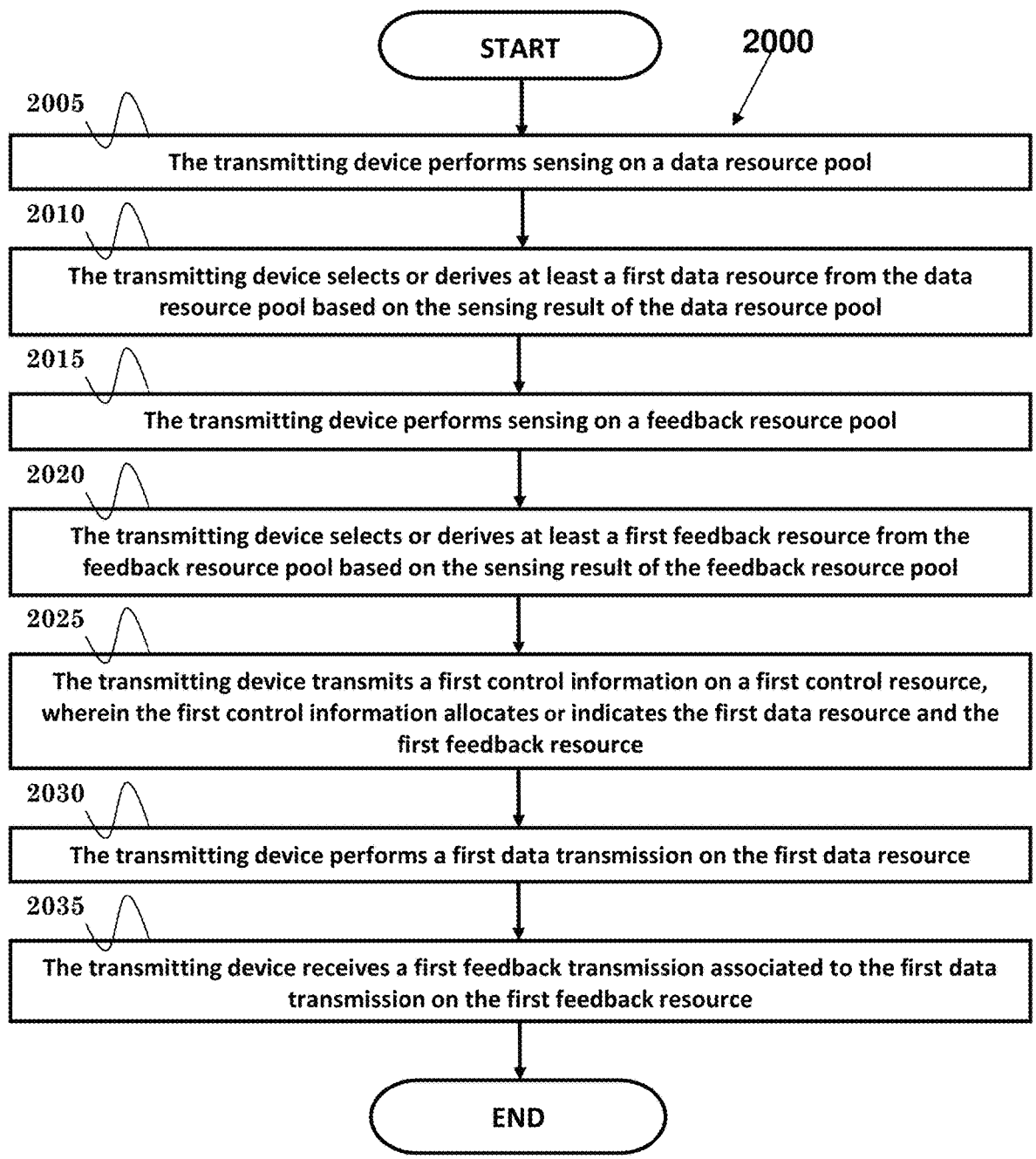
FIG. 20 is a flow chart according to one exemplary embodiment.

FIG. 20 is a flow chart 2000 according to one exemplary embodiment from the perspective of a transmitting device. In step 2005, the transmitting device performs sensing on a data resource pool. In step 2010, the transmitting device selects or derives at least a first data resource from the data resource pool based on the sensing result of the data resource pool. In step 2015, the transmitting device performs sensing on a feedback resource pool. In step 2020, the transmitting device selects or derives at least a first feedback resource from the feedback resource pool based on the sensing result of the feedback resource pool. In step 2025, the transmitting device transmits a first control information on a first control resource, wherein the first control information allocates or indicates the first data resource and the first feedback resource. In step 2030, the transmitting device performs a first data transmission on the first data resource. In step 2035, the transmitting device receives a first feedback transmission associated to the first data transmission on the first feedback resource.

In one embodiment, the transmitting device could perform sensing on a candidate set of feedback resources, wherein the candidate set of feedback resources comprises the first feedback resource.

Referring back to FIGS. 3 and 4, in one exemplary embodiment of a transmitting device, the device 300 includes a program code 312 stored in the memory 310. The CPU 308 could execute program code 312 to enable the transmitting device (i) to perform sensing on a data resource pool, (ii) to select or derive at least a first data resource from the data resource pool based on the sensing result of the data resource pool, (iii) to perform sensing on a feedback resource pool, (iv) to select or derive at least a first feedback resource from the feedback resource pool based on the sensing result of the feedback resource pool, (v) to transmit a first control information on a first control resource, wherein the first control information allocates or indicates the first data resource and the first feedback resource, (vi) to perform a first data transmission on the first data resource, and (vii) to receive a first feedback transmission associated to the first data transmission on the first feedback resource. Furthermore, the CPU 308 can execute the program code 312 to perform all of the above-described actions and steps or others described herein.

Figure 21:
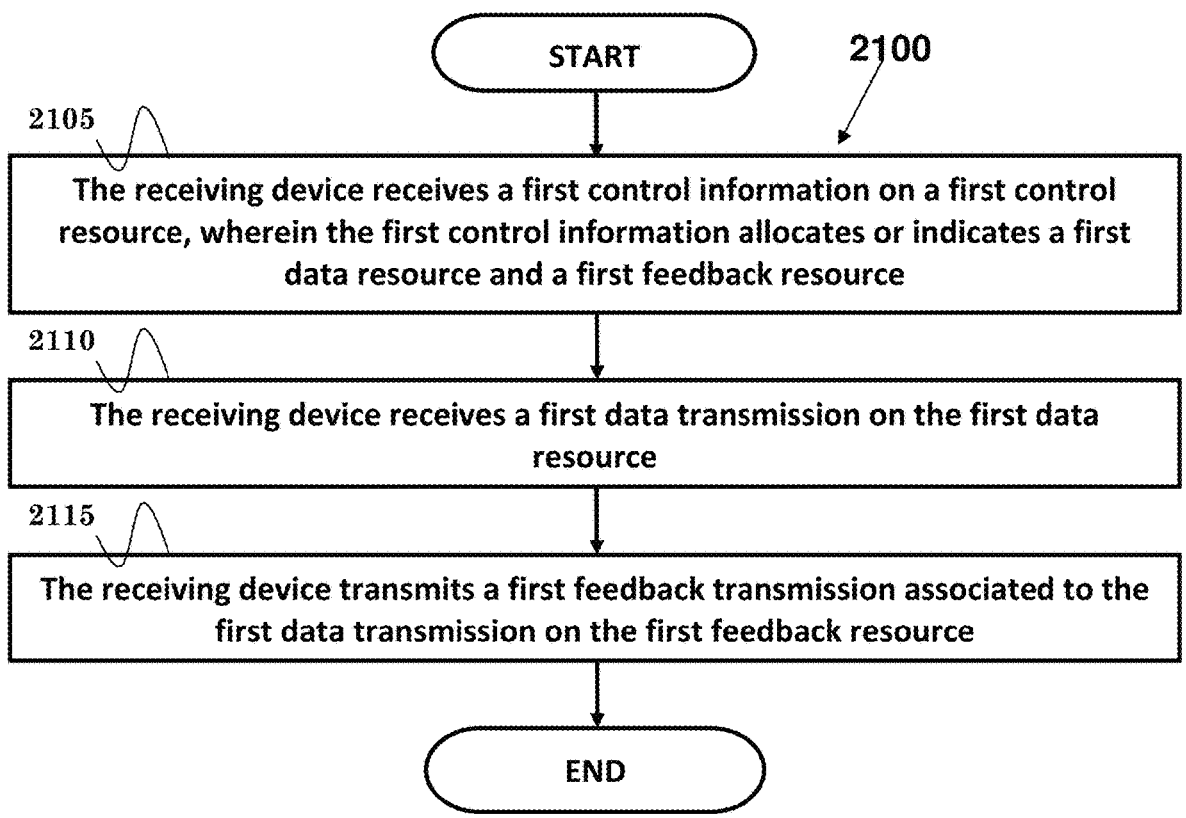
FIG. 21 is a flow chart according to one exemplary embodiment.

FIG. 21 is a flow chart 2100 according to one exemplary embodiment from the perspective of a receiving device. In step 2105, the receiving device receives a first control information on a first control resource, wherein the first control information allocates or indicates a first data resource and a first feedback resource. In step 2110, the receiving device receives a first data transmission on the first data resource. In step 2115, the receiving device transmits a first feedback transmission associated to the first data transmission on the first feedback resource.

In one embodiment, the receiving device may not perform sensing on a feedback resource pool, wherein the feedback resource pool comprises the first feedback resource. The first feedback transmission could be set based on whether the first data transmission is decoded successfully or not.

In one embodiment, if the receiving device decodes the first data transmission successfully, the first feedback transmission could deliver positive acknowledgment. Furthermore, if the receiving device does not decode the first data transmission successfully, the first feedback transmission could deliver non-positive acknowledgment.

In one embodiment, if the receiving device decodes the first data transmission successfully, the first feedback transmission could deliver an ACK. Furthermore, if the receiving device does not decode the first data transmission successfully, the first feedback transmission could deliver a NACK.

Referring back to FIGS. 3 and 4, in one exemplary embodiment of a receiving device, the device 300 includes a program code 312 stored in the memory 310. The CPU 308 could execute program code 312 to enable the receiving device (i) to receive a first control information on a first control resource, wherein the first control information allocates or indicates a first data resource and a first feedback resource, (ii) to receive a first data transmission on the first data resource, and (iii) to transmit a first feedback transmission associated to the first data transmission on the first feedback resource. Furthermore, the CPU 308 can execute the program code 312 to perform all of the above-described actions and steps or others described herein.

Figure 22:
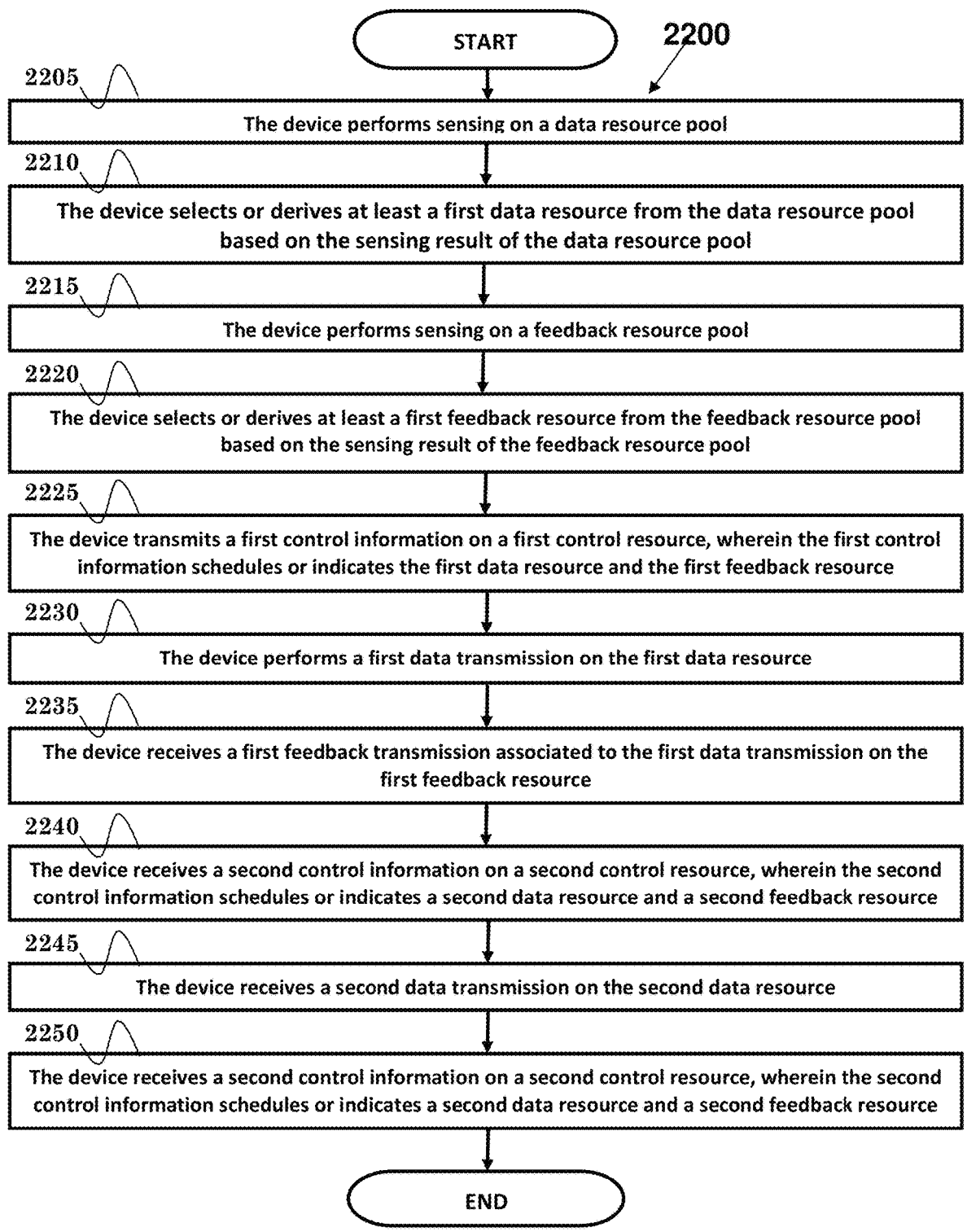
FIG. 22 is a flow chart according to one exemplary embodiment.

FIG. 22 is a flow chart 2200 according to one exemplary embodiment from the perspective of a communication device. In step 2205, the device performs sensing on a data resource pool. In step 2210, the device selects or derives at least a first data resource from the data resource pool based on the sensing result of the data resource pool. In step 2215, the device performs sensing on a feedback resource pool. In step 2220, the device selects or derives at least a first feedback resource from the feedback resource pool based on the sensing result of the feedback resource pool. In step 2225, the device transmits a first control information on a first control resource, wherein the first control information schedules or indicates the first data resource and the first feedback resource. In step 2230, the device performs a first data transmission on the first data resource. In step 2235, the device receives a first feedback transmission associated to the first data transmission on the first feedback resource. In step 2240, the device receives a second control information on a second control resource, wherein the second control information schedules or indicates a second data resource and a second feedback resource. In step 2245, the device receives a second data transmission on the second data resource. In step 2250, the device transmits a second feedback transmission associated to the second data transmission on the second feedback resource.

In one embodiment, the device may not perform sensing on the feedback resource pool for the second feedback resource. Furthermore, the device may perform sensing on a candidate set of feedback resources for the first feedback resource, wherein the candidate set of feedback resources comprises the first feedback resource. The feedback resource pool may comprise the first feedback resource and the second feedback resource. The data resource pool may comprise the first data resource and the second data resource. The second feedback transmission could be set based on whether the second data transmission is decoded successfully or not.

In one embodiment, if the device decodes the second data transmission successfully, the second feedback transmission could deliver positive acknowledgment. Furthermore, if the device does not decode the second data transmission successfully, the second feedback transmission could deliver non-positive acknowledgment.

In one embodiment, if the device decodes the second data transmission successfully, the second feedback transmission could deliver an ACK. Furthermore, if the device does not decode the second data transmission successfully, the second feedback transmission could deliver a NACK.

Referring back to FIGS. 3 and 4, in one exemplary embodiment of a communication device, the device 300 includes a program code 312 stored in the memory 310. The CPU 308 could execute program code 312 to enable the communication device (i) to perform sensing on a data resource pool, (ii) to select or derive at least a first data resource from the data resource pool based on the sensing result of the data resource pool, (iii) to perform sensing on a feedback resource pool, (iv) to select or derive at least a first feedback resource from the feedback resource pool based on the sensing result of the feedback resource pool, (v) to transmit a first control information on a first control resource, wherein the first control information schedules or indicates the first data resource and the first feedback resource, (vi) to perform a first data transmission on the first data resource, (vii) to receive a first feedback transmission associated to the first data transmission on the first feedback resource, (viii) to receive a second control information on a second control resource, wherein the second control information schedules or indicates a second data resource and a second feedback resource, (ix) to receive a second data transmission on the second data resource, and (x) to receive a second control information on a second control resource, wherein the second control information schedules or indicates a second data resource and a second feedback resource. Furthermore, the CPU 308 can execute the program code 312 to perform all of the above-described actions and steps or others described herein.

In the context of the embodiments illustrated in FIGS. 20-22 and described above, in one embodiment, the first feedback resource could have an indicated time difference, in TTI units, from the first control resource, wherein the first control information indicates the time difference. Furthermore, the first feedback resource could have an indicated time difference, in TTI units, from the first data resource, wherein the first control information indicates the time difference. In addition, the first feedback resource could have an indicated frequency resource (index) difference, in frequency resource units, from the first control resource, wherein the first control information indicates the frequency resource (index) difference. Also, the first feedback resource could have an indicated frequency resource (index) difference, in frequency resource units, from the first data resource, wherein the first control information indicates the frequency resource (index) difference.

In one embodiment, an index of the first feedback resource could have an indicated resource (index) difference from an index of the first control resource, wherein the first control information indicates the resource (index) difference. Furthermore, an index of the first feedback resource could have an indicated resource (index) difference from an index of the first data resource, wherein the first control information indicates the resource (index) difference. The first control information could indicate the resource (index) of first feedback resource.

In one embodiment, the second feedback resource could have an indicated time difference, in TTI units, from the second control resource, wherein the second control information indicates the time difference. Furthermore, the second feedback resource could have an indicated time difference, in TTI units, from the second data resource, wherein the second control information indicates the time difference. In addition, the second feedback resource could have an indicated frequency resource (index) difference, in frequency resource units, from the second control resource, wherein the second control information indicates the frequency resource (index) difference. Also, the second feedback resource could have an indicated frequency resource (index) difference, in frequency resource units, from the second data resource, wherein the second control information indicates the frequency resource (index) difference.

In one embodiment, an index of the second feedback resource could have an indicated resource (index) difference from an index of the second control resource, wherein the second control information indicates the resource (index) difference. Furthermore, an index of the second feedback resource could have an indicated resource (index) difference from an index of the second data resource, wherein the second control information indicates the resource (index) difference. The second control information could indicate the resource (index) of second feedback resource.

In one embodiment, the first data transmission could be a unicast transmission, a multi-cast transmission, a groupcast transmission, and a broadcast transmission. Furthermore, the second data transmission could be a unicast transmission, a multi-cast transmission, a groupcast transmission, and a broadcast transmission.

Figure 23:
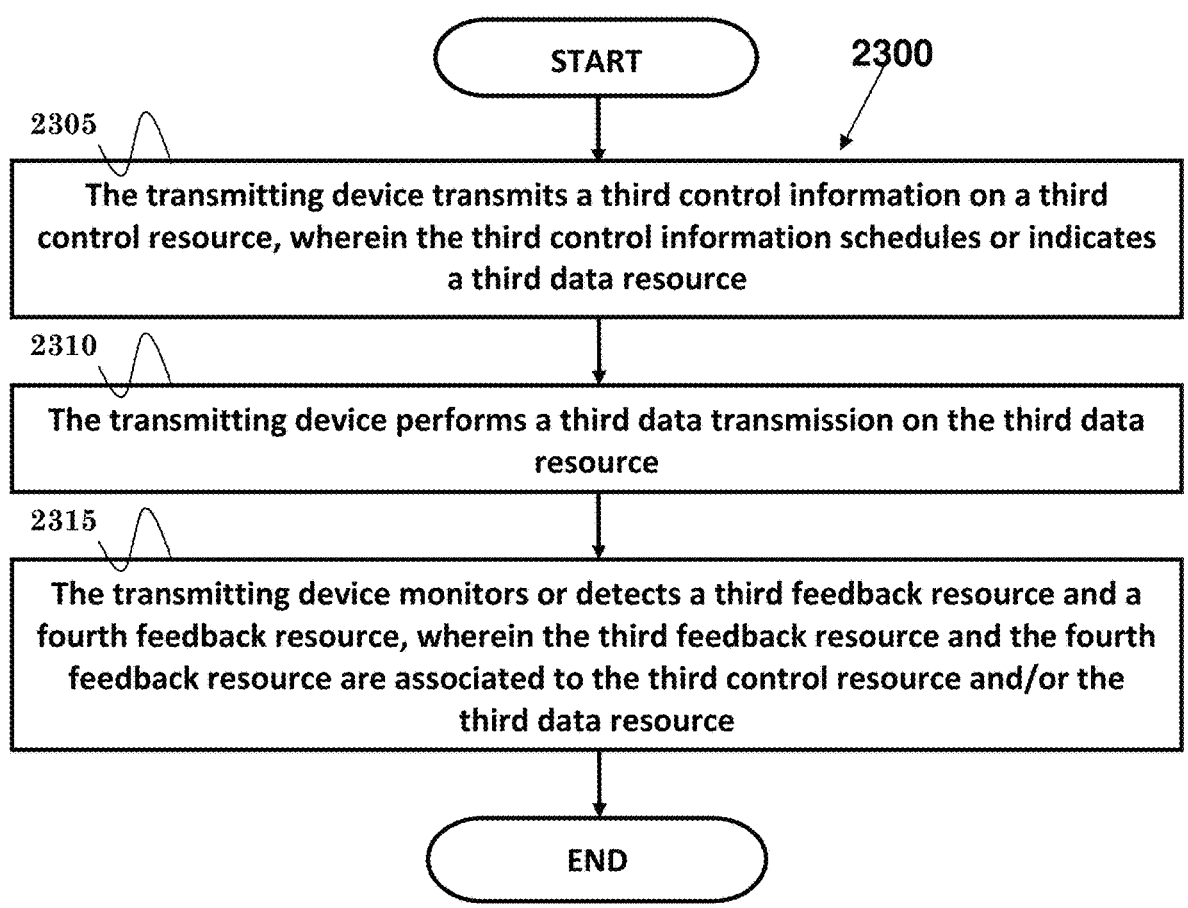
FIG. 23 is a flow chart according to one exemplary embodiment.

FIG. 23 is a flow chart 2300 according to one exemplary embodiment from the perspective of a transmitting device. In step 2305, the transmitting device transmits a third control information on a third control resource, wherein the third control information schedules or indicates a third data resource. In step 2310, the transmitting device performs a third data transmission on the third data resource. In step 2315, the transmitting device monitors or detects a third feedback resource and a fourth feedback resource, wherein the third feedback resource and the fourth feedback resource are associated to the third control resource and/or the third data resource.

In one embodiment, if the transmitting device detects or receives a third feedback transmission on the third feedback resource, the transmitting device could consider the third data transmission is received successfully by a first receiving device. Furthermore, if the transmitting device detects or receives a fourth feedback transmission on the fourth feedback resource, the transmitting device could consider the third data transmission is not received successfully by a second receiving device.

In one embodiment, the transmitting device may not perform sensing on a feedback resource pool, wherein the feedback resource pool comprises the third feedback resource and the fourth feedback resource.

Referring back to FIGS. 3 and 4, in one exemplary embodiment of a transmitting device, the device 300 includes a program code 312 stored in the memory 310. The CPU 308 could execute program code 312 to enable the transmitting device (i) to transmit a third control information on a third control resource, wherein the third control information schedules or indicates a third data resource, (ii) to perform a third data transmission on the third data resource, and (iii) to monitor or detect a third feedback resource and a fourth feedback resource, wherein the third feedback resource and the fourth feedback resource are associated to the third control resource and/or the third data resource. Furthermore, the CPU 308 can execute the program code 312 to perform all of the above-described actions and steps or others described herein.

Figure 24:
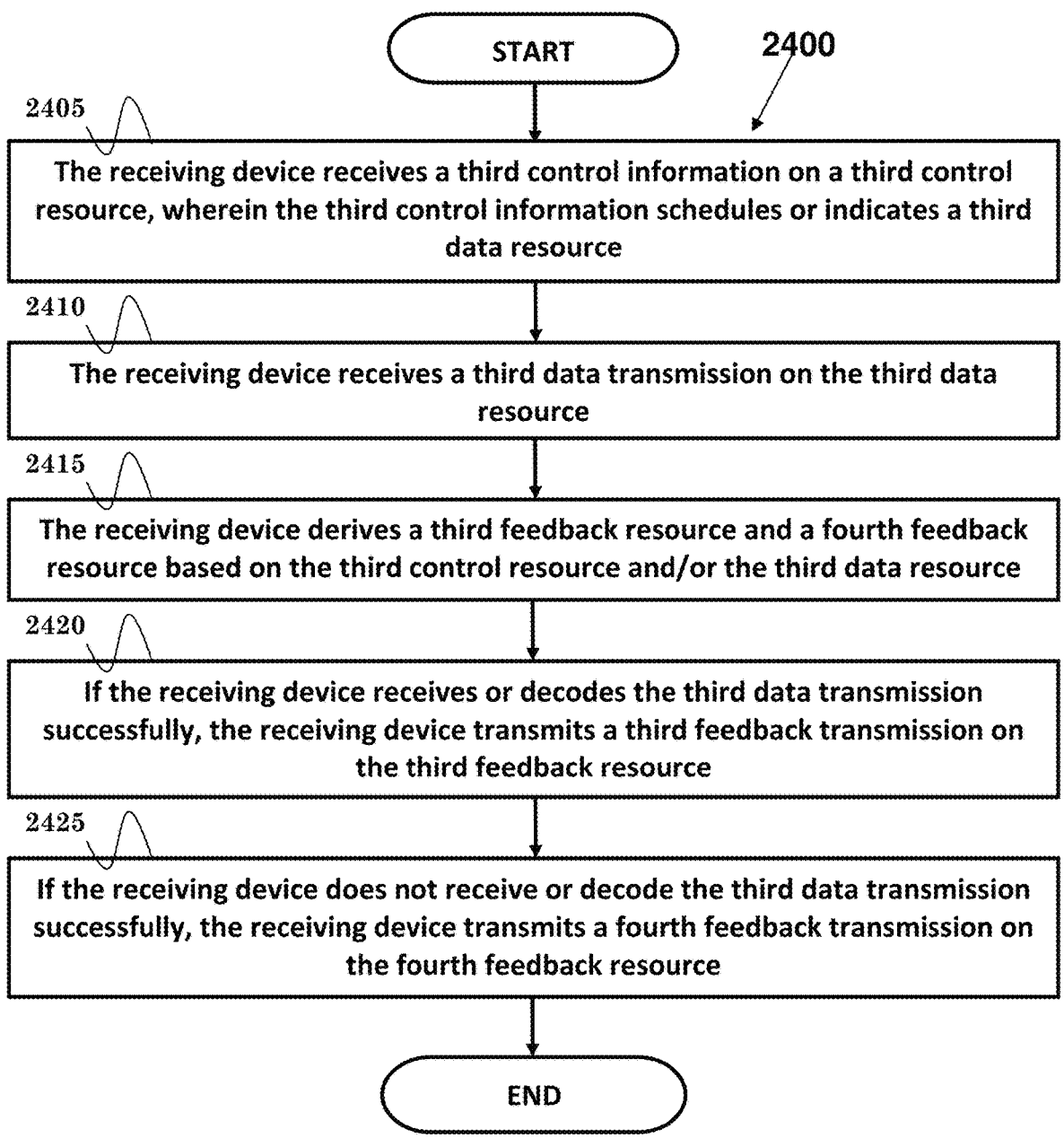
FIG. 24 is a flow chart according to one exemplary embodiment.

FIG. 24 is a flow chart 2400 according to one exemplary embodiment from the perspective of a receiving device. In step 2405, the receiving device receives a third control information on a third control resource, wherein the third control information schedules or indicates a third data resource. In step 2410, the receiving device receives a third data transmission on the third data resource. In step 2415, the receiving device derives a third feedback resource and a fourth feedback resource based on the third control resource and/or the third data resource. In step 2420, if the receiving device receives or decodes the third data transmission successfully, the receiving device transmits a third feedback transmission on the third feedback resource. In step 2425, if the receiving device does not receive or decode the third data transmission successfully, the receiving device transmits a fourth feedback transmission on the fourth feedback resource.

In one embodiment, the receiving device may not perform sensing on a feedback resource pool, wherein the feedback resource pool comprises the third feedback resource and the fourth feedback resource.

Referring back to FIGS. 3 and 4, in one exemplary embodiment of a receiving device, the device 300 includes a program code 312 stored in the memory 310. The CPU 308 could execute program code 312 to enable the receiving device (i) to receive a third control information on a third control resource, wherein the third control information schedules or indicates a third data resource, (ii) to receive a third control information on a third control resource, wherein the third control information schedules or indicates a third data resource, (iii) to derive a third feedback resource and a fourth feedback resource based on the third control resource and/or the third data resource, (iv) to receive or decode the third data transmission successfully, the receiving device transmits a third feedback transmission on the third feedback resource, and (v) to not receive or decode the third data transmission successfully, the receiving device transmits a fourth feedback transmission on the fourth feedback resource. Furthermore, the CPU 308 can execute the program code 312 to perform all of the above-described actions and steps or others described herein.

In the context of the embodiments illustrated in FIGS. 23-24 and described above, in one embodiment, the third feedback resource could have a fixed or configured or specified time difference, in TTI units, from the third control resource. Furthermore, the third feedback resource could have a fixed or configured or specified time difference, in TTI units, from the third data resource. In addition, the third feedback resource could have a fixed or configured or specified frequency resource (index) difference, in frequency resource units, from the third control resource. Also, the third feedback resource could have a fixed or configured or specified frequency resource (index) difference, in frequency resource units, from the third data resource.

In one embodiment, an index of the third feedback resource could have a fixed or configured or specified resource (index) difference from an index of the third control resource. Furthermore, an index of the third feedback resource could have a fixed or configured or specified resource (index) difference from an index of the third data resource.

In one embodiment, the third feedback resource could have an indicated time difference, in TTI units, from the third control resource, wherein the third control information indicates the time difference. Furthermore, the third feedback resource could have an indicated time difference, in TTI units, from the third data resource, wherein the third control information indicates the time difference. In addition, the third feedback resource could have an indicated frequency resource (index) difference, in frequency resource units, from the third control resource, wherein the third control information indicates the frequency resource (index) difference. Also, the third feedback resource could have an indicated frequency resource (index) difference, in frequency resource units, from the third data resource, wherein the third control information indicates the frequency resource (index) difference.

In one embodiment, an index of the third feedback resource could have an indicated resource (index) difference from an index of the third control resource, wherein the third control information indicates the resource (index) difference. Furthermore, an index of the third feedback resource could have an indicated resource (index) difference from an index of the third data resource, wherein the third control information indicates the resource (index) difference. The third control information could indicate the resource (index) of third feedback resource.

In one embodiment, the fourth feedback resource could have a fixed or configured or specified time difference, in TTI units, from the third control resource. Furthermore, the fourth feedback resource could have a fixed or configured or specified time difference, in TTI units, from the third data resource. In addition, the fourth feedback resource could have a fixed or configured or specified frequency resource (index) difference, in frequency resource units, from the third control resource. Also, the fourth feedback resource could have a fixed or configured or specified frequency resource (index) difference, in frequency resource units, from the third data resource.

In one embodiment, an index of the fourth feedback resource could have a fixed or configured or specified resource (index) difference from an index of the third control resource. Furthermore, an index of the fourth feedback resource could have a fixed or configured or specified resource (index) difference from an index of the third data resource.

In one embodiment, the fourth feedback resource could have an indicated time difference, in TTI units, from the third control resource, wherein the third control information indicates the time difference. Furthermore, the fourth feedback resource could have an indicated time difference, in TTI units, from the third data resource, wherein the third control information indicates the time difference. In addition, the fourth feedback resource could have an indicated frequency resource (index) difference, in frequency resource units, from the third control resource, wherein the third control information indicates the frequency resource (index) difference. Also, the fourth feedback resource could have an indicated frequency resource (index) difference, in frequency resource units, from the third data resource, wherein the third control information indicates the frequency resource (index) difference.

In one embodiment, an index of the fourth feedback resource could have an indicated resource (index) difference from an index of the third control resource, wherein the third control information indicates the resource (index) difference. Furthermore, an index of the fourth feedback resource could have an indicated resource (index) difference from an index of the third data resource, wherein the third control information indicates the resource (index) difference. The third control information could indicate the resource (index) of fourth feedback resource.

In one embodiment, the third data transmission could be a unicast transmission, a multi-cast transmission, a group-cast transmission, or a broadcast transmission.

Figure 25:
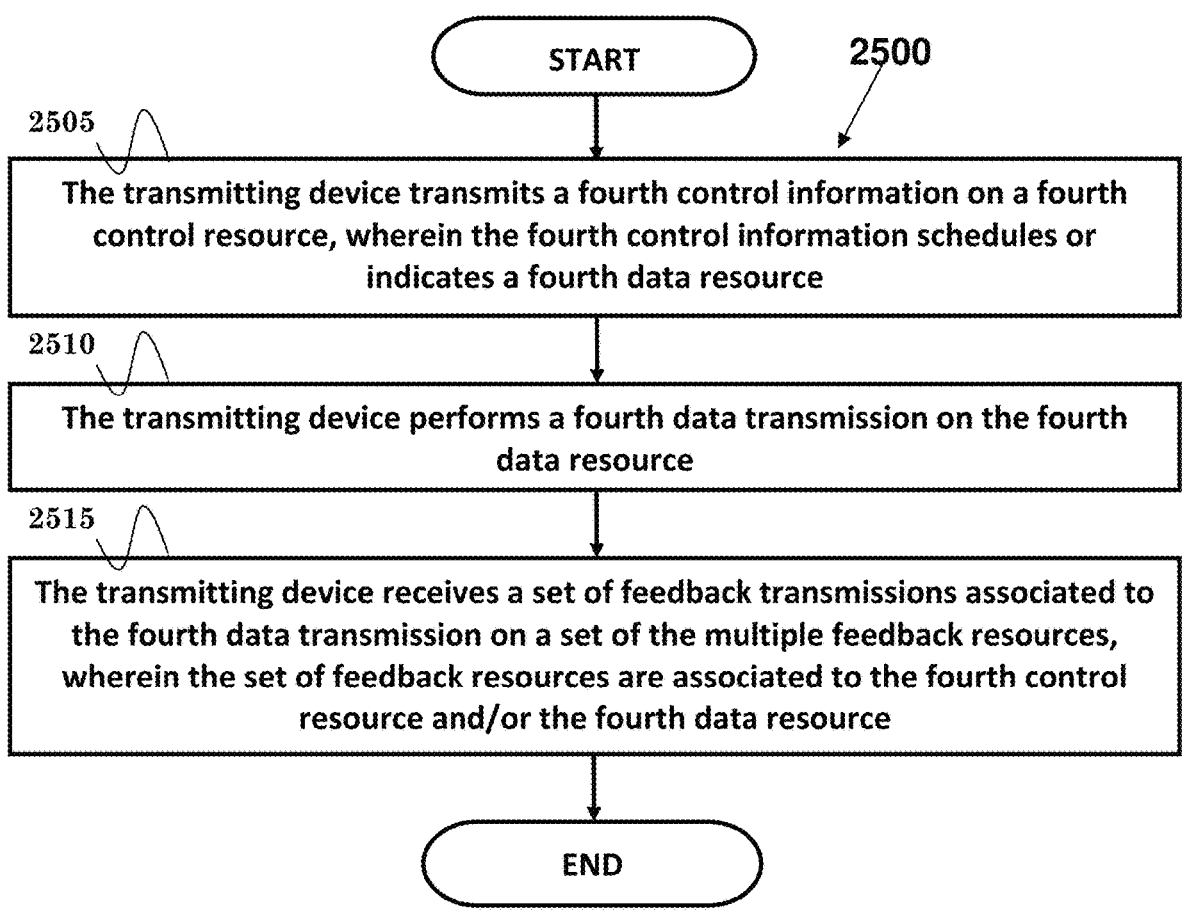
FIG. 25 is a flow chart according to one exemplary embodiment.

FIG. 25 is a flow chart 2500 according to one exemplary embodiment from the perspective of a transmitting device. In step 2505, the transmitting device transmits a fourth control information on a fourth control resource, wherein the fourth control information schedules or indicates a fourth data resource. In step 2510, the transmitting device performs a fourth data transmission on the fourth data resource. In step 2515, the transmitting device receives a set of feedback transmissions associated to the fourth data transmission on a set of the multiple feedback resources, wherein the set of feedback resources are associated to the fourth control resource and/or the fourth data resource.

In one embodiment, the transmitting device may not perform sensing on a feedback resource pool, wherein the feedback resource pool comprises the set of feedback resource. Alternatively, the transmitting device could perform sensing on a feedback resource pool, wherein the feedback resource pool comprises the set of feedback resource. A feedback transmission on one of the feedback resources could deliver feedback information of one receiving device.

Referring back to FIGS. 3 and 4, in one exemplary embodiment of a transmitting device, the device 300 includes a program code 312 stored in the memory 310. The CPU 308 could execute program code 312 to enable the transmitting device (i) to transmit a fourth control information on a fourth control resource, wherein the fourth control information schedules or indicates a fourth data resource, (ii) to perform a fourth data transmission on the fourth data resource, and (iii) to receive a set of feedback transmissions associated to the fourth data transmission on a set of the multiple feedback resources, wherein the set of feedback resources are associated to the fourth control resource and/or the fourth data resource. Furthermore, the CPU 308 can execute the program code 312 to perform all of the above-described actions and steps or others described herein.

Figure 26:
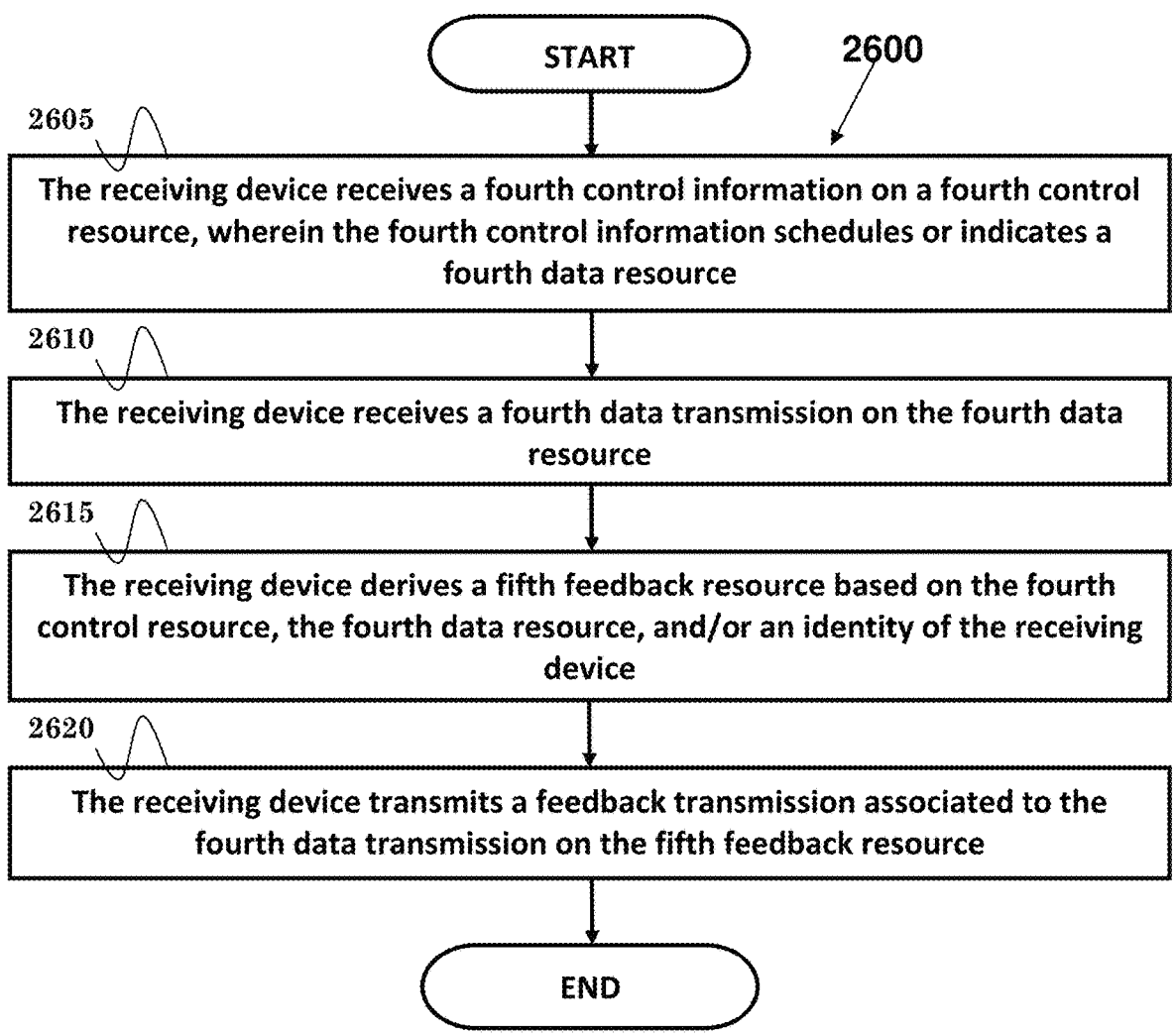
FIG. 26 is a flow chart according to one exemplary embodiment.

FIG. 26 is a flow chart 2600 according to one exemplary embodiment from the perspective of a receiving device. In step 2605, the receiving device receives a fourth control information on a fourth control resource, wherein the fourth control information schedules or indicates a fourth data resource. In step 2610, the receiving device receives a fourth data transmission on the fourth data resource. In step 2615, the receiving device derives a fifth feedback resource based on the fourth control resource, the fourth data resource, and/or an identity of the receiving device. In step 2620, the receiving device transmits a feedback transmission associated to the fourth data transmission on the fifth feedback resource.

In one embodiment, the receiving device may not perform sensing on a feedback resource pool, wherein the feedback resource pool comprises the fifth feedback resource. The feedback transmission could be set based on whether the fourth data transmission is decoded successfully or not.

In one embodiment, if the receiving device decodes the fourth data transmission successfully, the feedback transmission could deliver positive acknowledgment. Furthermore, if the receiving device does not decode the fourth data transmission successfully, the feedback transmission could deliver non-positive acknowledgment.

In one embodiment, if the receiving device decodes the fourth data transmission successfully, the feedback transmission could deliver an ACK. If the receiving device does not decode the fourth data transmission successfully, the feedback transmission could deliver a NACK.

Referring back to FIGS. 3 and 4, in one exemplary embodiment of a receiving device, the device 300 includes a program code 312 stored in the memory 310. The CPU 308 could execute program code 312 to enable the receiving device (i) to receive a fourth control information on a fourth control resource, wherein the fourth control information schedules or indicates a fourth data resource, (ii) to receive a fourth data transmission on the fourth data resource, (iii) to derive a fifth feedback resource based on the fourth control resource, the fourth data resource, and/or an identity of the receiving device, and (iv) to transmit a feedback transmission associated to the fourth data transmission on the fifth feedback resource. Furthermore, the CPU 308 can execute the program code 312 to perform all of the above-described actions and steps or others described herein.

Figure 27:
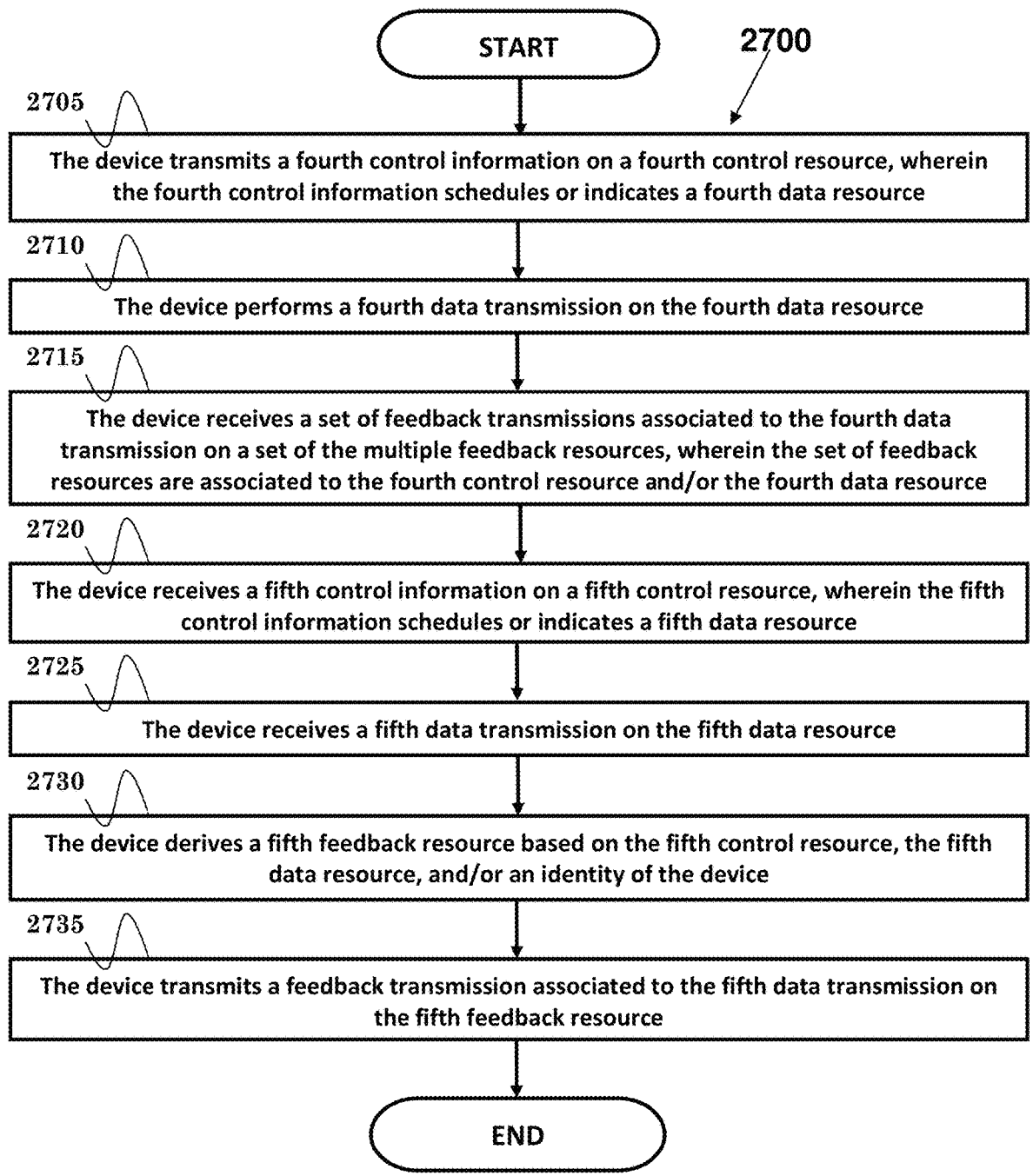
FIG. 27 is a flow chart according to one exemplary embodiment.

FIG. 27 is a flow chart 2700 according to one exemplary embodiment from the perspective of a communication device. In step 2705, the device transmits a fourth control information on a fourth control resource, wherein the fourth control information schedules or indicates a fourth data resource. In step 2710, the device performs a fourth data transmission on the fourth data resource. In step 2715, the device receives a set of feedback transmissions associated to the fourth data transmission on a set of the multiple feedback resources, wherein the set of feedback resources are associated to the fourth control resource and/or the fourth data resource. In step 2720, the device receives a fifth control information on a fifth control resource, wherein the fifth control information schedules or indicates a fifth data resource. In step 2725, the device receives a fifth data transmission on the fifth data resource. In step 2730, the device derives a fifth feedback resource based on the fifth control resource and/or the fifth data resource and/or an identity of the device. In step 2735, the device transmits a feedback transmission associated to the fifth data transmission on the fifth feedback resource.

In one embodiment, the device may not perform sensing on a feedback resource pool. However, the device may perform sensing on a feedback resource pool for the set of feedback resources. The device may not perform sensing on the feedback resource pool for the fifth feedback resource. The feedback resource pool may comprise the fifth feedback resource. The device may perform sensing on a data resource pool. The data resource pool may comprise the fourth data resource and the fifth data resource. The feedback transmission could be set based on whether the fifth data transmission is decoded successfully or not.

In one embodiment, if the device decodes the fifth data transmission successfully, the feedback transmission on the fifth feedback resource could deliver positive acknowledgment. Furthermore, if the device does not decode the fifth data transmission successfully, the feedback transmission on the fifth feedback resource could deliver non-positive acknowledgment.

In one embodiment, if the device decodes the fifth data transmission successfully, the feedback transmission on the fifth feedback resource could deliver an ACK. If the device does not decode the fifth data transmission successfully, the feedback transmission on the fifth feedback resource could deliver a NACK.

Referring back to FIGS. 3 and 4, in one exemplary embodiment of a communication device, the device 300 includes a program code 312 stored in the memory 310. The CPU 308 could execute program code 312 to enable the communication device (i) to transmit a fourth control information on a fourth control resource, wherein the fourth control information schedules or indicates a fourth data resource, (ii) to perform a fourth data transmission on the fourth data resource, (iii) to receive a set of feedback transmissions associated to the fourth data transmission on a set of the multiple feedback resources, wherein the set of feedback resources are associated to the fourth control resource and/or the fourth data resource, (iv) to receive a fifth control information on a fifth control resource, wherein the fifth control information schedules or indicates a fifth data resource, (v) to receive a fifth data transmission on the fifth data resource, (vi) to derive a fifth feedback resource based on the fifth control resource, the fifth data resource, and/or an identity of the device, and (vii) to transmit a feedback transmission associated to the fifth data transmission on the fifth feedback resource. Furthermore, the CPU 308 can execute the program code 312 to perform all of the above-described actions and steps or others described herein.

In the context of the embodiments illustrated in FIGS. 25-27 and described above, in one embodiment, the set of feedback resources could have fixed or configured or specified time difference(s), in TTI units, from the fourth control resource. Furthermore, the set of feedback resources could have fixed or configured or specified time difference(s), in TTI units, from the fourth data resource. In addition, the set of feedback resources could have fixed or configured or specified frequency resource (index) difference(s), in frequency resource units, from the fourth control resource. Also, the set of feedback resources could have fixed or configured or specified frequency resource (index) difference(s), in frequency resource units, from the fourth data resource.

In one embodiment, indices of the set of feedback resources could have fixed or configured or specified resource (index) difference(s) from an index of the fourth control resource. Furthermore, indices of the set of feedback resources could have fixed or configured or specified resource (index) difference(s) from an index of the fourth data resource.

In one embodiment, the set of feedback resources could have indicated time difference(s), in TTI units, from the fourth control resource, wherein the fourth control information indicates the time difference(s). Furthermore, the set of feedback resources could have indicated time difference(s), in TTI units, from the fourth data resource, wherein the fourth control information indicates the time difference(s). In addition, the set of feedback resources could have indicated frequency resource (index) difference(s), in frequency resource units, from the fourth control resource, wherein the fourth control information indicates the frequency resource (index) difference(s). Also, the set of feedback resources could have indicated frequency resource (index) difference(s), in frequency resource units, from the fourth data resource, wherein the fourth control information indicates the frequency resource (index) difference(s).

In one embodiment, indices of the set of feedback resources could have indicated resource (index) difference(s) from an index of the fourth control resource, wherein the fourth control information indicates the resource (index) difference(s). Furthermore, indices of the set of feedback resources could have indicated resource (index) difference from an index of the fourth data resource, wherein the fourth control information indicates the resource (index) difference(s). The fourth control information could indicate the resource (index) of the set of feedback resources.

In one embodiment, the set of feedback resources could have indicated time difference(s), in TTI units, from the fourth control resource, wherein the time difference(s) is/are indicated or derived by identities of a set of receiving devices. Furthermore, the set of feedback resources could have indicated time difference(s), in TTI units, from the fourth data resource, wherein the time difference(s) is/are indicated or derived by identities of a set of receiving devices. In addition, the set of feedback resources could have indicated frequency resource (index) difference(s), in frequency resource units, from the fourth control resource, wherein the frequency resource (index) difference(s) is/are indicated or derived by identities of a set of receiving devices. Also, the set of feedback resources could have indicated frequency resource (index) difference(s), in frequency resource units, from the fourth data resource, wherein the frequency resource (index) difference(s) is/are indicated or derived by identities of a set of receiving devices.

In one embodiment, indices of the set of feedback resources could have indicated resource (index) difference(s) from an index of the fourth control resource, wherein the resource (index) difference(s) is/are indicated or derived by identities of a set of receiving devices. Furthermore, indices of the set of feedback resources could have indicated resource (index) difference(s) from an index of the fourth data resource, wherein the resource (index) difference(s) is/are indicated or derived by identities of a set of receiving devices. The resource (index) of the set of feedback resources is/are indicated or derived by identities of a set of receiving devices.

In one embodiment, the fifth feedback resource could have a fixed or configured or specified time difference, in TTI units, from the fourth control resource. Furthermore, the fifth feedback resource could have a fixed or configured or specified time difference(s), in TTI units, from the fourth data resource. In addition, the fifth feedback resource could have a fixed or configured or specified frequency resource (index) difference, in frequency resource units, from the fourth control resource. Also, the fifth feedback resource could have a fixed or configured or specified frequency resource (index) difference, in frequency resource units, from the fourth data resource.

In one embodiment, index of the fifth feedback resource could have a fixed or configured or specified resource (index) difference from an index of the fourth control resource. Furthermore, index of the fifth feedback resource could have a fixed or configured or specified resource (index) difference from an index of the fourth data resource.

In one embodiment, the fifth feedback resource could have an indicated time difference, in TTI units, from the fourth control resource, wherein the fourth control information indicates the time difference. Furthermore, the fifth feedback resource could have an indicated time difference, in TTI units, from the fourth data resource, wherein the fourth control information indicates the time difference. In addition, the fifth feedback resource could have an indicated frequency resource (index) difference, in frequency resource units, from the fourth control resource, wherein the fourth control information indicates the frequency resource (index) difference. Also, the fifth feedback resource could have an indicated frequency resource (index) difference, in frequency resource units, from the fourth data resource, wherein the fourth control information indicates the frequency resource (index) difference.

In one embodiment, index of the fifth feedback resource could have an indicated resource (index) difference from an index of the fourth control resource, wherein the fourth control information indicates the resource (index) difference. Furthermore, index of the fifth feedback resource could have an indicated resource (index) difference from an index of the fourth data resource, wherein the fourth control information indicates the resource (index) difference. The fourth control information could indicate the resource (index) of the fifth feedback resource.

In one embodiment, the fifth feedback resource could have an indicated time difference, in TTI units, from the fourth control resource, wherein the time difference is indicated or derived by the identity of the devices. Furthermore, the fifth feedback resource could have an indicated time difference, in TTI units, from the fourth data resource, wherein the time difference is indicated or derived by the identity of the device. In addition, the fifth feedback resource could have an indicated frequency resource (index) difference, in frequency resource units, from the fourth control resource, wherein the frequency resource (index) difference is indicated or derived by the identity of the device. Also, the fifth feedback resource could have an indicated frequency resource (index) difference, in frequency resource units, from the fourth data resource, wherein the frequency resource (index) difference is indicated/derived by the identity of the device.

In one embodiment, index of the fifth feedback resource could have an indicated resource (index) difference from an index of the fourth control resource, wherein the resource (index) difference is indicated or derived by the identity of the device. Furthermore, index of the fifth feedback resource could have an indicated resource (index) difference from an index of the fourth data resource, wherein the resource (index) difference is indicated or derived by the identity of the device. In addition, the resource (index) of the fifth feedback resource could be indicated or derived by the identity of the device.

In one embodiment, the fourth data transmission could be a unicast transmission, a multi-cast transmission, a groupcast transmission, or a broadcast transmission. Furthermore, the fifth data transmission could be a unicast transmission, a multi-cast transmission, a groupcast transmission, and a broadcast transmission.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform device-to-device or sidelink transmission and reception, comprising:
the first device performs sensing on a resource pool comprising data resources;
the first device selects or derives at least a first data resource from the resource pool based on sensing result on the resource pool, wherein the sensing comprises the first device receiving a transmission and excluding candidate resources associated with the transmission;
the first device transmits a first control information on a first control resource, wherein the first control information allocates or indicates the first data resource;
the first device performs a first data transmission on the first data resource to at least a second device;
the first device determines or derives a first set of feedback resources based on the first control resource and/or the first data resource without sensing on a candidate set of feedback resources associated with the data resources, and wherein the candidate set of feedback resources comprises the first set of feedback resources;
the first device determines or derives a first feedback resource of the first set of feedback resources based on an identity of the second device within a sidelink group; and the first device receives a first feedback transmission on the first feedback resource from at least the second device, wherein the first feedback transmission includes Hybrid Automatic Repeat Request (HARQ) feedback information associated with the first data transmission.

2. The method of claim 1, wherein the first device determines or derives the first set of feedback resources, from the candidate set of feedback resources, based on association between feedback resources and data resources; and/or
the first device determines or derives the first set of feedback resources from the candidate set of feedback resources without basing on sensing result of the candidate set of feedback resources, and/or
the first device determining or deriving the first set of feedback resources without sensing on the candidate set of feedback resources means or comprises that for determining or deriving the first set of feedback resources, the first device excludes sensing on the candidate set of feedback resources.

3. The method of claim 1, wherein the first data transmission is a unicast transmission to the second device.

4. The method of claim 2, wherein the association between the feedback resources and the data resources comprises configured or specified time differences, in unit of Transmission Time Interval (TTI), between the feedback resources and the data resources, and/or
wherein the association between the feedback resources and the data resources comprises configured or specified frequency resource differences between the feedback resources and the data resources.

5. The method of claim 1, wherein when the first data transmission is groupcast transmission to a sidelink group comprising at least the second device, each receiving device in the sidelink group transmits one feedback transmission, on one of the first set of feedback resources, to transmit HARQ feedback information associated with the first data transmission.

6. The method of claim 1, wherein the excluded candidate resources associated with the received transmission means the candidate resources expected to be utilized by a device transmitting the received transmission.

7. The method of claim 1, wherein the resource association, in time domain and/or frequency domain, between the first set of feedback resources and the first control resource, and/or the first data resource is configured or preconfigured or specified.

8. The method of claim 1, wherein the first control information comprises no field for indicating the first set of feedback resources.

9. The method of claim 1, further comprising:
the first device receives a second control information on a second control resource, wherein the second control information allocates or indicates a second data resource;
the first device receives a second data transmission on the second data resource;
the first device determines or derives a second set of feedback resources based on the second control resource and/or the second data resource without sensing on the candidate set of feedback resources associated with the data resources, wherein the candidate set of feedback resources comprises the second feedback resource;
the first device determines or derives a second feedback resource of the second set of feedback resources based on an identity of the first device within the sidelink group; and
the first device transmits a second feedback transmission on the second feedback resource, wherein the second feedback transmission includes Hybrid Automatic Repeat Request (HARQ) feedback information associated to the second data transmission.

10. The method of claim 9, wherein the first device determines or derives the second set of feedback resources, from the candidate set of feedback resources, based on association between feedback resources and data resources; and/or
the first device determines or derives the second set of feedback resources from the candidate set of feedback resources without basing on sensing result of the candidate set of feedback resources, and/or
the first device determining or deriving the second set of feedback resources without sensing on the candidate set of feedback resources means or comprises that for determining or deriving the second set of feedback resources, the first device excludes sensing on the candidate set of feedback resources.

11. The method of claim 9, wherein the resource association, in time domain and/or frequency domain, between the second set of feedback resources and the second control resource, and/or the second data resource is configured or preconfigured or specified.

12. The method of claim 9, wherein the second control information comprises no field for indicating the second set of feedback resources.

13. The method of claim 9, wherein the first device determines or derives the second feedback resource based on the second control resource, the second data resource, and/or an identity of the first device.

14. The method of claim 9, wherein the candidate set of feedback resources comprises the first set of feedback resources and the second set of feedback resources; and the resource pool comprises the first data resource and the second data resource.

15. A method of a first device to perform device-to-device or sidelink transmission and reception, comprising:
the first device transmits a third control information on a third control resource, wherein the third control information schedules or indicates a third data resource;
the first device performs a third data transmission on the third data resource;
the first device determines or derives a third feedback resource and a fourth feedback resource at least based on the third control resource and/or the third data resource without sensing on a candidate set of feedback resources, wherein the sensing comprises the first device receiving a transmission and excluding candidate resources associated with the received transmission, and wherein the candidate set of feedback resources comprises the third feedback resource and the fourth feedback resource; and
the first device detects or receives the third feedback resource and the fourth feedback resource, wherein the third feedback resource is utilized for delivering HARQ (Hybrid Automatic Repeat Request) acknowledgement, and the fourth feedback resource is utilized for delivering HARQ non-acknowledgement.

16. The method of claim 15, wherein the third feedback resource and the fourth feedback resource are different in frequency domain, and/or the third feedback resource and the fourth feedback resource are in the same TTI (Transmission Time Interval) or symbol.

17. The method of claim 15, wherein the first device determines or derives the third feedback resource and the fourth feedback resource, from the candidate set of feedback resources, based on association between feedback resources and data resources; and/or
- the first device determines or derives the third feedback resource and the fourth feedback resource from the candidate set of feedback resources without basing on sensing result of the candidate set of feedback resources, and/or
- the first device determining or deriving the third feedback resource and the fourth feedback resource without sensing on the candidate set of feedback resources means or comprises that for determining or deriving the third feedback resource and the fourth feedback resource, the first device excludes sensing on the candidate set of feedback resources.

18. The method of claim 17, wherein the resource association, in time domain and/or frequency domain, between the third feedback resource and the third control resource, and/or the third data resource is configured or preconfigured or specified; and
- the resource association, in time domain and/or frequency domain, between the fourth feedback resource and the third control resource, and/or the third data resource is configured or preconfigured or specified.

19. A method of a second device to perform device-to-device or sidelink transmission and reception, comprising:
- the second device receives a third control information on a third control resource, wherein the third control information schedules or indicates a third data resource;
- the second device receives a third data transmission on the third data resource;
- the second device determines or derives a third feedback resource and a fourth feedback resource based on the third control resource and/or the third data resource without sensing on a candidate set of feedback resources, wherein the sensing comprises the second device receiving a transmission and excluding candidate resources associated with the received transmission, and wherein the candidate set of feedback resources comprises the third feedback resource and the fourth feedback resource;
- if the second device receives or decodes the third data transmission successfully, the second device transmits HARQ (Hybrid Automatic Repeat Request) acknowledgement on the third feedback resource; and
- if the second device does not receive or decode the third data transmission successfully, the second device transmits HARQ non-acknowledgement on the fourth feedback resource.

20. The method of claim 19, wherein
the second device determines or derives the third feedback resource and the fourth feedback resource, from the candidate set of feedback resources, based on association between feedback resources and data resources; and/or
- wherein the resource association, in time domain and/or frequency domain, between the third feedback resource, the third control resource, and/or the third data resource is configured or preconfigured or specified; and
- the resource association, in time domain and/or frequency domain, between the third feedback resource, the third control resource, and/or the third data resource is configured or preconfigured or specified; and
- the resource association, in time domain and/or frequency domain, between the third feedback resource, the third control resource, and/or the third data resource is configured or preconfigured or specified; and
- the resource association, in time domain and/or frequency domain, between the fourth feedback resource, the third control resource, and/or the third data resource is configured or preconfigured or specified.

21. The method of claim 19, wherein:
- the third feedback resource and the fourth feedback resource are different in frequency domain; and/or
- the third feedback resource and the fourth feedback resource are in the same TTI (Transmission Time Interval) or symbol.

22. The method of claim 1, wherein the second device transmits the first feedback transmission on the first feedback resource of the first set of feedback resources to the first device; and
- wherein the second device determines or derives the first set of feedback resources based on the first control resource and/or the first data resource, wherein for determining or deriving the first set of feedback resources, the second device excludes sensing on the candidate set of feedback resources, and wherein the candidate set of feedback resources comprises the first set of feedback resources.

* * * * *